US006205436B1

(12) United States Patent
Rosen

(10) Patent No.: US 6,205,436 B1
(45) Date of Patent: *Mar. 20, 2001

(54) TRUSTED AGENTS FOR OPEN ELECTRONIC COMMERCE WHERE THE TRANSFER OF ELECTRONIC MERCHANDISE OR ELECTRONIC MONEY IS PROVISIONAL UNTIL THE TRANSACTION IS FINALIZED

(75) Inventor: Sholom S. Rosen, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/138,290

(22) Filed: Aug. 21, 1998

Related U.S. Application Data

(62) Division of application No. 08/895,395, filed on Jul. 16, 1997, which is a division of application No. 08/730,158, filed on Oct. 23, 1996, now Pat. No. 5,703,949, which is a continuation of application No. 08/575,699, filed on Dec. 19, 1995, now abandoned, which is a division of application No. 08/234,461, filed on Apr. 28, 1994, now Pat. No. 5,557,518.

(51) Int. Cl.[7] .................................................. H04L 9/00
(52) U.S. Cl. ................... 705/65; 705/64; 705/41; 705/80
(58) Field of Search .................. 380/24; 705/26, 705/37, 39, 41, 43, 44, 50–59, 64–69, 75–79, 80

(56) References Cited

U.S. PATENT DOCUMENTS

| 4,910,774 | 3/1990 | Barakat . | |
| 4,999,806 | * 3/1991 | Chernow et al. | 717/11 |
| 5,200,999 | 4/1993 | Mayas et al. . | |
| 5,265,164 | 11/1993 | Mayas et al. . | |
| 5,267,171 | * 11/1993 | Suzuki et al. | 364/479.04 |
| 5,389,738 | 2/1995 | Piosenka et al. . | |
| 5,396,558 | 3/1995 | Ishiguro et al. . | |
| 5,557,518 | * 9/1996 | Rosen | 380/24 |
| 5,563,946 | * 10/1996 | Cooper et al. | 705/56 |
| 5,625,690 | * 4/1997 | Michel et al. | 705/53 |
| 5,757,917 | * 5/1998 | Rose et al. | 705/79 |

FOREIGN PATENT DOCUMENTS

| 6-60089 | 3/1994 | (JP) . | |
| WO 94/01825 | 7/1993 | (WO) . | |
| WO 9505712 | * 2/1995 | (WO) | H04L/000/00 |

OTHER PUBLICATIONS

Stone, B. Uniform Commercial Code in a Nutshell. 2nd ed. 1984. pp. 306–321.*

(List continued on next page.)

Primary Examiner—Gail O. Hayes
Assistant Examiner—Christopher M. Tucker
(74) Attorney, Agent, or Firm—Morgan & Finnegan, LLP

(57) ABSTRACT

A system for open electronic commerce having a customer trusted agent securely communicating with a first money module, and a merchant trusted agent securely communicating with a second money module. Both trusted agents are capable of establishing a first cryptographically secure session, and both money modules are capable of establishing a second cryptographically secure session. The merchant trusted agent transfers electronic merchandise to the customer trusted agent, and the first money module transfers electronic money to the second money module. The money modules inform their trusted agents of the successful completion of payment, and the customer may use the purchased electronic merchandise.

46 Claims, 91 Drawing Sheets

OTHER PUBLICATIONS

McAndrews, James J. Where Has All the Paper Gone? Book–Entry Delivery–Against–Payment Systems. Business Review (Federal Reserve Bank of Philadelphia). pp. 19–30. Nov./Dec. 1992.*

Jones, David. End of the paper chase. Project & Trade Finance issue 138; London; Oct. 1994.*

Minahan, Tim. Net is gold mine for transportation buyers. Purchasing vol. 122, issue 4; Boston; Mar. 20, 1997.*

Anonymous. UN tackles EDI on shipping. Project & Trade Finance; London; May 1996.*

Hong Kong—Another Slap In Face For Tradelink. Newsbytes News Network; Stillwater; Oct. 3, 1995.*

McWilliams, Brian S. Don Tapscott: Economics 0001 0000 0001. Computerworld vol. 30, issue 46; Framingham; Nov. 11, 1996.*

Kaiser, L.H. If you are serious about financial EDI, restructure your cash application process. Business Credit vol. 98, issue 4; New York; Apr. 1996.*

Nelson, Nancy Melin. Encrypted discs: Try before you buy! Telecommunications and. Information Today vol. 10, issue 9; Medford; Oct. 1993.*

Anonymous. Trends: international: electronic bill of lading custs discrepancies that slow trade payments. Cashflow vol. 7, issue 5; Atlanta; May 1986.*

* cited by examiner

TRUSTED AGENTS FOR OPEN ELECTRONIC COMMERCE WHERE THE TRANSFER OF ELECTRONIC MERCHANDISE OR ELECTRONIC MONEY IS PROVISIONAL UNTIL THE TRANSACTION IS FINALIZED

This is a divisional of co-pending application Ser. No. 08/895,395 filed on Jul. 16, 1997, which is a divisional of application Ser. No. 08/730,158 filed on Oct. 23, 1996, now U.S. Pat. No. 5,703,949, which is a continuation of application Ser. No. 08/575,699 filed on Dec. 19, 1995, now abandoned, which is a divisional of application Ser. No. 08/234,461 filed on Apr. 28, 1994, now U.S. Pat. No. 5,557,518.

FIELD OF THE INVENTION

The present invention relates to a system for facilitating open electronic commerce. In particular, the system utilizes tamper-proof electronic units, referred to as "trusted agents", in combination with money modules to create a secure transaction environment for both the buyer and seller of electronic merchandise and services.

BACKGROUND OF THE INVENTION

Electronic commerce today is comprised of a collection of closed communities. Examples of such communities include local and long distance telephone companies, cable companies, cellular telephone companies, E-mail services, and electronic service providers such as Prodigy and CompuServe. Customers must enroll in each community in order to use the products and services provided. Thus, prior identification of the payer is required before electronic delivery of merchandise or services. The operator of the service can then either bill the customer, credit his/her loan account, or debit his/her deposit account.

With the advent of high-speed networks delivering entertainment and information on demand, the current billing and payment systems will be flooded with transactions. Consequently, the customer will be bombarded by invoices with numerous items for each billing period. Moreover, the customer's lifestyle will be exposed to each system operator due to the non-anonymous nature of the transactions.

One method of anonymous payment is described in my U.S. Pat. No. 5,453,601 issued on Sep. 26, 1995, the disclosure of which is incorporated herein by reference. That application discloses an electronic monetary system for implementing electronic money payments as an alternative medium of exchange to cash, checks, credit cards, debit cards, and electronic funds transfers. In particular, the described system uses money modules packaged in tamper-proof housings to store and transfer electronic notes. Money module payments may be either real-time, off-line payments between money modules (e.g., between a money module contained within a customer's "electronic wallet" and a money module contained within a merchant's point-of-sale terminal), or on-line payments for network services such as information retrieval and telephone calls, or for purchasing airline tickets, theater tickets, etc.

However, a serious problem with remote, anonymous purchase is the security of payment and delivery. If one wants to purchase a movie over the telephone anonymously, then how can the buyer be assured he will receive the movie if he pays first, or the seller be assured that he will be paid if he delivers the movie first? Thus, when purchasing anything from a remote location, it is customary today for the buyer and seller to first identify themselves, leading to a consequent loss of privacy.

SUMMARY OF THE INVENTION

Accordingly, it is an object of the invention to provide a system which will allow customers to buy electronic merchandise or services on demand without enrolling in an electronic community.

It is another object of the present invention to enable remote delivery of electronic merchandise or services with real-time anonymous payment or real-time authorization-based payment where neither the customer nor the merchant can interfere with the payment and delivery process once they have agreed to the transaction.

It is another object of the present invention to use trusted agents and money modules to create a system for open electronic commerce where both customers and merchants can securely transact remotely over electronic networks without prior knowledge of each other.

It is another object of the present invention to provide a secure electronic real-time purchase transaction between buyer and seller without third-party intervention.

According to one aspect of the invention, a customer trusted agent establishes a cryptographically secure session with a merchant trusted agent. The customer trusted agent securely communicates with a first money module, and the merchant trusted agent securely communicates with a second money module. The merchant trusted agent delivers electronic merchandise that is provisionally retained by the customer trusted agent. The trusted agents participate in a secure dialogue and mutually agree on the payment terms. The first money module transmits electronic money to the second money module. Upon successful completion of the money module payment, the first money module informs the customer trusted agent, and the second money module informs the merchant trusted agent. The merchant then logs the sale and the customer may use the purchased electronic merchandise.

According to a second aspect of the invention, the customer may pay for the electronic merchandise by presenting a credential representing a credit or debit card.

According to a third aspect of the invention, electronic tickets may be presented to other trusted agents in order to obtain services.

According to a fourth aspect of the invention, the trusted agents may be used for performing a secure identity-based payment.

According to a fifth aspect of the invention, the trusted agents may be used to resolve a dispute over purchased electronic merchandise.

DESCRIPTION OF THE DRAWINGS

The invention will be described in greater detail below with reference to the attached drawings, of which.

DESCRIPTION OF THE PREFERRED EMBODIMENT

The present invention contemplates a system for enabling the secure delivery of electronic merchandise with real-time anonymous payment or authorization-based payment. The system allows both the customer and merchant to feel secure that their interests are being served.

Figure 1:
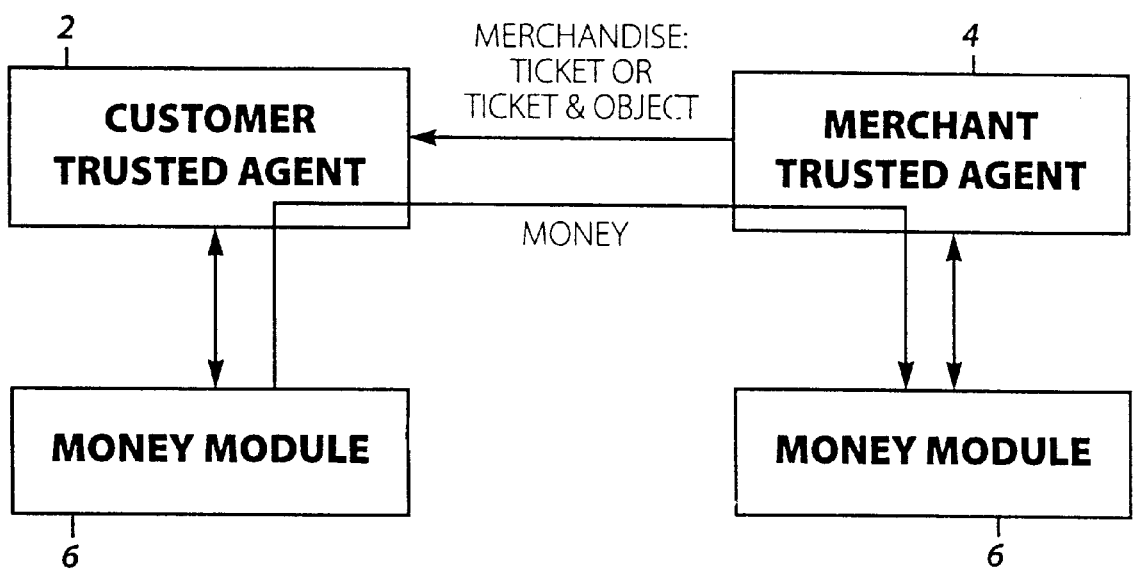
FIG. 1 is a diagram showing the trusted agent/money module interaction.

Referring to FIG. 1, there is shown the basic interaction between system components during an anonymous payment transaction. To achieve the secure exchange of payment for electronic merchandise when buyer and seller are transacting electronically, the present invention introduces trusted agents 2, 4 for both the customer and merchant. A trusted agent is a combination of hardware and software components. It is tamper-proof and contains secure protocols which cooperate with a money module 6 to synchronize secure payment to delivery.

The money modules contemplated herein are tamper-proof devices capable of storing and transferring electronic money. The electronic money is preferably in the form of electronic notes that are representations of currency or credit. Money modules are also capable of establishing cryptographically secure communication sessions with other devices. The preferred embodiment of the present invention utilizes the transaction money modules described in PCT patent application WO 93/10503, together with any modifications or improvements described hereafter.

Conceptually, a trusted agent is a surrogate actor for an entity who wants to transact remotely (electronically) in a secure way. The trusted agents are under control of transaction protocols and behave in a way calculated to resolve the transaction to the satisfaction of both parties. In order to guarantee the behavior of a trusted agent, the protocols are physically protected. Thus neither party can modify the protocols to the disadvantage of the other party.

The trusted agents exchange electronic merchandise and payment. As shown in FIG. 1, the merchant's trusted agent 4 (MTA) sends electronic merchandise to the customer's trusted agent 2 (CTA). In return, the customer's money module 6 sends electronic money to the merchant's money module 6 via CTA 2 and MTA 4.

Tickets

Figure 2:
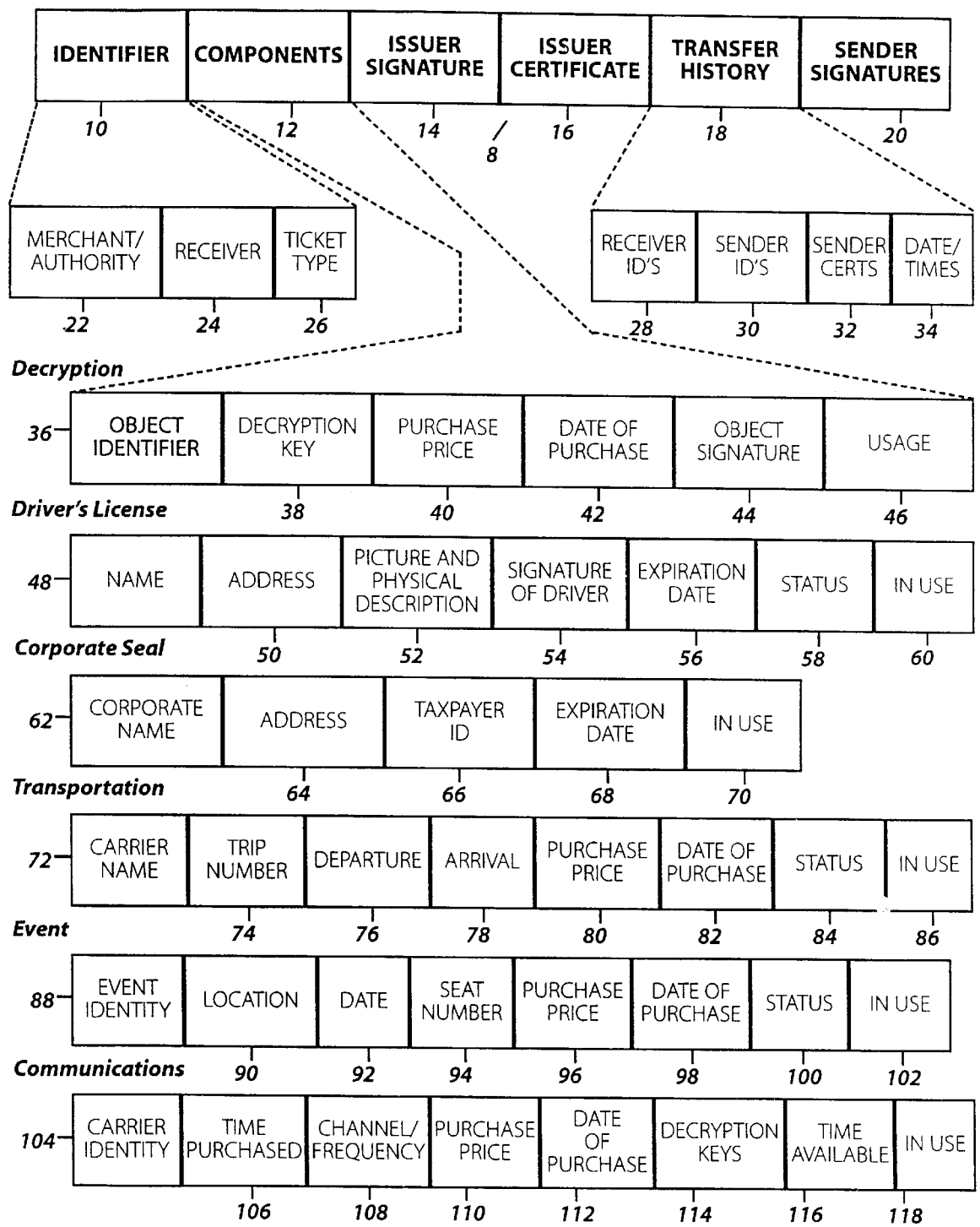
FIG. 2 illustrates the sections and fields of various tickets.

Electronic merchandise is any goods that can be represented in electronic form, and in the preferred embodiment described herein consists of either a ticket or an encrypted electronic object (EO) and its associated decryption ticket. Referring to FIGS. 1 and 2, a ticket 8 is an electronic item created by a MTA 4 and transferred to a CTA 2 during a purchase transaction. Tickets may be thought of as the property of the trusted agents. A customer whose CTA 2 has just received a ticket 8 may only use that ticket upon successful completion of the transaction.

The present invention supports a variety of ticket types used for various purposes:

1. A decryption ticket is always associated with a particular encrypted electronic object. Examples of electronic objects are computer software, games, movies, or information products like electronic newspapers and books. In this case, the merchant's goods are the electronic objects, which are encrypted by a MTA prior to being delivered to a customer. An encrypted electronic object can be decrypted by unique information in its associated decryption ticket. Together, the encrypted electronic object and its decryption ticket comprise the electronic merchandise transferred by the merchant.

The transferred electronic object is cryptographically secure from inspection and use by the receiving customer or any other third party unless they have access to the decryption ticket. The decryption ticket, in turn, is the "property" of the CTA and may only be used upon successful completion of the purchase transaction.

2. A credential ticket identifies the "owner" and permits specific privileges. Examples of credentials include a driver's license, passport, credit card, debit card, social security card, and corporate seal.

3. A transportation ticket can serve as an airline, rail or bus ticket in electronic form.

4. An event ticket can provide access to various events such as a theater, concert, play, or sporting event.

5. A communications ticket can provide access to various communications services including satellite, cable, radio, cellular telephone and Plain Old Telephone Service (POTS). For example, a communications ticket may be used to unscramble TV or radio broadcasts.

6. A physical object ticket can serve as purchase order, invoice, payment advice, receipt, or title for physical objects.

Other types of ticket are, of course, possible and may be desirable in implementing open electronic commerce in accordance with the present invention.

A trusted agent can not only purchase tickets but can also present them to other trusted agents for a variety of purposes. For example, event tickets can be electronically presented for entry into an arena. Once the ticket holder is inside, the ticket can again be presented electronically for automated directions to his/her seat. A driver's license in ticket form can be presented as proof of identity. A ticket can be presented as proof of purchase of non-electronic goods and exchanged for a physical object, either delivered to the customer or picked up by the customer at a store or warehouse. A credit or debit card ticket can be presented for authorization-based payment. In a purchase dispute, a ticket may be presented as proof of purchase of defective merchandise.

FIG. 2 shows a preferred embodiment of a ticket 8 in which the ticket is comprised of six major sections: Identifier 10, Components 12, Issuer Signature 14, Issuer Certificate 16, Transfer History 18 and Sender Signatures 20. The sections, in turn, are comprised of various information containing fields.

The Identifier section 10 has a field 22 which holds information that identifies the merchant or authority creating the ticket. Such information, for example the merchant's or authority's name, is copied from a merchant or authority credential held by the ticket issuer. The field 22 also contains the expiration date of the merchant or authority credential. A field 24 contains the receiving trusted agent's identification number. The field 24 also contains the expiration date of the ticket receiver's trusted agent credential. A field 26 designates the ticket type (e.g., decryption ticket, event ticket, etc.).

The Components section 12 contains the basic ticket content which varies depending upon the ticket type and its specific purpose. FIG. 2 shows examples of components found in different ticket types.

The Component section 12 of a decryption ticket has an Object Identifier field 36 which uniquely identifies a particular electronic object and may also contain a short description of the electronic object (e.g., title and author). Electronic objects themselves (e.g., movies) are comprised of a header and a body. The header contains an object identifier which ties to the object identifier 36 in the decryption ticket. The header also contains descriptive information which could be presented to the buyer for preview of the object content. The body is the content which the purchaser can interact with, peruse, or watch.

A Decryption Key field 38 contains the information used to decrypt the ticket's associated electronic object. A Purchase Price field 40 has the electronic object's price information. A Date of Purchase field 42 has the date on which the electronic object was purchased. An Object Signature field 44 contains a digital signature of the electronic object. Digital signatures are well known in the art and are used to detect if a signed electronic object has been altered in any way since the time it was signed. Thus, electronic object integrity may be checked. A Usage field 46 specifies restrictions on usage of the electronic object.

A credential ticket such as a driver's license may have: a Name field 48; an Address field 50; a Picture and Physical Description field 52; a Signature of Driver field 54 holding an electronic image of the driver's signature; an Expiration Date field 56; a Status field 58 indicating if the license is valid, suspended, or revoked; and an In Use field 60 indicating when a copy of the ticket has been presented to a MTA 4 for use, so that the original ticket held by the CTA 2 cannot be reused during the presentation period. A credential ticket such as a corporate seal may have: a Corporate Name field 62; an Address field 64; a Taxpayer ID field 66; an Expiration Date field 68; and an In Use field 70.

A transportation ticket may have: a Carrier Name field 72; a Trip Number field 74 specifying for example a flight, train or bus number; Departure and Arrival fields 76, 78 each specifying a time and location; a Purchase Price field 80; a Date of Purchase field 82; a Status field 84 indicating whether the ticket is unused or has already been used; and an In Use field 86.

An event ticket may have: an Event Identity field 88; a Location field 90; a Date field 92; a Seat Number field 94, a Purchase Price field 96, a Date of Purchase field 98; a Status field 100; and an In Use field 102.

A communications ticket may have: a Carrier Identity field 104; a Time Purchased field 106; a Channel/Frequency field 108; a Purchase Price field 110; a Date of Purchase field 112; a Decryption Keys field 114 for decrypting if the communication is encrypted; a Time Available field 116 indicating the remaining value of the ticket; and an In Use field 118.

A physical object ticket (not shown) may serve as a purchase order and contain the following information: reference number, date, customer identifier, list of items to purchase, instructions, and status (on order, invoiced, etc.). A physical object ticket may also serve as an invoice and contain: invoice number, date, P0 reference numbers, vendor identifier, and amount. Similarly, a remittance advice would contain: invoice reference numbers, customer identifier, date, and amount paid. A receipt would contain: date, vendor, identifier, list of items or invoice reference numbers, and amount paid.

Trusted agents may be used for retail purchasing of physical objects either in person or remotely. If purchasing in person with the trusted agent, the entire transaction can be accomplished at electronic speeds with no paper for both anonymous and identity-based transactions. For the merchant, this means he can reduce the cost of the customer payment. For the customer, it means more convenience and control, since the transaction time has been reduced and the agent has an electronic list of purchases which can be easily analyzed at a later time.

When purchasing physical objects remotely over the phone or over interactive TV, a nagging restriction for the merchant and customer is that merchandise has to be shipped to the customer's address. This is to secure the merchant from fraud. Payment is usually provided using a credit card or the customer is billed, disclosing the customer's identity.

If the purchase was made using a trusted agent, then the merchandise would not have to be delivered to the customer's address, and the customer would not have to disclose his identity. Anonymity can be accomplished if the customer pays with electronic money at the time of order or receipt of the merchandise. The restriction on delivery location can be lifted in either case. The merchant can be secured from fraud because he/she will get paid before or at the time the goods are delivered. Moreover, the receiver is validated at the time the merchandise is delivered. The customer can feel secure because it will be difficult for a third party to defraud him/her, since they have a secure receipt. Also, the transaction can be disputed using the secure receipt if the merchandise is faulty. At the end of the transaction, both the customer's trusted agent 2 and the merchant's trusted agent 4 will have recorded that the ordered merchandise was paid for and delivered to the correct party.

For commercial transactions, trusted agents provide secure, authenticated, automated transactions and records from order to payment. Vendors can be efficiently paid upon delivery of goods, and customers can have authenticated receipts without the hassle of paperwork. All ancillary systems such as accounts payable, accounts receivable, purchase order, and invoicing can be integrated with trusted agents to provide a seamless, secure system for procurement.

The Issuer Signature section 14 of a ticket 8 holds a digital signature, formed by the ticket creator, over the Identifier and Components sections 10, 12. Such signature is made using a private key belonging to the issuer's trusted agent. The Issuer Certificate section 16 contains a certification by a trusted third party (hereinafter referred to as the "Trusted Agency") used in conjunction with the issuer signature to verify the authenticity of the issued ticket 8. Such certification is in the form of a certificate belonging to the issuer's trusted agent. The general use of certificates and digital signatures is known and described, for example, in D. W. Davies and W. L. Price, Security For Computer Networks (John Wiley & Sons, 1984).

The Transfer History section 18 contains information generated when tickets are transferred between trusted agents after the initial issuing of the ticket 8 by a merchant or authority. A Receiver ID's field 28 contains the receiving trusted agent's identification number. A Sender ID's field 30 contains the sending trusted agent's identification number. A Sender Certs field 32 contains the sending trusted agent's certificate. A Date/Times field 34 contains the date and time of transfer of the ticket 8. As subsequent transfers are made, additional receiver and sender ID's, sender certificates, and dates and times are appended to each field, thus creating a list of transfer history information. It may be noted that the trusted agent ID found in the Receiver field of the Identifier section, should be the same as the first ID in the Sender ID's field.

In addition, whenever a ticket 8 is transferred between trusted agents, the sender digitally signs the ticket over the five preceding ticket sections using a private key belonging to the sender's trusted agent. The Sender Signatures section 20 is then updated by appending the newly created digital signature, thus forming a list of sender signatures.

Transaction Devices

Figure 3:
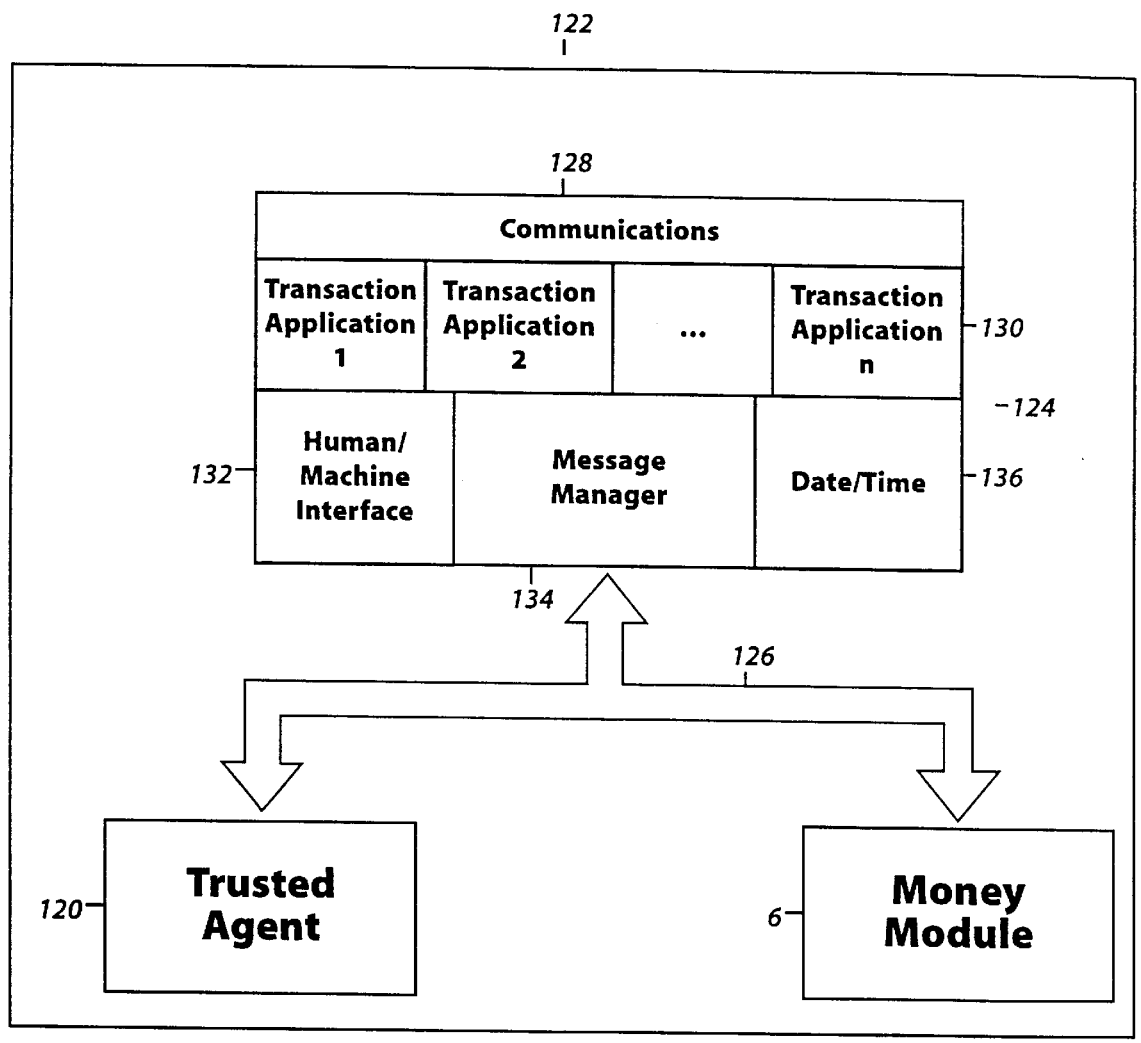
FIG. 3 illustrates the components of a transaction device.

Referring to FIG. 3, a trusted agent 120 is embedded in a transaction device 122. The transaction device 122 is composed of three major components for both the merchant and the customer. There is a host processor 124, a trusted agent 120, and a money module 6. These components are connected, for example, by a bus 126. When trusted agent 120 is a MTA 2, the device 122 is referred to as a merchant transaction device (MTD). When trusted agent 120 is a CTA 4, the device 122 is referred to as a customer transaction device (CTD).

FIG. 3 shows the functional components of the host processor 124. The host processor provides the following functions: Communications 128, Transaction Applications 130, Human/Machine Interface 132, Date/Time 136, and a Message Manager 134.

The Communications function 128 supports communications between the transaction device 122 and the outside world. Such communications may be wired or wireless, broad or narrow band, so long as CTD 2 and MTD 4 communications are compatible. The Communications function 128 sets up the connection between two transaction devices 122, or connects a transaction device to a network for indirect connection to another transaction device or a trusted server.

Transaction Applications 130 may perform a variety of tasks. For example, a transaction application may perform the shopping task by interfacing to a merchant server's catalogue services for browsing activities, choosing the products, and initiating payment and delivery. Another transaction application may provide for the interim storage of electronic objects and possibly execute objects. In order to execute an electronic object, there may be additional object processors depending on the type of electronic object (e.g., movie, book, multimedia game, etc.). In short, a transaction device 122 contains all the processes to choose, buy and possibly use electronic objects, credentials, and other tickets 8, or the processes to sell the same.

The Human/Machine Interface function 132 provides the look and feel of the transaction device 122. It could include a keyboard, mouse, pen, voice, touch screen, icons, menus, etc. The Human/Machine Interface 132 communicates with other functions in the trusted agent 120 and the money module 6 through the message manager 134. In some applications a Human/Machine Interface 132 may not be necessary, for example, in a fully automated merchant transaction device.

The Date/Time function 136 is set by the owner of the transaction device 122 and includes date, time and time zone. The Date/Time information is fed to the embedded trusted agent 120 whenever the trusted agent is opened for use.

The Message Manager 134 routes inter-host messages (i.e., messages between transaction devices) and messages among the host processor 124, the trusted agent 120 and the money module 6.

Trusted Agents

Figure 4A:
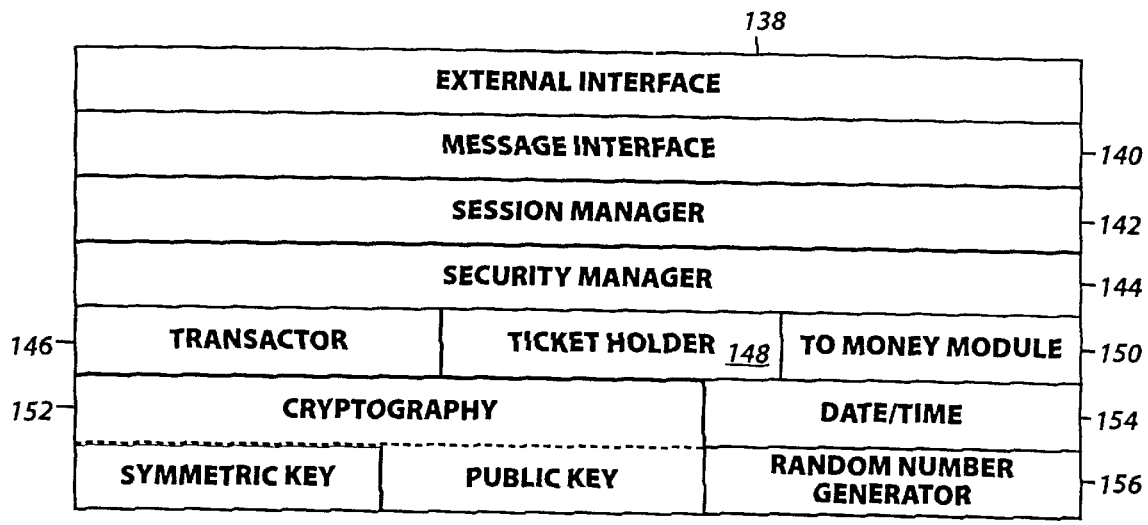
FIGS. 4A–4D illustrate the functional components of trusted agents.
Figure 4B:
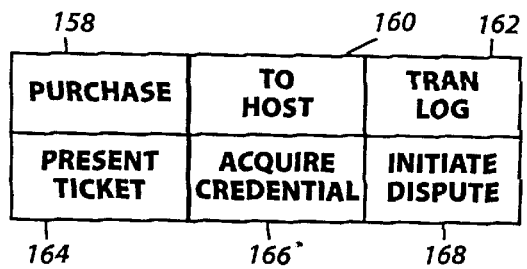
Figure 4C:
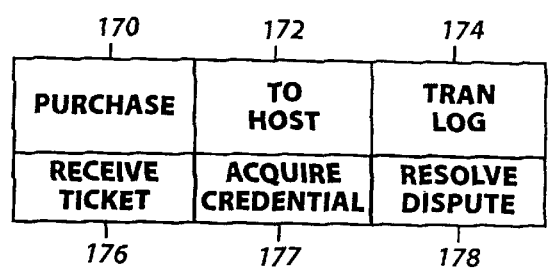
Figure 4D:
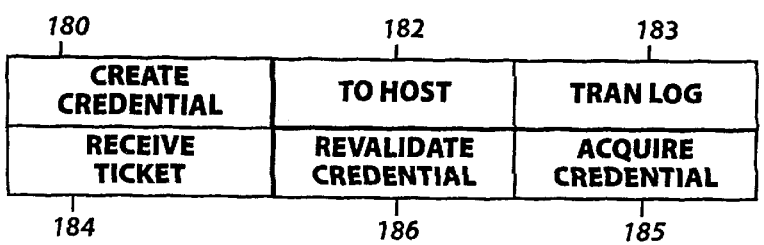

FIG. 4A shows the functional components of a trusted agent 120. The contemplated system for open electronic commerce uses three types of trusted agent 120 which differ in certain unique Transactor functions 146 that they provide. FIG. 4B shows the transactor functions found in a CTA 2. FIG. 4C shows the transactor functions found in a MTA 4. FIG. 4D shows the transactor functions found in an Authority Trusted Agent (ATA) which, in turn, is embedded in an Authority Transaction Device (ATD). ATDs are associated with credential issuing authorities such as the Department of Motor Vehicles.

An External Interface function 138 provides physical communication with the host processor 124 and the money module 6 of the transaction device 122 in which the trusted agent 120 is embedded. A Message Interface function 140 processes and routes inter-agent and intra-agent messages. A Session Manager function 142 sets up and breaks down inter-agent sessions and agent to trusted server sessions. A Security Manager function 144 maintains security information (e.g., a trusted agent certificate and an untrusted agent list) and establishes secure communication with a counterparty trusted agent (via the host processor 124) and with the local money module 6 within the same transaction device 122. The Transactor function 146 provides the protocols to perform a transaction. Customer, merchant and authority transactors are used for CTAs, MTAs and ATAs, respectively.

FIG. 4B shows the customer transactor functions. A Purchase function 158 exchanges payment for tickets 8 and electronic objects. A To Host function 160 provides an interface to the transaction device's host processor 124. A Present Ticket function 164 presents tickets 8 to obtain information or services. An Acquire Credential function 166 interacts to receive a credential ticket. A Tran Log function 162 maintains a log of trusted agent transactions. Both CTAs 2 and MTAs 4 maintain a transaction log which stores the following information: transaction type (e.g., ticket type); a pre-transaction ticket image; a post-transaction ticket image; dispute information including the date of dispute (as maintained by each trusted agent in the dispute dialog), status, and merchant resolution (e.g., replace, refund, denied); and recertifying information (e.g., date of recertification). An Initiate Dispute function 168 presents electronic merchandise if a customer is dissatisfied.

FIG. 4C shows the merchant transactor functions. A Purchase function 170 exchanges tickets 8 and electronic objects for payment. A To Host function 172 provides an interface to the transaction device's host processor 124. A Receive Ticket function 176 processes a received ticket 8 to provide service or information. An Acquire Credential function 177 obtains a merchant credential. A Tran Log function 174 maintains a log of trusted agent transactions. A Resolve Dispute function 178 receives tickets 8 and electronic objects to resolve a customer complaint.

FIG. 4D shows the authority transactor functions. A Create Credential function 180 constructs and delivers credential tickets to a requestor. A To Host function 182 provides an interface to the transaction device's host processor 124. A Receive Ticket function 184 processes a received ticket 8 to provide service or information. A Revalidate Credential function 186 accepts a current credential and reissues the credential with a new expiration date. A Tran Log function 183 maintains a log of transactions. An Acquire Credential function 185 obtains an authority credential.

Referring again to FIG. 4A, a To Money Module function 150 communicates with the money module 6 in the same transaction device 122 to provide payment. A Cryptography function 152 provides public key and symmetric key cryptographic functions. Any well known public and symmetric key cryptography techniques may be used, for example, RSA and DES. A Ticket Holder function 148 creates tickets 8 in a MTA 4 or stores and retrieves tickets 8 in a CTA 2. A Random Number Generator function 156 generates random numbers to produce cryptographic keys. A Date/Time function 154 manages the date and time delivered from the host processor 124 to date tickets 8 and validate certificates and presented tickets. Current clock information is fed to the trusted agent 120 every time the trusted agent is opened (i.e., signed on for use) and maintained until the trusted agent is closed.

System Overview

Figure 5:
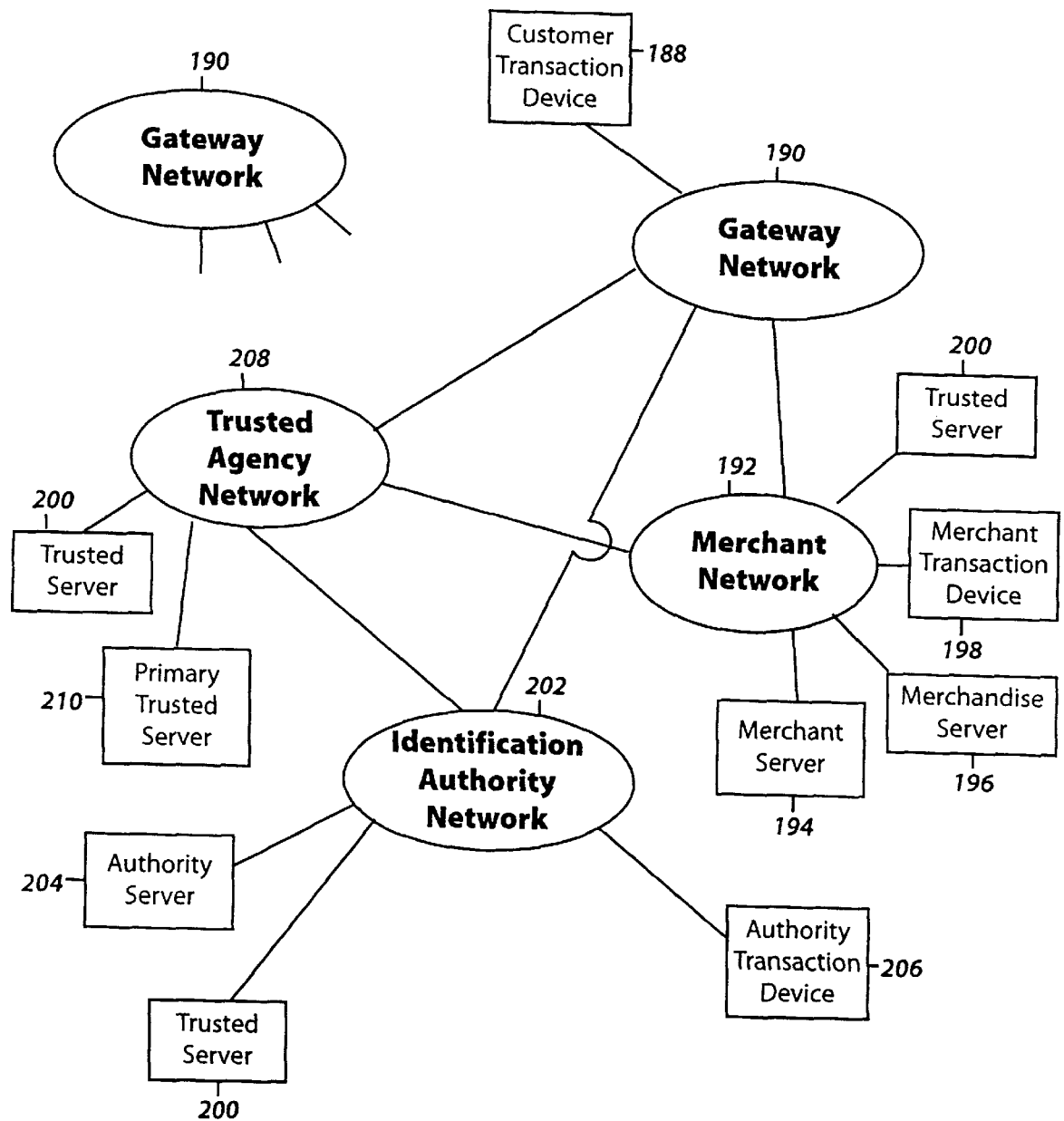
FIG. 5 is a diagram showing the network structure of a system for open electronic commerce.

FIG. 5 shows the general network architecture of the contemplated system for open electronic commerce. Customer transaction device 188 can communicate with a merchant through any gateway network 190 without revealing the owner. Thus, customers can travel the networks anonymously, paying each in real-time for access. They can search out merchants' electronic space and enter it anonymously, select the item for purchase, and deliver payment in real-time. The system also provides for secure authorization-based payment via credit or debit card. This is accomplished by the customer presenting credit or debit card information stored within the trusted agent 120 as a credential.

In the preferred embodiment, the gateways 190 provide CTDs 188 with access to local merchant networks 134 for commerce and local identification authority networks 192 for acquiring and revalidating credentials (e.g., driver's licenses, credit cards, etc.) Merchant networks 192 may consist of merchant servers 194 that provide a merchandise catalogue, merchant transactor devices 198 to deliver goods for payment, and merchandise servers 196 which constitute an electronic warehouse. Merchant networks 192 also preferably have trusted servers 200 for distributing security information.

Identification authority networks 202 may have authority servers 204 which manage a database of credentials and an authority transaction device 206 which issues and revalidates credentials. Examples of identification authorities connected to networks 202 are foreign offices, departments of motor vehicles, banks, and the Social Security Administration. Identification authority networks 202 also have trusted servers 200 for distributing security information.

System Security

With reference to FIG. 5, security for the open electronic commerce system is provided by a network of trusted servers 200 situated at a Trusted Agency Network 208, at merchant networks 192, and at identification authority networks 202. The trusted servers 200 are tamper-proof processors that perform four primary functions: certification of trusted agents 120, distribution of untrusted lists, distribution of primary trusted server public key lists, and resolution of customer/merchant disputes.

Figure 6A:
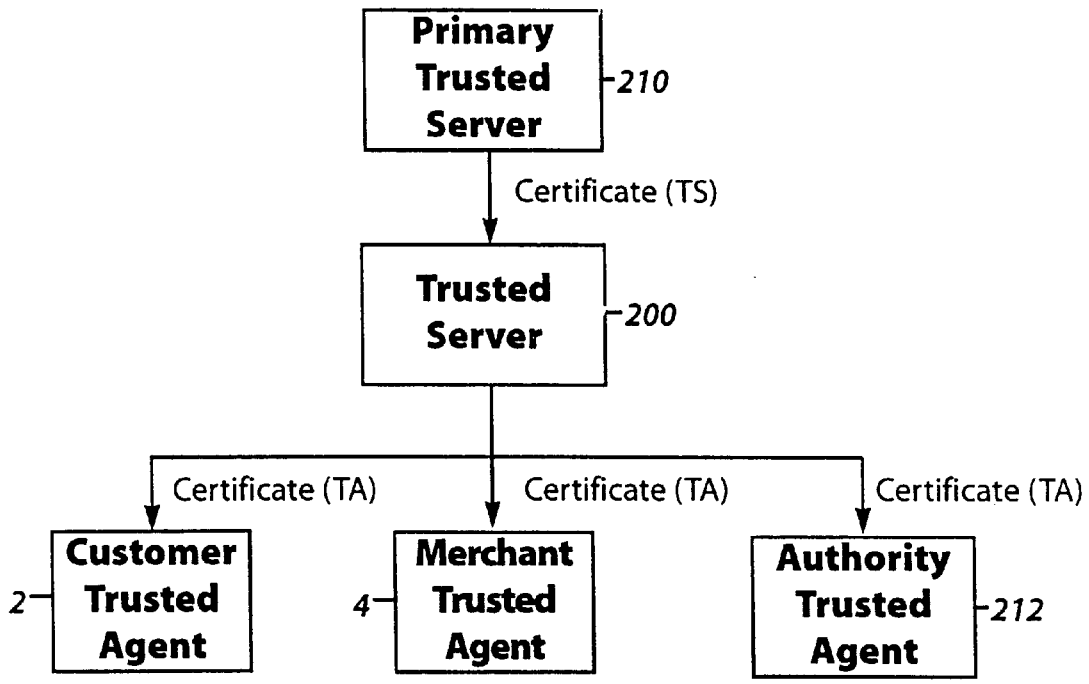
FIG. 6A is a diagram showing the security hierarchy for the trusted agents.

FIG. 6A shows the system security hierarchy. At the top of the hierarchy, and located at the Trusted Agency Network 208, are primary trusted servers 210 which certify and provide trusted server certificates (cert(TS)) to all the trusted servers 200 in the system.

Each primary trusted server 210 has its own public key and corresponding private key. The primary trusted server public keys are commonly shared by all trusted servers 200 and trusted agents 120 in the system. These public keys are stored in a primary trusted server public key (PTS(PK)) list. The term "public" key as used here and throughout the specification, does not imply that the key is known to the public at large. In this case, for example, the public key is known only to all trusted servers 200 and trusted agents 120 and is sealed within their tamper-proof housings. This limited sense of "public" provides added security to the system as a whole.

Beneath the primary trusted server 210 on the security hierarchy are the trusted servers 200 which may be located throughout the overall commerce system. The trusted servers 200 provide trusted agent certificates (cert(TA)) to the trusted agents 120 (i.e., CTAs 2, MTAs 4, and ATAs 212).

The Trusted Agency guarantees the protocols and physical protection of each trusted agent 120 in the system. Trusted agents 120 are manufactured in a physically secure environment under control of the Trusted Agency. The components are fabricated, assembled, and loaded with software in this environment. The trusted agents 120 are then tamper-proofed and can only be communicated with through their external interface.

At initialization, each trusted agent 120 is placed in communication with a trusted server 200. The trusted server 200 assigns each trusted agent 120 a unique identification number TA(id). Then the trusted server 200 requests the trusted agent 120 to generate a public and private key pair. The trusted agent 120 generates the key pair and passes its public key (TA(PK)) to the requesting trusted server 200. The trusted server 200 incorporates this information and the TA(id) into a trusted agent certificate cert(TA) and passes it back to the trusted agent 120 along with a PTS(PK) list, and an untrusted list. Finally, the trusted agent 120 tests its newly received certificate and makes sure the certificate is valid.

These initialization steps are performed only once, prior to distribution of the trusted agent 120 to the public. Upon purchase, a trusted agent 120 is personalized by its owner via biometrics or secrets (e.g., a personal identification number (PIN) is chosen).

In a similar fashion, a trusted server 200 is initialized by a primary trusted server 210. Upon conclusion of trusted server initialization, each trusted server 200 holds a trusted server certificate (cert(TS)) containing a unique trusted server identification number (TS(id)) and a trusted server public key (TS(PK)). The trusted server 200 also holds the private key corresponding to its public key TS(PK), a PTS(PK) list, and an untrusted list.

A cert(TS) is encrypted by a primary trusted server 210 and carries a unique identification number (PTS(id)) for that primary trusted server 210 in the clear. A cert(TA) is encrypted by a trusted server 200 and carries that trusted server's certificate (cert(TS)) for validation.

The structures of the cert(TS) and the cert(TA) are as follows:

$$\text{Cert(TS)} = \underbrace{E_{PTS}[TS(id) \parallel TS(PK) \parallel \text{expire date} \parallel \sigma_{PTS}(X)]}_{X} \parallel PTS(id)$$

$$\text{Cert(TA)} = \underbrace{E_{TS}[TA(id) \parallel TA(PK) \parallel \text{expire date} \parallel \sigma_{TS}(Y)]}_{Y} \parallel \text{Cert(id)}$$

-continued

Where  PTS = Primary Trusted Server   PK = Public Key
       TS = Trusted Server             σ = digital signature
       TA = Trusted Agent              Cert = Certificate
       ∥ = Concatenate                 E = Algorithm with private key used for encrypting and for creating digital signature
       id = identification number The certificate validation protocols are:
1) Validate Cert(TS)
   a) $D_{PTS}(E_{PTS}(X\|\sigma_{PTS}(X))) = X\|\sigma_{PTS}(X)$
   b) Check if date is valid
   c) Check if $D_{PTS}(\sigma_{PTS}(X)) = h(X)$
2) Validate Cert(TA)
   a) Validate Cert(TS)
   b) $D_{TS}(E_{TS}(Y\|\sigma_{TS}(Y))) = Y\|\sigma_{TS}(Y)$
   c) Check if date is valid
   d) Check if $D_{TS}(\sigma_{TS}(Y)) = h(Y)$
   Where
      h = hash function used in creating and checking digital signature (i.e., one-way function)
      D = Algorithm with public key used for decryption and for checking digital signature
      σ = E°h
      Note E and D may also be used for decrypting and encrypting, respectively, when applied in other applications.

The Trusted Agency in addition to its role during system component fabrication and initialization also provides ongoing security for the system by recertifying trusted agents 120 and trusted servers 200 and providing system-wide information on updated untrusted lists and updated PTS(PK) lists.

Trusted agents 120 and trusted servers 200 must be periodically recertified because their certificates are given an expiration date. Trusted servers 200 periodically recertify in order to protect overall system security by changing their cryptographic keys. A time limit is placed on a trusted agent's ability to transact so that if someone breaks into the system he can only use his trusted agent 120 for a predetermined maximum time period (e.g., three months) before needing to recertify. During recertification trusted agents 120 connect with the Trusted Agency to get security information (e.g., updated untrusted lists) and to receive an updated PTS(PK) list.

The public key associated with each primary trusted server 210 never changes. If new primary trusted servers 210 are implemented or old primary trusted servers 210 decommissioned then these corrections to the PTS(PK) list are broadcast to the trusted servers 200 on the Trusted Agency Network 208. These list changes are then distributed to the trusted servers 200 at the identification authority networks 202 and the merchant networks 192, and may be requested by and transferred to trusted agents 120 at any time. Also, list changes are always distributed to trusted agents 120 when their certificates expire and they recertify. New PTS (PK)s are distributed before they are implemented in order to eliminate the possibility of a trusted agent 120 not having them when needed for certificate validation.

The identification numbers of trusted agents 120 or trusted servers 200 which have been identified as untrusted are placed on an untrusted list and distributed by the primary trusted servers 210 to the trusted servers 200 and ultimately to the trusted agents 120 in the same fashion as the PTS(PK) list. Merchants which are deemed untrustworthy will have their trusted servers 200 decommissioned by the Trusted Agency and made identifiable to the trusted agents 120.

Figure 6B:
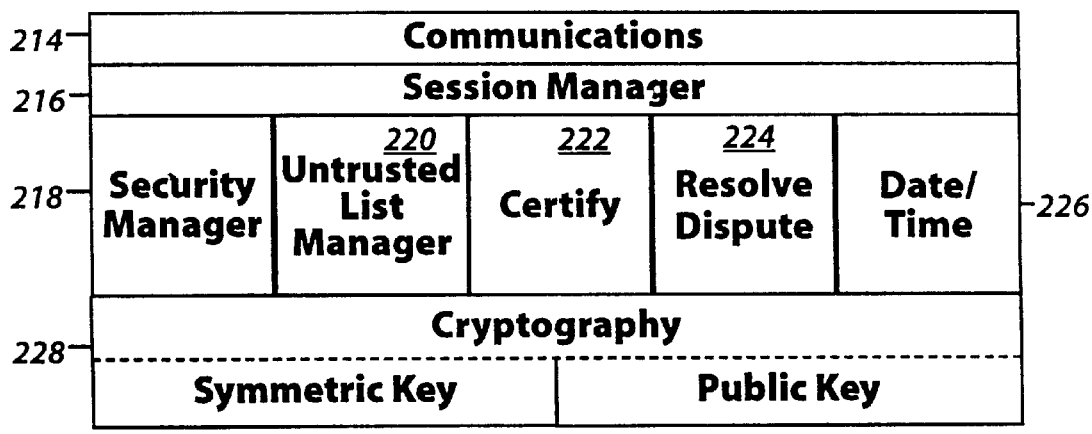
FIG. 6B illustrates the functional components of a (primary) trusted server.

FIG. 6B shows the functional components of a trusted server 200 or a primary trusted server 210. A Communications function 214 provides an interface to the local network. A Session Manager function 216 manages inter-server and server-to-agent sessions. A Security Manager function 218 establishes secure communications. An Untrusted List Manager 220 provides updates to the list of untrusted agents, servers and organizations. A Certify function 222 manages the recertification of trusted agents 120 for the trusted server 200. In the case of the primary trusted server 210, this process recertifies trusted servers 200. A Resolve Dispute function 224 receives tickets 8 and electronic objects (merchandise) to resolve customer complaints. A Cryptography function 228 provides symmetric and public key cryptography to secure communications and authenticate counterparties. A Date/Time function 226 provides current date, time, and time zone information for certificate validation.

The question of trusted agent 120 malfunction or loss is similar to the loss of a receipt, airline ticket, etc. In cases where loss or malfunction need to be overcome, transactor identities may be needed. This can be accomplished by using credentials which identify the customer and the trusted agent 120. The credential and ticket 8 can be saved separately as secondary records. In case of agent malfunction the customer can pursue a dispute as he/she would today by presenting these secondary records.

Flow Charts

The flow charts shown in the following figures use the designations "A" and "B" to indicate two interacting trusted agents 120, or a trusted agent 120 to trusted server 200 interaction. The same designations A and B, may also be applied to the host processor 124 or money module 6 associated with a particular trusted agent 120 (i.e., within the same transaction device 122). The flow charts indicate the functional component primarily responsible for carrying out a given task. For example, SECURITY MANAGER A means that the recited task is carried out by the Security Manager function 144 (see FIG. 4A) in trusted agent A.

The flow charts also call subroutines some of which use parameter designations X and Y. For example, ESTABLISH SESSION A→B is a call to the subroutine Establish Session. The Establish Session flow chart should then be followed with the understanding that X=A and Y=B throughout the flow.

Abort And Commit

In transaction processing of the type contemplated it is desirable to pass electronic items such as tickets 8 and electronic notes between two parties, while maintaining a zero-sum game. In other words, it is undesirable to duplicate electronic items so that at the completion of an electronic transaction there are twice as many items as before the transaction. Similarly, it is undesirable to lose electronic items so that there are fewer items after the transaction than before. For example, if at the start of a transaction A has an electronic ticket 8 and wishes to pass it to B, then it is desirable to ensure that at the end of the transaction, B has the electronic ticket 8 and A does not have the electronic ticket 8. In the real world, however, it is possible to have two other outcomes, namely, both A and B have the same electronic ticket 8 (duplication) or neither A nor B have the electronic ticket 8 (loss).

In order to render the likelihood of duplication or loss negligible, the transaction protocol must take into account the possibility that natural or intentional events may interrupt a typical transaction flow. A natural interruption is exemplified by a breakdown of the communications link between A and B during the transaction. To minimize the possibility of duplication or loss from such a random event the window of opportunity for creating a duplication or loss must be minimized. In order to minimize intentional interruptions (i.e., overt attacks), it is desirable to eliminate the economic incentive for such an attack. For example, if an attacker could only lose the tickets and or the money by trying to interrupt a transaction, the attacker would have no incentive to initiate the attack in the first place.

These concepts are embodied in the efficient transaction protocols of the described system. In particular, it is desirable to ensure consistent abort and commit states between the two transacting trusted agents 120 (or money modules 6). For example, if A commits to a transaction, then B should also commit to the transaction; or, if A aborts the transaction, then B should also abort the transaction. To achieve consistency and minimize the possibility of duplication or loss (in the event there is an inconsistency) the transaction protocols take into account the order and timing of A's and B's committing to a given transaction.

FIG. 7 shows two subroutines, Abort and Commit. The abort subroutine is internally executed within a given trusted agent 120 when the transaction it is involved in fails. The abort subroutine rolls back or returns the trusted agent 120 to the exact state it was in prior to being involved with the failed transaction. Conversely, the commit transaction is internally executed within a given trusted agent 120 when the transaction it is involved in has been successfully completed. The trusted agent 120 therefore records the completed transaction in its transaction log and is now ready for a new transaction. For example, during a ticket transfer transaction an electronic ticket 8 is passed from trusted agent A to trusted agent B. Since at this point in time neither A nor B have committed or aborted the transaction, A provisionally retains the ticket 8 while B provisionally also has the ticket 8. If both A and B commit then A will delete its ticket 8, and B's retention of the ticket 8 will no longer be provisional. If, however, both A and B abort then A will retain its ticket 8 and the ticket 8 that B was retaining provisionally will be deleted by rolling back the transaction. Note that the deletion operation may be implemented in various ways well known in the art. As mentioned before, it is desirable to minimize the possibility of one trusted agent 120 committing while another trusted agent 120 aborts because this may in some limited circumstances result in duplicating or losing electronic items.

A similar situation exists with respect to money modules 6 exchanging electronic notes. During a purchase transaction, electronic notes are passed from money module A to money module B, so that A provisionally decrements its electronic notes (by the amounts transferred) while B provisionally has electronic notes (in the transferred amount). If both A and B commit then A will retain the notes in the decremented amounts and B's retention of the electronic notes will no longer be provisional.

Figure 7A:
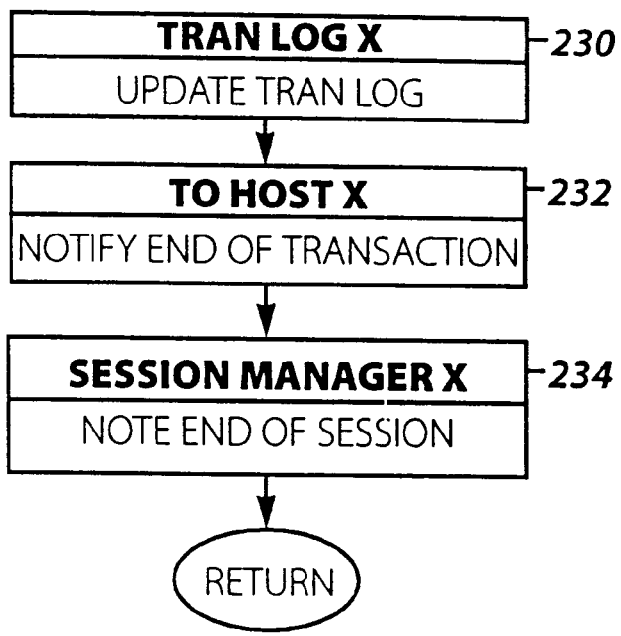
FIG. 7A illustrates a Commit protocol.

FIG. 7A shows the commit subroutine. Tran Log X updates the transaction log. To Host X notifies the host that the transaction is complete. Session Manager X notes the end of the session. (Steps 230–234).

Figure 7B:
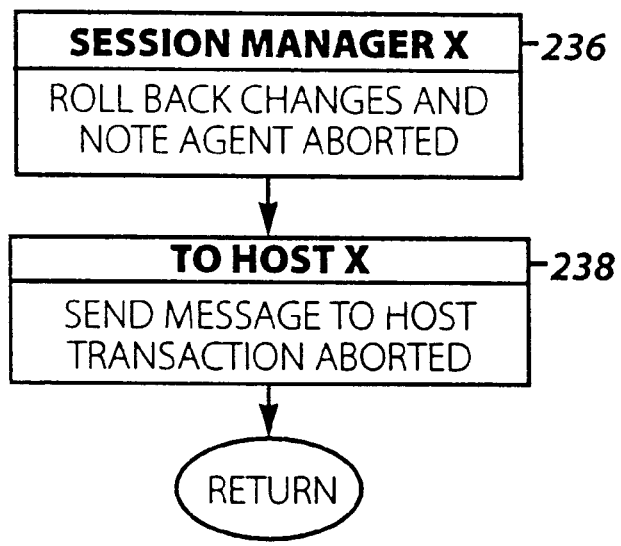
FIG. 7B illustrates an Abort protocol.

FIG. 7B shows the abort subroutine. Session Manager X rolls back changes and notes agent aborted. The Session Manager keeps track of what has been done since the start of a session and when rolling back undoes these steps. To Host X sends a message to the host that the transaction is aborted. (Steps 236–238).

The abort subroutine may be called directly from a flow diagram, for example, when a trusted agent 120 determines that a certificate is not valid. The abort subroutine may also be called when an expected action does not occur. In particular, when two trusted agents 120 are communicating, they will be monitoring a time-out protocol. For example, after a first trusted agent 120 has sent a message to a second trusted agent 120, the Session Manager of the first trusted agent (A) will set a timer for a reply if a reply is required. The Session Manager may also number the message sent. This number would appear in the reply message from the Session Manager of the second trusted agent (B).

If the timer expires before the message has been received, then Session Manager A will query Session Manager B to determine if the transaction is still running in B. If B does not reply then Session Manager A will abort the transaction. If a reply is received that the transaction is proceeding, then the timer will be reset to a new time. If A queries B a predetermined number of times without receiving a reply to the original message, then A will abort the transaction. A similar time-out function exists in the money modules 6.

Recertify Trusted Agent

Figure 8A:
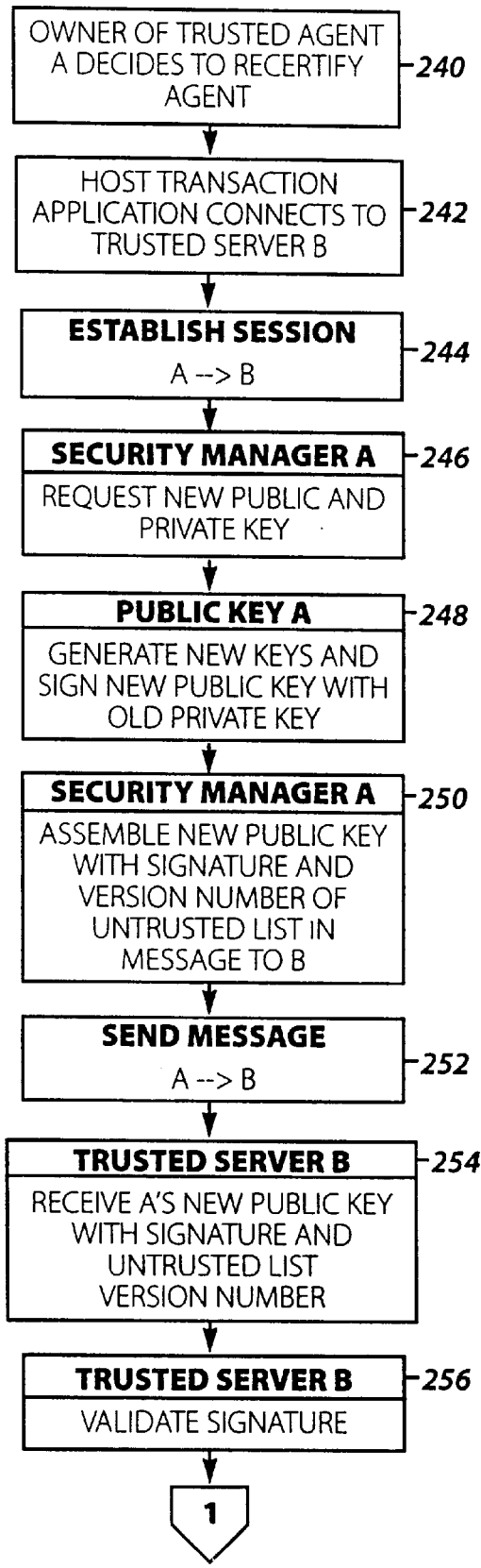
FIGS. 8A–8C illustrate a Recertify Trusted Agent protocol.
Figure 8B:
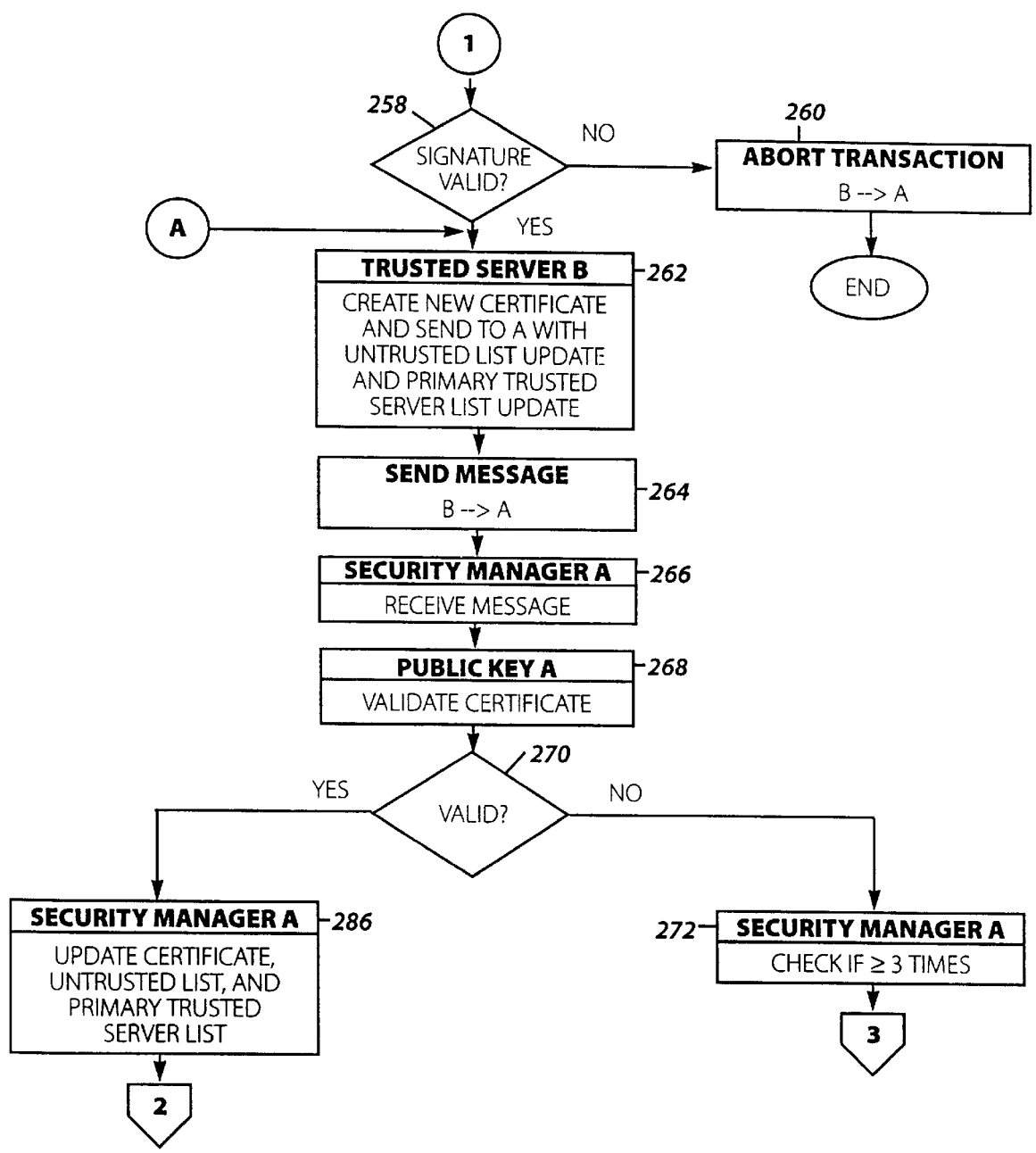
Figure 8C:
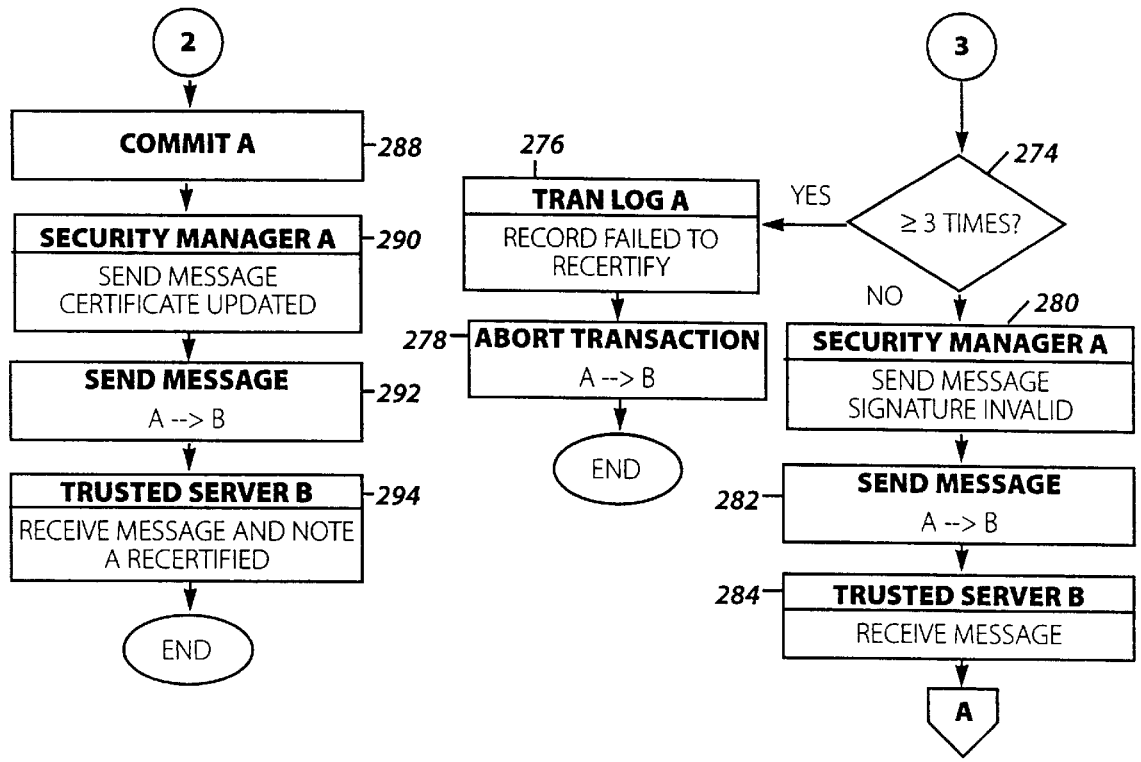
Figure 9A:
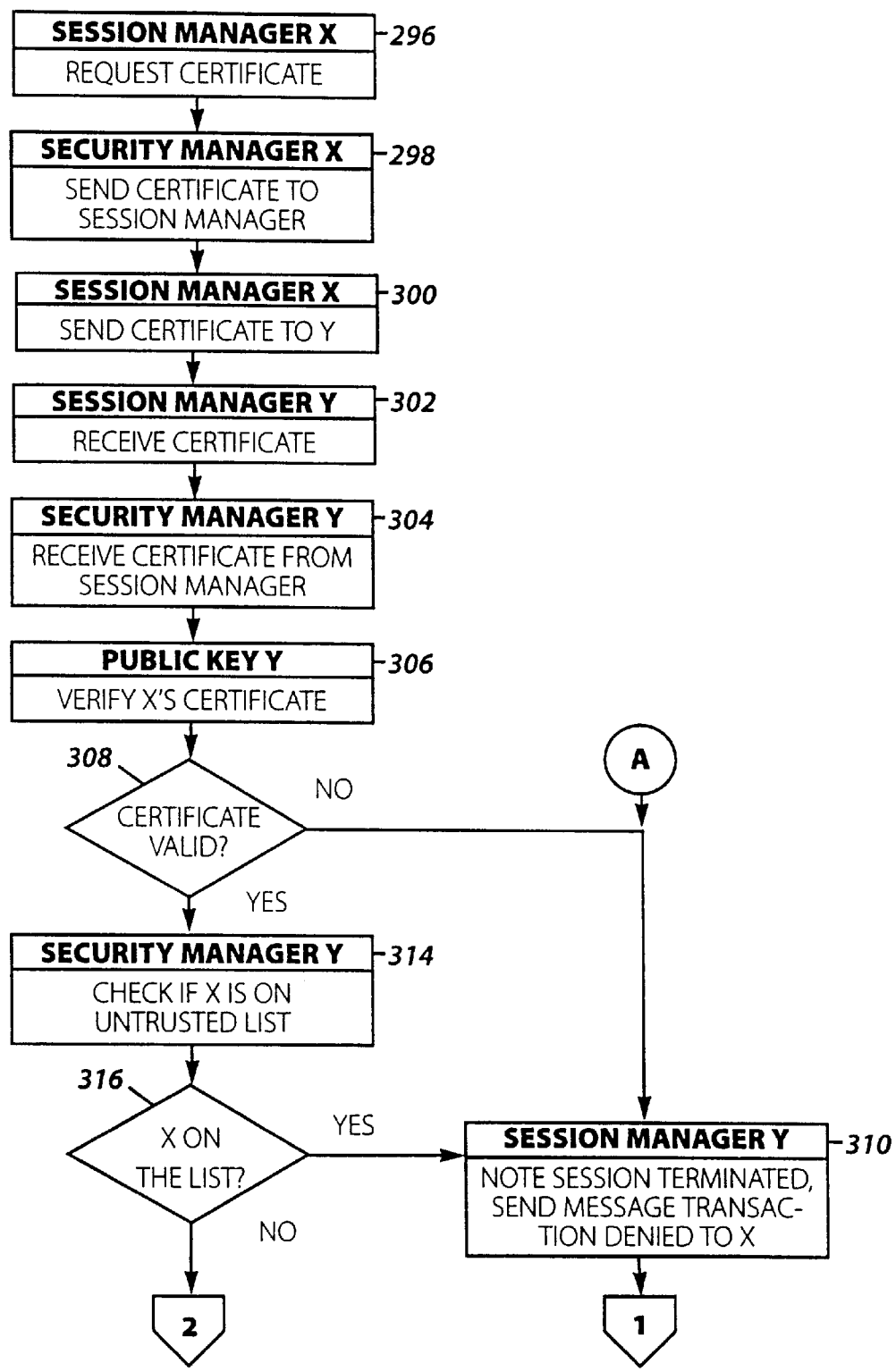
FIGS. 9A–9E illustrate an Establish Session protocol.
Figure 9B:
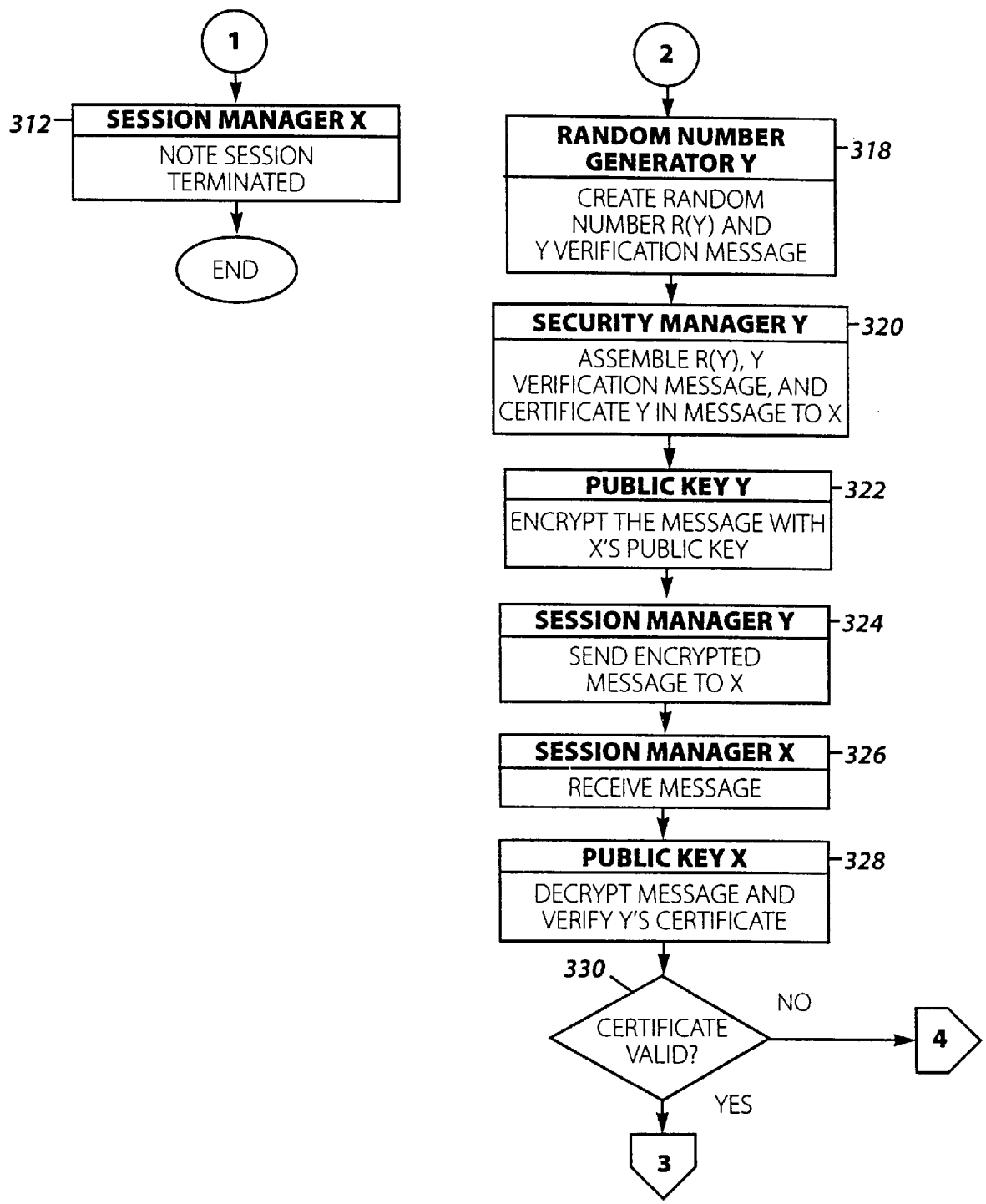
Figure 9C:
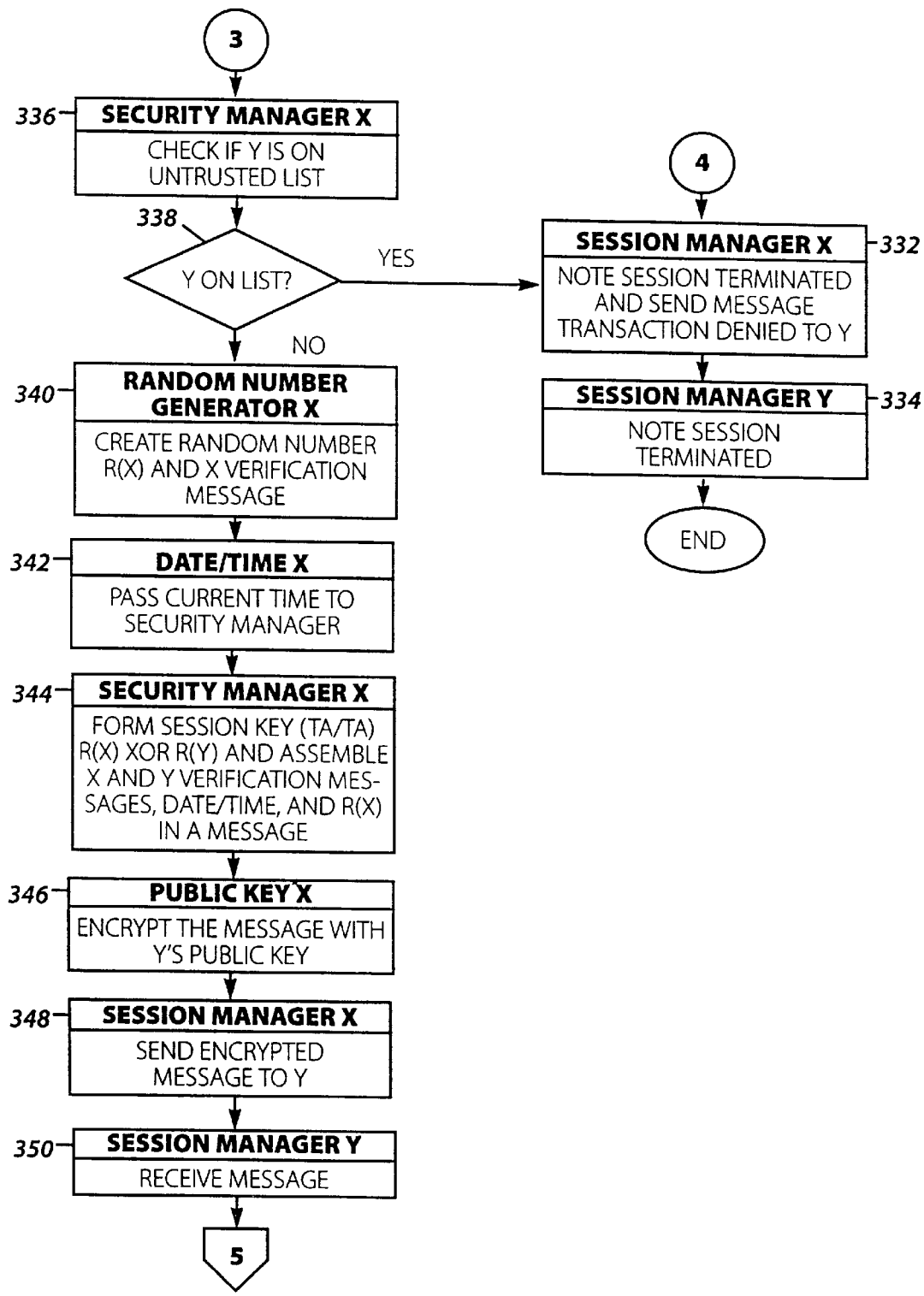
Figure 9D:
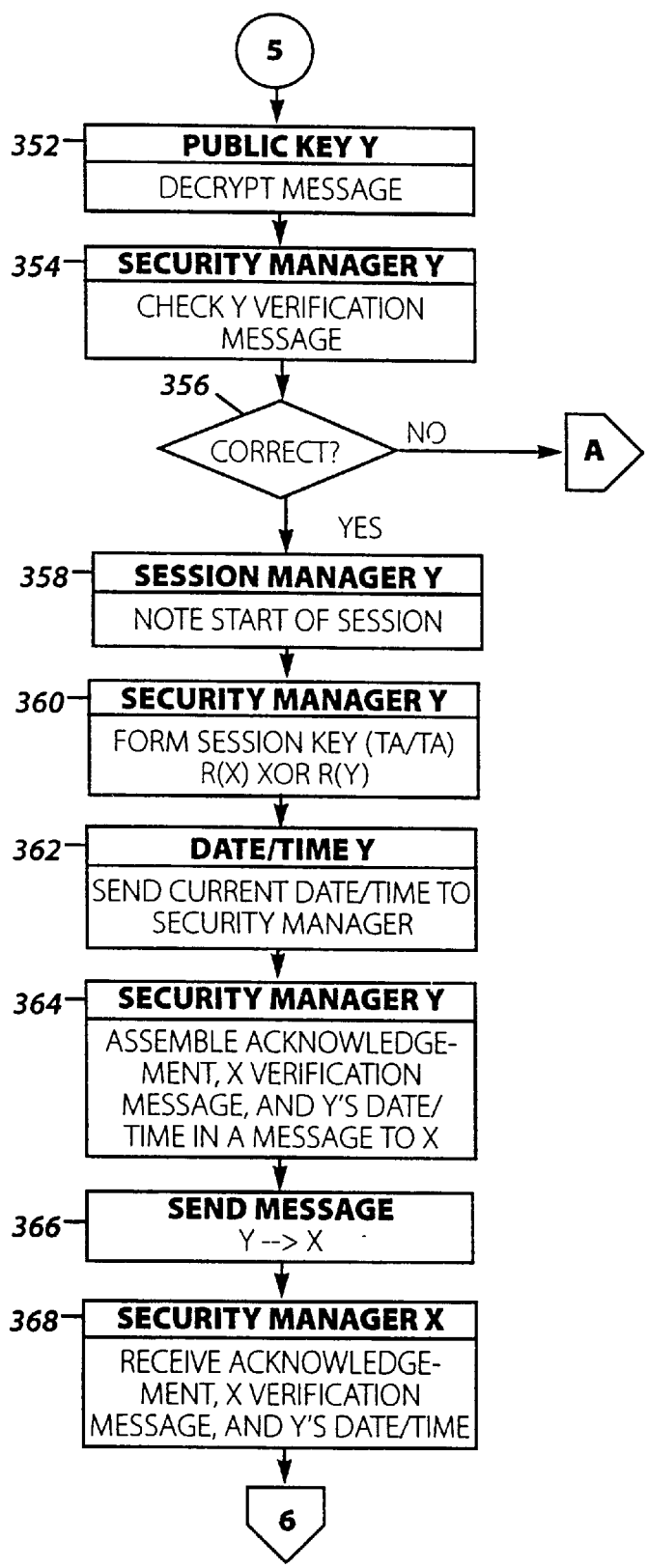
Figure 9E:
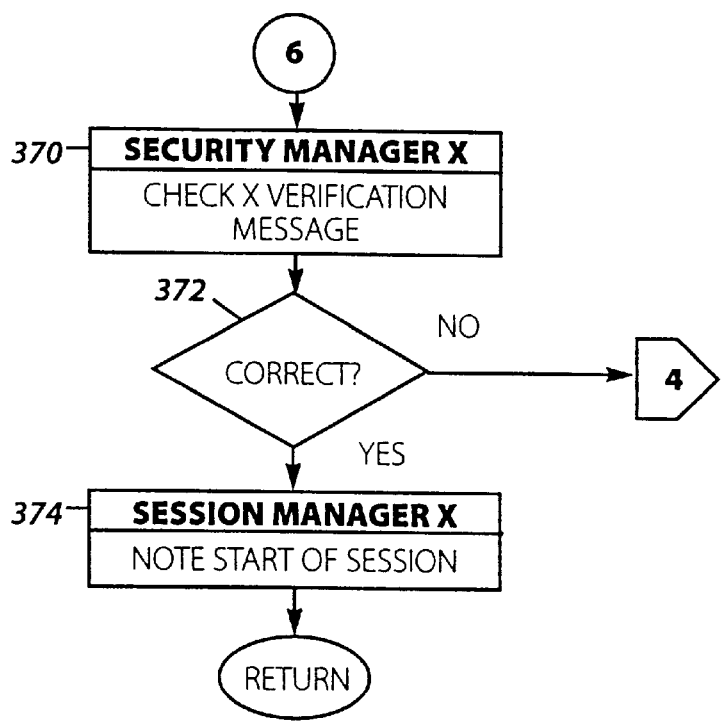

FIG. 8 shows the flow chart for recertifying a trusted agent. When the owner of trusted agent A decides to recertify his agent, typically after or near the expiration date of his current cert (TA), a host transaction application from the host processor embedded in his transaction device connects to a trusted server B (steps 240–242).

An Establish Session subroutine is called (step 244) for setting up a cryptographically secure communication channel between trusted agent A and trusted server B. Referring to FIG. 9, the Session Manager of trusted agent A requests and then receives A's certificate (i.e., cert(TA)) from the Security Manager (steps 296–298). Session Manager A then sends cert(TA) to trusted server B's Session Manager which, in turn, passes it along to its Security Manager (steps 300–304).

Trusted server B's Public Key function verifies the cert (TA) by using the validation protocols described in the previous discussion on system security (steps 306–308). However, there is the caveat that when Establish Session is called during a revalidation procedure, the previously described certificate validation protocol does not terminate if it determines that the certificate has expired—that is the reason the trusted agent is recertifying.

If cert(TA) is not valid, then Session Manager B notes that the session is terminated and informs Session Manager A that the transaction is denied. Session Manager A also notes that the session is terminated. (Steps 310–312). If cert(TA) is valid, then Security Manager B checks if trusted agent A is on the untrusted list (steps 314–316). If trusted agent A is untrusted, then the session is terminated (steps 310–312).

If A is not on the untrusted list, then Random Number Generator B creates a random number R(B) and also a B verification message (step 318). The random number R(B) will eventually be used to form a session key. The B verification message is a random number used by B to protect against message replay. Next, Security Manager B assembles R(B), the B verification message, and cert(TS) into a message for trusted agent A (step 320). Public Key B encrypts the message using trusted agent A's public key (TA(PK)) which trusted server B received with A's cert(TA) (step 322). Session Manager B sends the encrypted message to A's Session Manager (steps 324–326).

Public Key A decrypts the message using its private key (corresponding to its public key) and verifies the validity of cert(TS) (steps 328–330). If cert(TS) is invalid, then Session Manager A notes the session as terminated and sends a transaction denial message to B whose Session Manager also notes the session as terminated (steps 332–334). If cert(TS) is valid, then Security Manager A checks if trusted server B is on the untrusted list (steps 336–338). If trusted server B is on the list, the session is terminated (steps 332–334).

If B is not on the untrusted list, then Random Number Generator A creates a random number R(A) and an A verification message (e.g., another random number) (step 340). The Date/Time function passes the current date and time to the Security Manager (step 342). Dates and times are exchanged by A and B for eventual recording in their trans logs during commits. Security Manager A then forms and stores session key (TA/TA) by exclusive ORing random numbers R(A) and R(B) (step 344). Session key (TA/TA) is used to encrypt communications between two trusted agents 120 or between a trusted agent 120 and a trusted server 200 (as in the present case where Establish Session is called during recertification). Session Manager A assembles a message containing the A and B verification messages, the date/time information, and R(A) (step 344). Public Key A encrypts the message with trusted server B's public key (received by A in cert(TS)) and sends the encrypted message to trusted server B's Session Manager (steps 346–350).

Public Key B decrypts the received message using its secret key (corresponding to its public key) (step 352). Security Manager B checks if the B verification message received from A is the same B verification message it previously sent to A (steps 354–356). If it is not the same, then the session is terminated (steps 310–312). If it is the same, then Session Manager B notes the start of the session (step 358).

Security Manager B forms session key (TA/TA) by R(A) XOR R(B) and then stores the session key (step 360). At this point, both A and B have created and stored the same session key (i.e., session key (TA/TA)) to be used for their current interaction in recertifying A's certificate. Next, Date/Time B sends its current date and time information to Security Manager B (step 362). Security Manager B assembles a message having an acknowledgement to A, the A verification message, and B's date/time information (step 364). The Send Message subroutine is then called (step 366) for sending the message from B to A.

Figure 10:
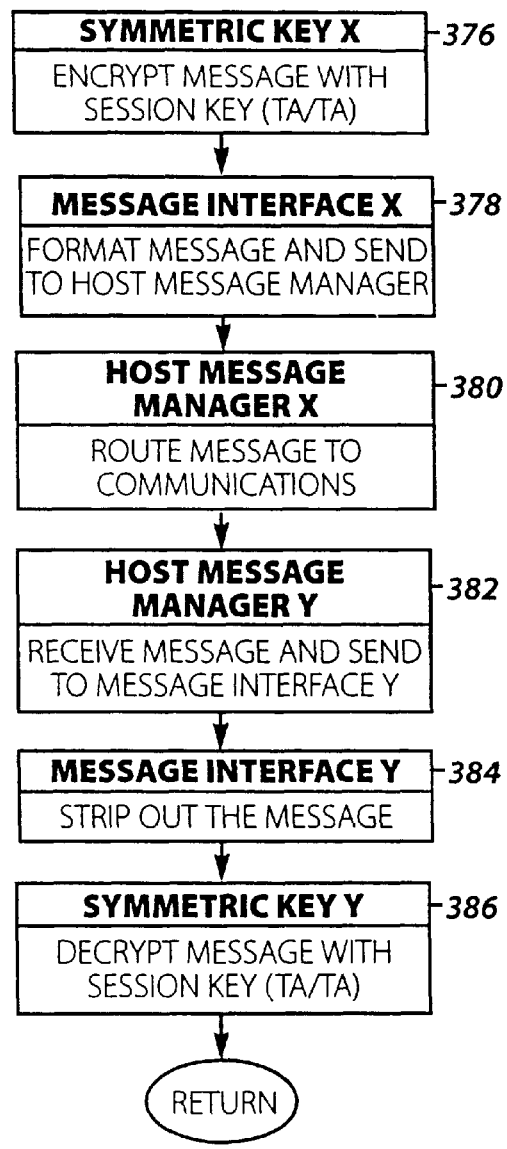
FIG. 10 illustrates a Send Message protocol.

Referring to FIG. 10, trusted server B's Symmetric Key function encrypts the message using session key (TA/TA) (step 376). Message Interface B then formats the message and sends it to the host processor's Message Manager (step 378). Host Message Manager B then routes the message via Communications to Host Message Manager A in trusted agent A's host processor (step 380). Host Message Manager A then sends the message to trusted agent A's Message Interface which strips out the message (steps 382–384). Symmetric Key A decrypts the message with session key (TA/TA) thus completing the secure communication of a message between trusted server and trusted agent using session key (TA/TA) (step 386).

Referring again to FIG. 9, Security Manager A receives the acknowledgement, A verification message and B's date/time information (step 368). Security Manager A checks if the A verification message is the same A verification message which A previously sent to B (steps 370–372). If it is not the same, then Session Manager A terminates the session (steps 332–334). If it is the same, then Session Manager A notes the start of the session (step 374).

Referring back to FIG. 8, the recertification process continues. Security Manager A requests Public Key A to generate a new public and private key pair and, further, to digitally sign the new public key with the old private key (corresponding to the old TA(PK)) (steps 246–248). As has been described, a trusted agent's public and private key pair are used in establishing a session between trusted agents 120 or between a trusted agent 120 and a trusted server 200.

Security Manager A assembles a message containing the new signed public key and the current version number of the untrusted list (step 250). Each change to the untrusted list will have a new version number, so the trusted server need only send changes to the list. The message is then sent to trusted server B using the Send Message subroutine (step 252). Trusted server B receives the message and checks if the digital signature on the new public key is valid (by using trusted agent A's old public key) (steps 254–258). If the signature is not valid, then the Abort Transaction subroutine (step 260) is called.

Figure 11:
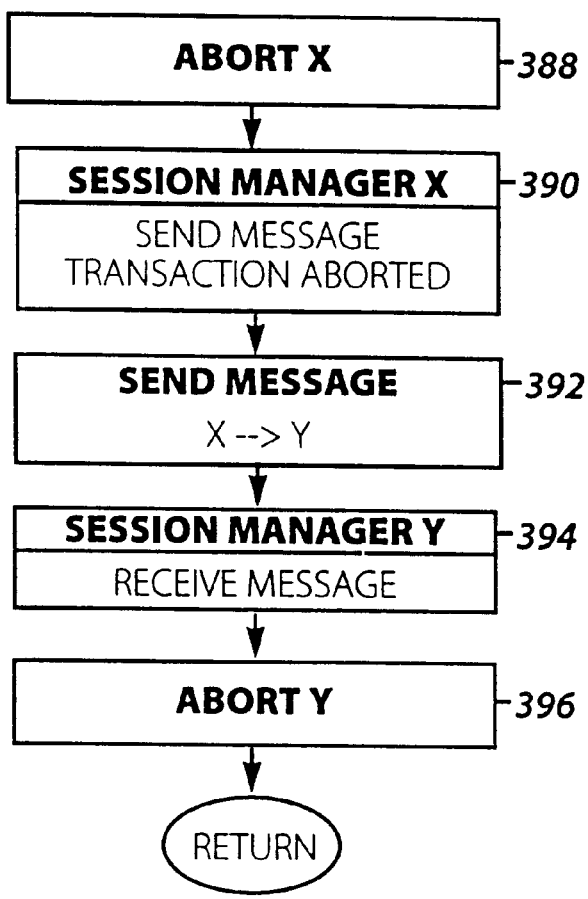
FIG. 11 illustrates an Abort Transaction protocol.

Referring to FIG. 11, trusted server B aborts (step 388) and its Session Manager sends a message to trusted agent A's Session Manager informing A that B has aborted (steps 390–394). Trusted agent A then aborts (step 396).

Referring back to FIG. 8, if the signature on the new public key is valid, then trusted server B creates a new certificate (cert(TA)) containing the new public key and a new expiration date. The new certificate is then sent back to A along with an untrusted list update and a PTS(PK) list update (steps 262–264). Security Manager A receives this message and has Public Key A check if the new certificate is valid (steps 268–294).

If not a valid certificate then, Security Manager A checks if trusted server B has attempted to create a new certificate fewer than three times (step 274). If this is the case, then Security Manager A sends a message to trusted server B to retry creating the certificate (steps 280–284). If the trusted server is unable to create a valid cert(TA) then Tran Log A records the failed attempt and aborts the transaction (steps 276–278).

If the trusted server sends a valid new cert(TA), then Security Manager A updates the cert(TA), the untrusted list, and the PTS(PK) list (step 286). Trusted agent A then commits (step 288). Security Manager A sends a message to the trusted server that the trusted agent has updated its certificate. Trusted server B then notes that A has been recertified. (Steps 290–294).

Purchase of Electronic Merchandise

Figure 12A:
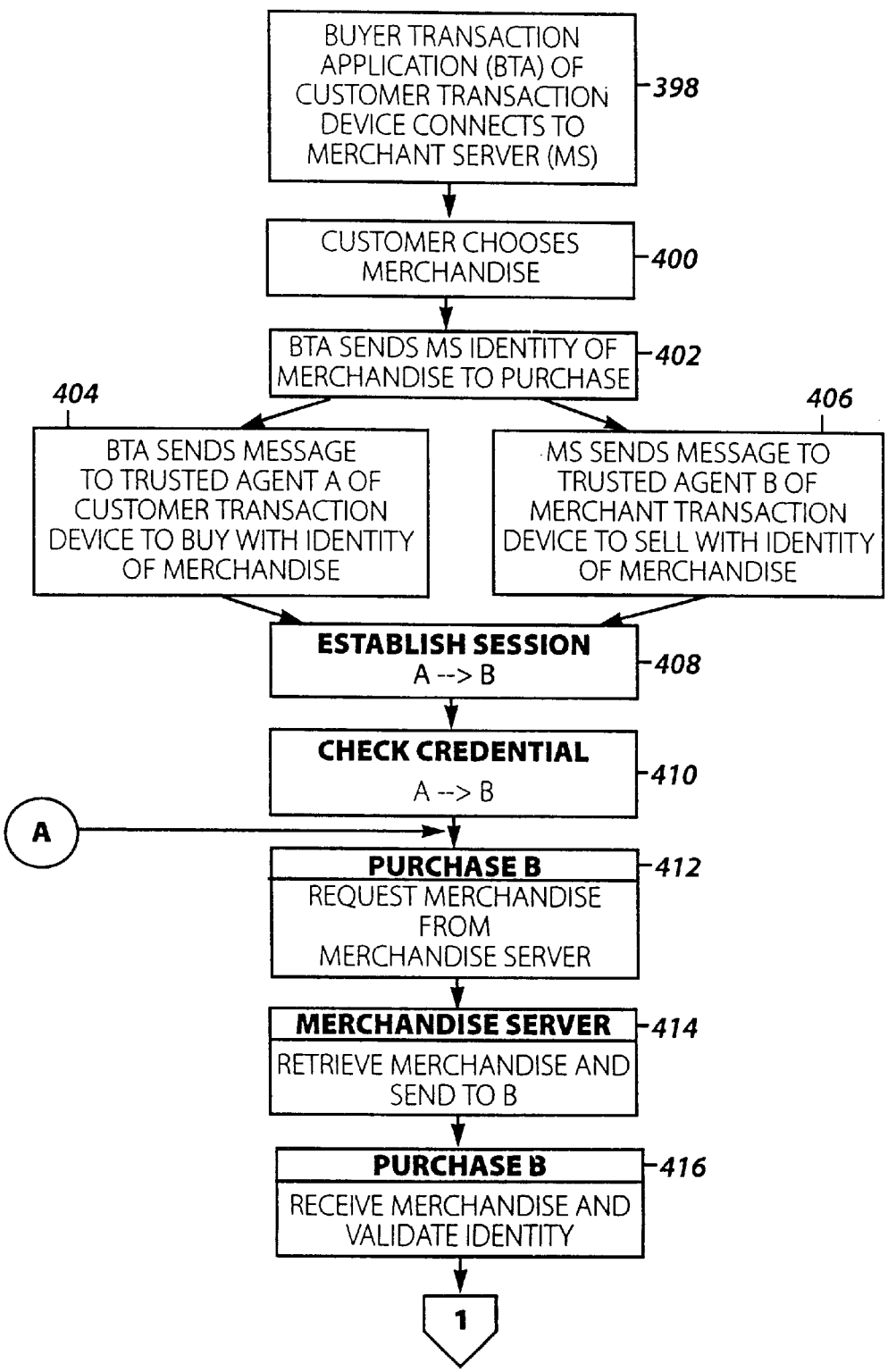
FIGS. 12A–12B illustrates a Purchase of Electronic Merchandise protocol.
Figure 12B:
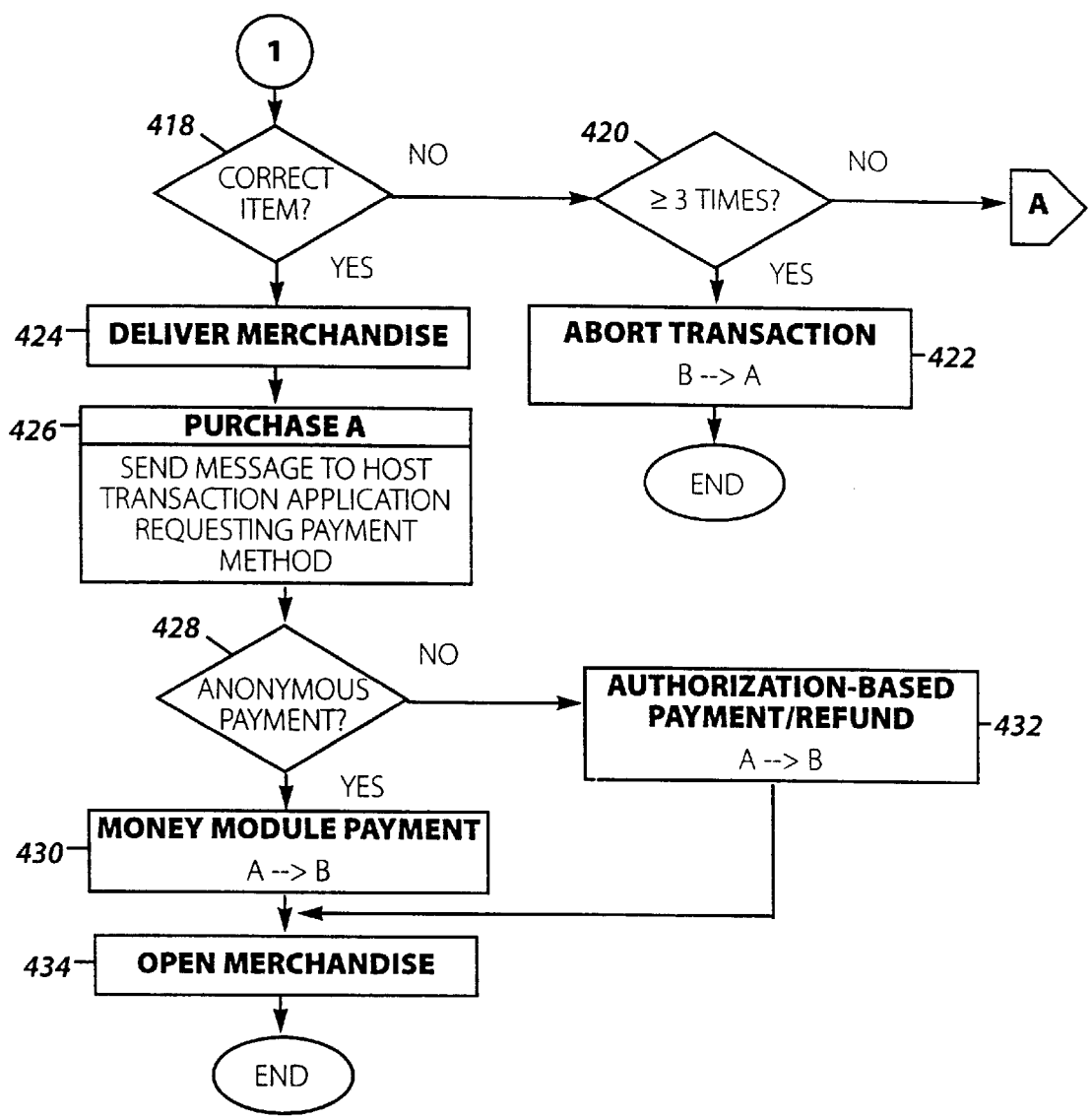
Figure 26:
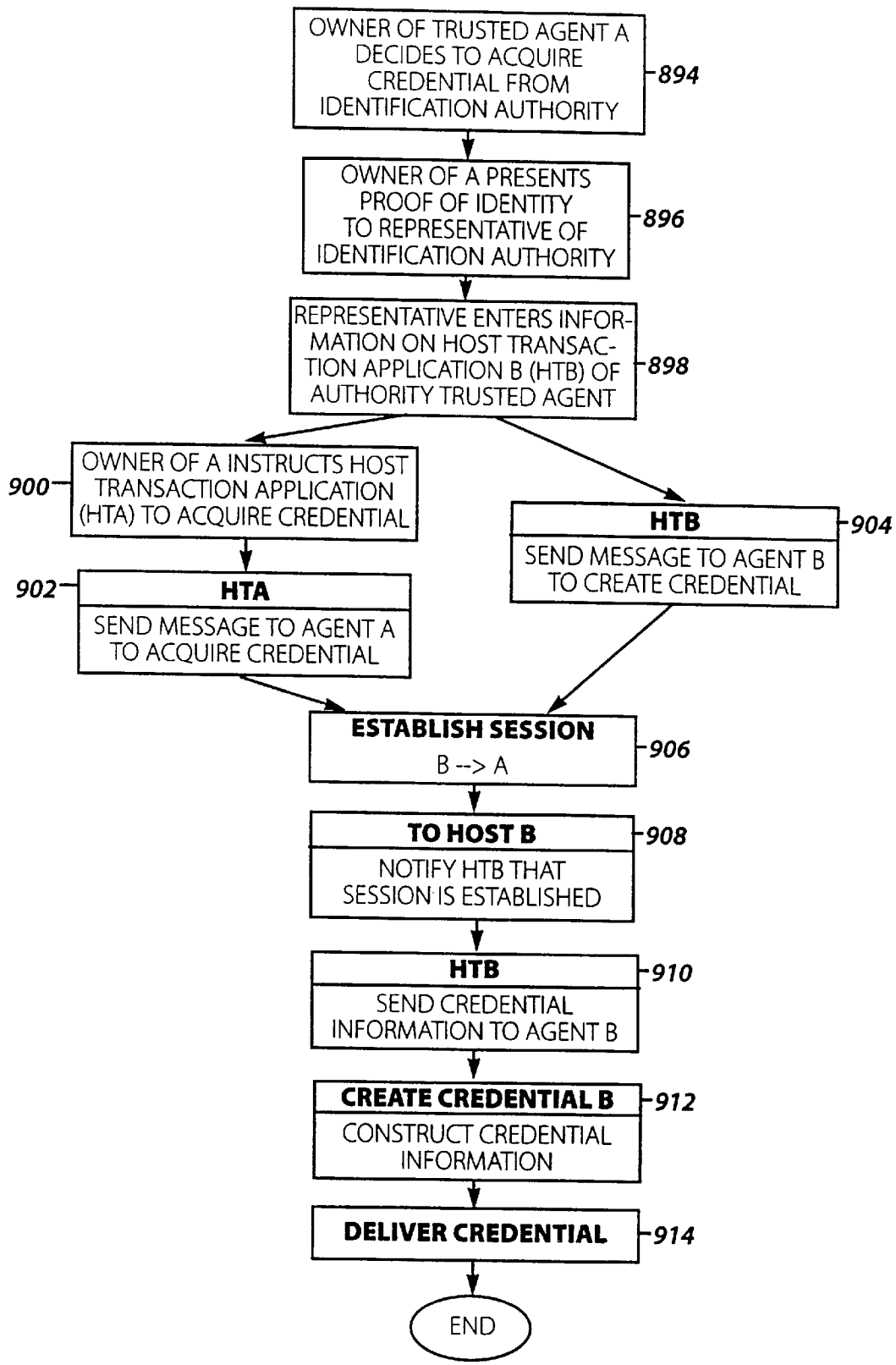
FIG. 26 illustrates an Acquire Credential protocol.

The purchase of electronic merchandise is described with reference to FIG. 12. Items purchased in accordance with the flow diagram of FIG. 12 include electronic objects and their associated decryption tickets, transportation tickets, event tickets and communications tickets. Credentials, on the other hand, are obtained using the Acquire Credential flow diagram (FIG. 26). A buyer transaction application (BTA) in the host processor 124 of a CTD 188 connects to the merchant server 194 of a merchant network 192. The BTA allows the buyer to browse the seller's merchandise and make a selection (steps 398–400). The BTA sends the identity of the selected merchandise to the merchant server 194 (step 402). The BTA then sends a message to trusted agent A (within the same CTD) instructing trusted agent A to buy and identifying the selected merchandise. Also, the merchant server sends a message to trusted agent B of the MTD 198 instructing trusted agent B to sell and identifying the selected merchandise (steps 404–406).

Figure 13:
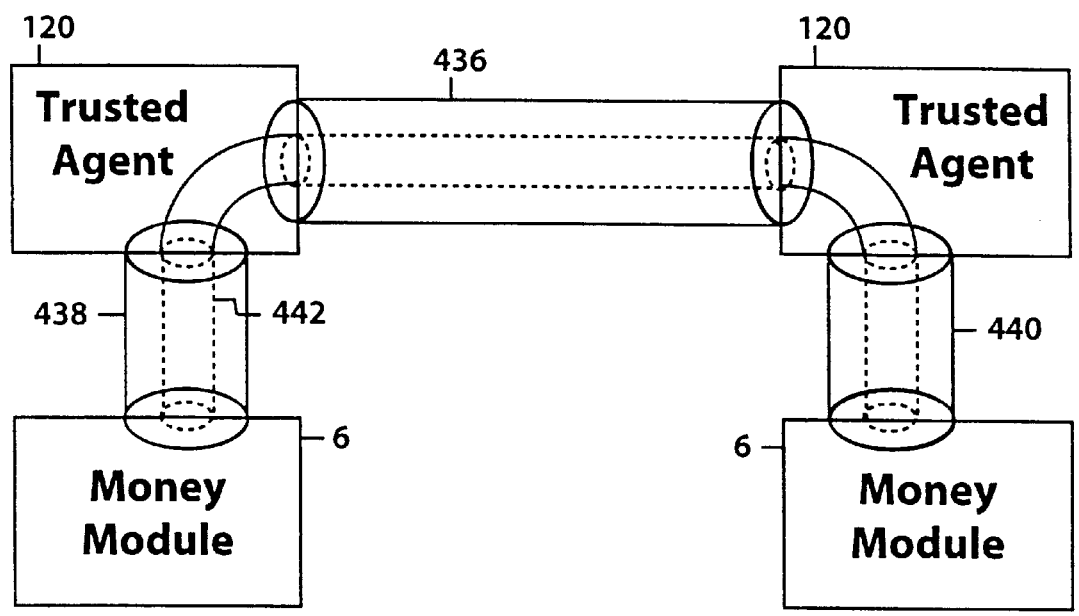
FIG. 13 shows the various message encryption layers established among trusted agents and money modules.

A session is then established between trusted agent A and trusted agent B where both A and B may now communicate using the newly created session key (TA/TA) (step 408). Referring to FIG. 13, there is shown four encryption channels established during a purchase transaction. Encryption channel 436 between the two trusted agents 120 carries messages encrypted by session key (TA/TA). Channels 438 and 440 between a trusted agent 120 and its money module 6 share session key (TA/MM). Channel 442 between money modules 6 in different transaction devices 122 use session key (MM/MM).

Figure 14:
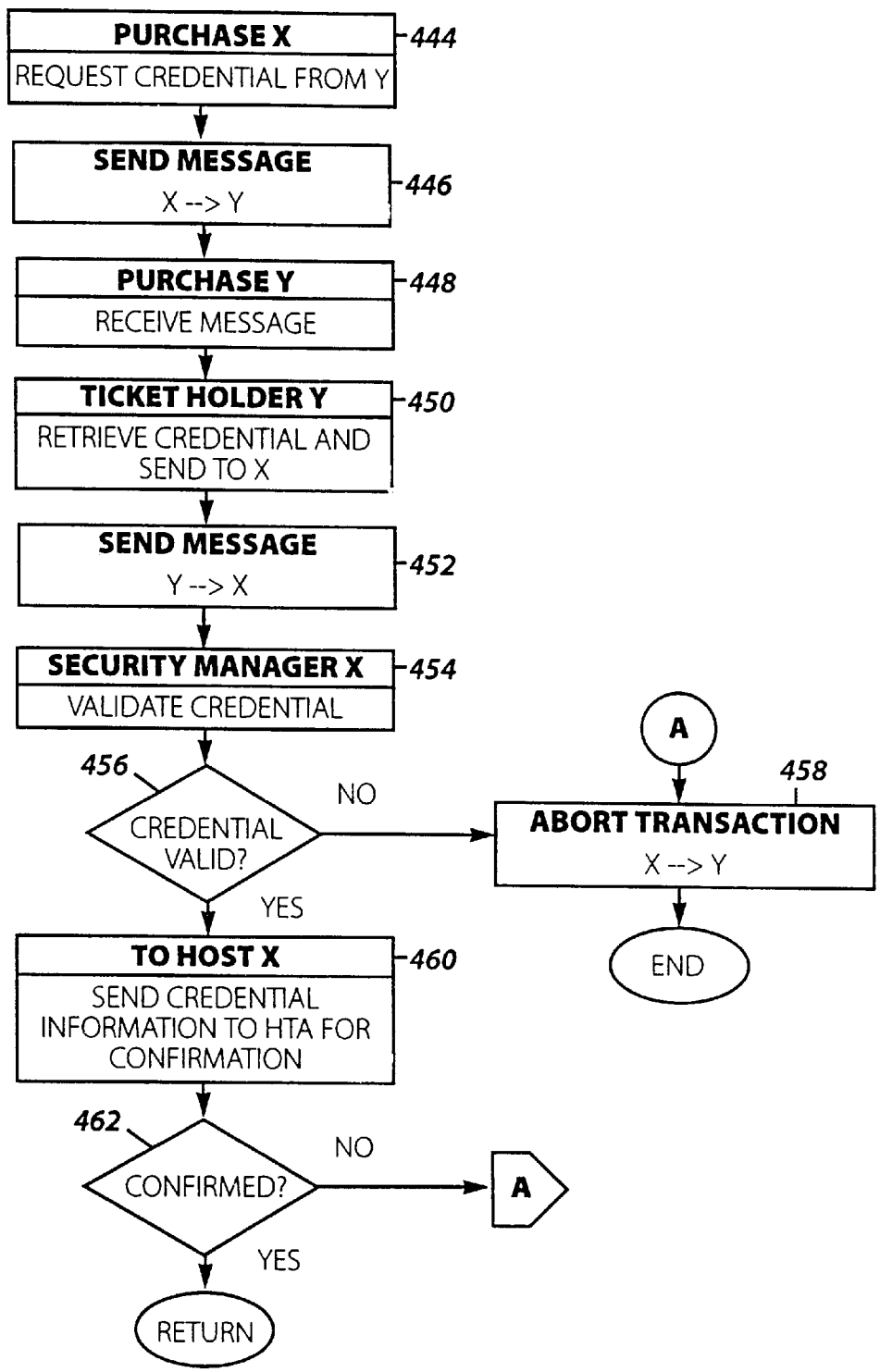
FIG. 14 illustrates a Check Credential protocol.

Referring again to FIG. 12, the Check Credential subroutine is called (step 410). All MTDs 198 contain a credential identifying the owner/merchant (e.g., NYNEX, Ticketron, etc.). Such merchant credentials may, for example, be issued by a merchant identification authority controlled by the Trusted Agency. On the other hand, customer credentials held by CTDs 188 may include driver's licenses or credit cards issued by various identification authorities. Referring to FIG. 14, Purchase A sends a message to Purchase B of trusted agent B requesting its merchant credential (steps 444–448). Ticket Holder B retrieves its merchant credential and sends the credential to A for validation (steps 450–456).

Credentials or any other type of ticket 8 are validated as follows:

1) Validate issuer certificate and check issuer signature.
2) Verify each transfer—match receiver and sender identifiers (i.e., $S_o$=Issuer, $R_o$=1st receiver, then $R_i=S_{i+1}$, $i \geq o$).
3) Validate each sender certificate and check each sender signature.
4) Verify that the last receiver identifier matches the identifier (TA(id)) of the certificate (cert(TA)) of the trusted agent in the current session.

If the merchant's credential is not valid, then the transaction is aborted (step 458). If the merchant's credential is valid, then To Host A sends the credential information to a host transfer application for confirmation (e.g., visual confirmation of merchant name by CTD holder) (steps 460–462).

Referring again to FIG. 12, Purchase B requests the selected merchandise from the merchandise server, which retrieves the merchandise and sends it to Purchase B for identity validation (steps 412–418). If the item is incorrect, then merchandise retrieval is attempted twice more before the transaction is aborted (steps 420–422). If the correct merchandise is received by trusted agent B, then the Deliver Merchandise subroutine is initiated (step 424).

Figure 15A:
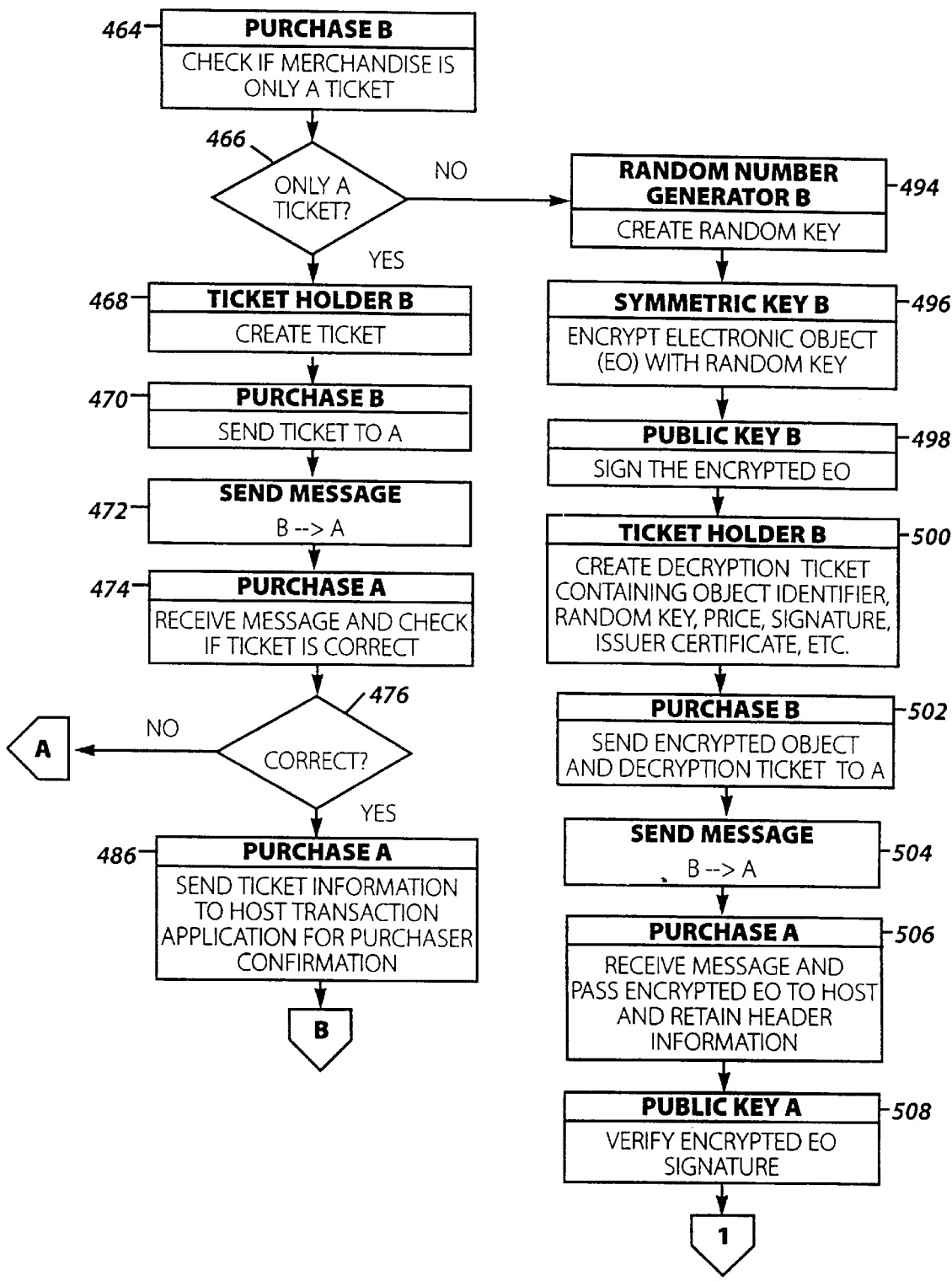
FIGS. 15A–15B illustrate a Deliver Merchandise protocol.
Figure 15B:
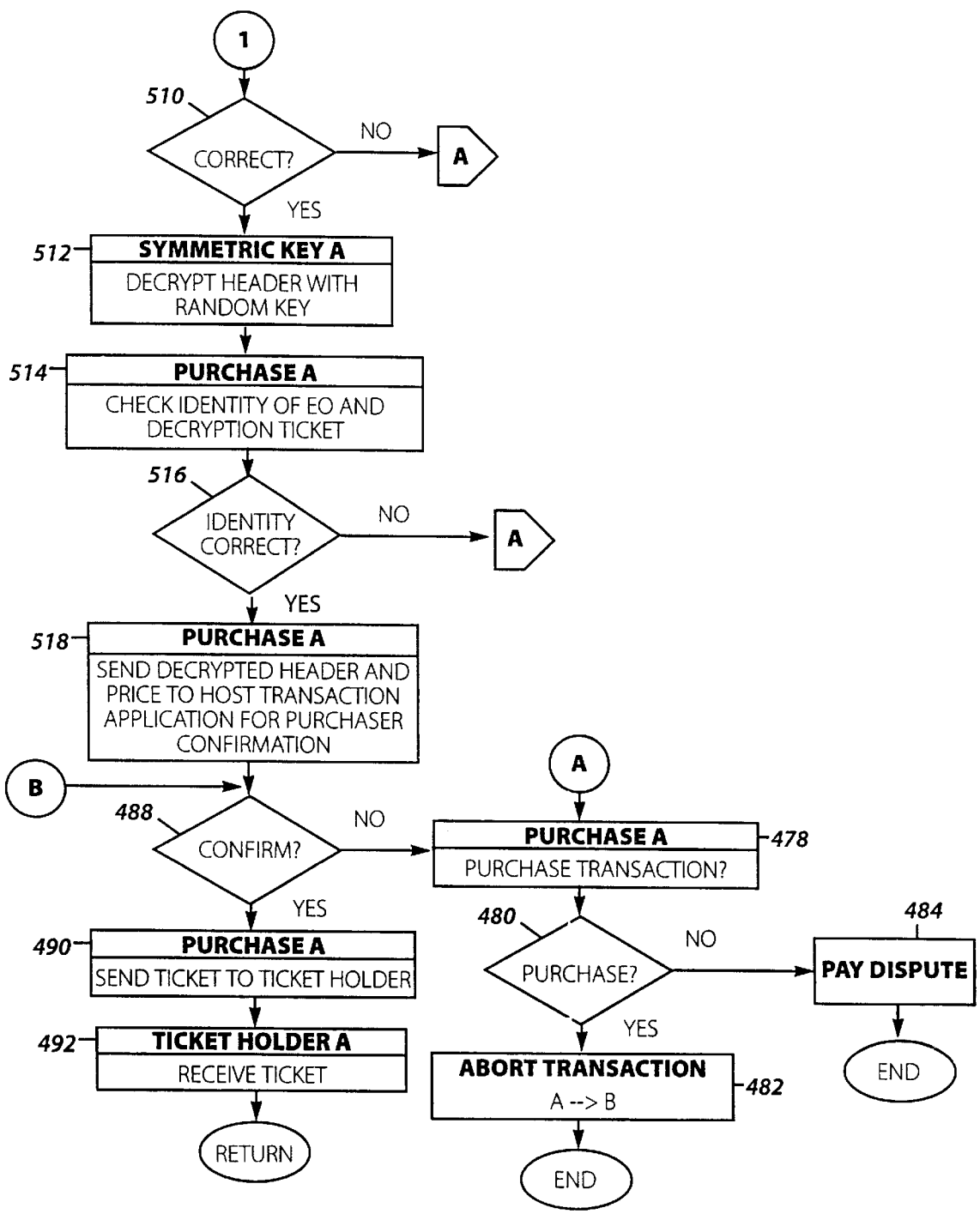
Figure 16A:
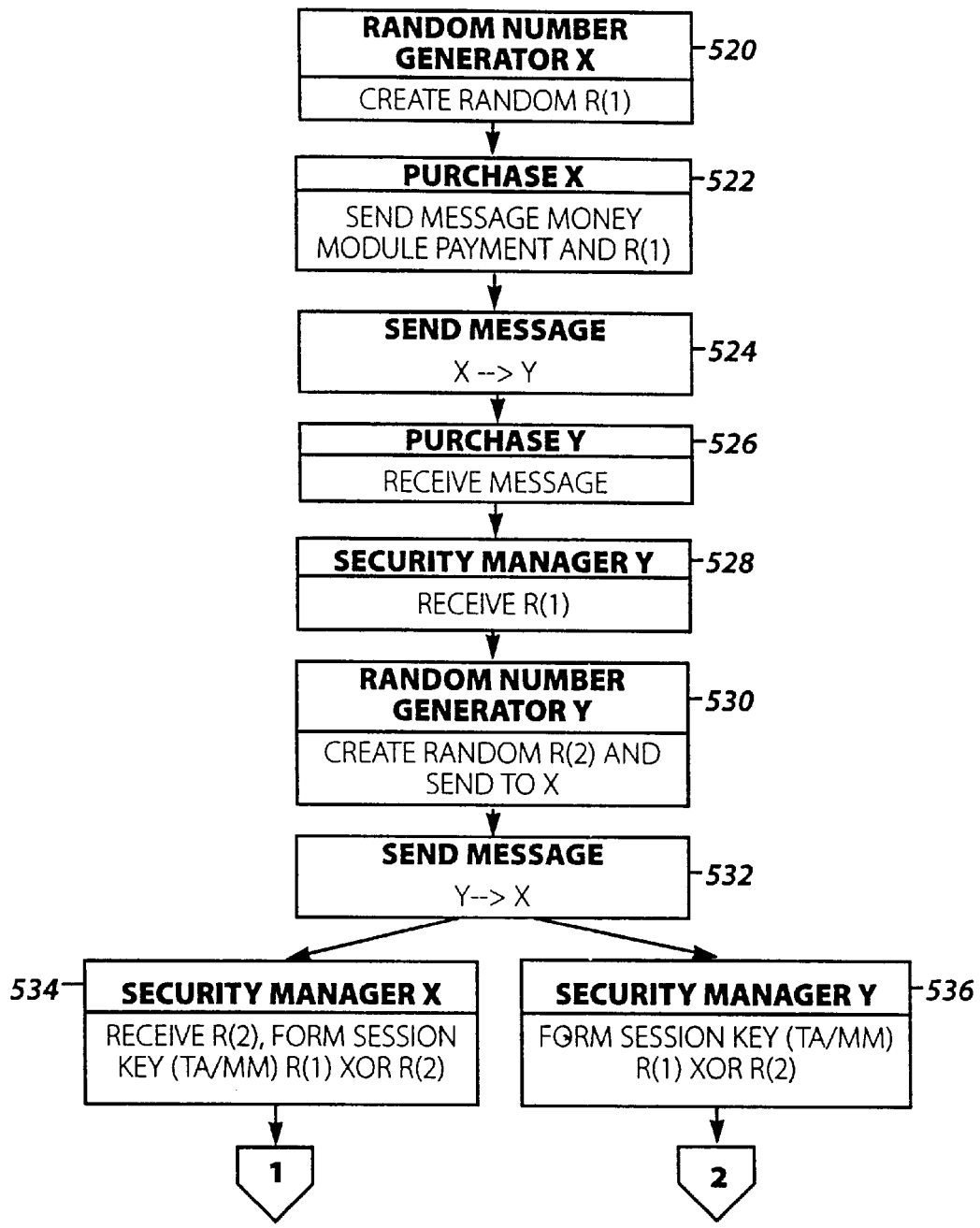
FIGS. 16A–16E illustrate a Money Module Payment protocol.
Figure 16B:
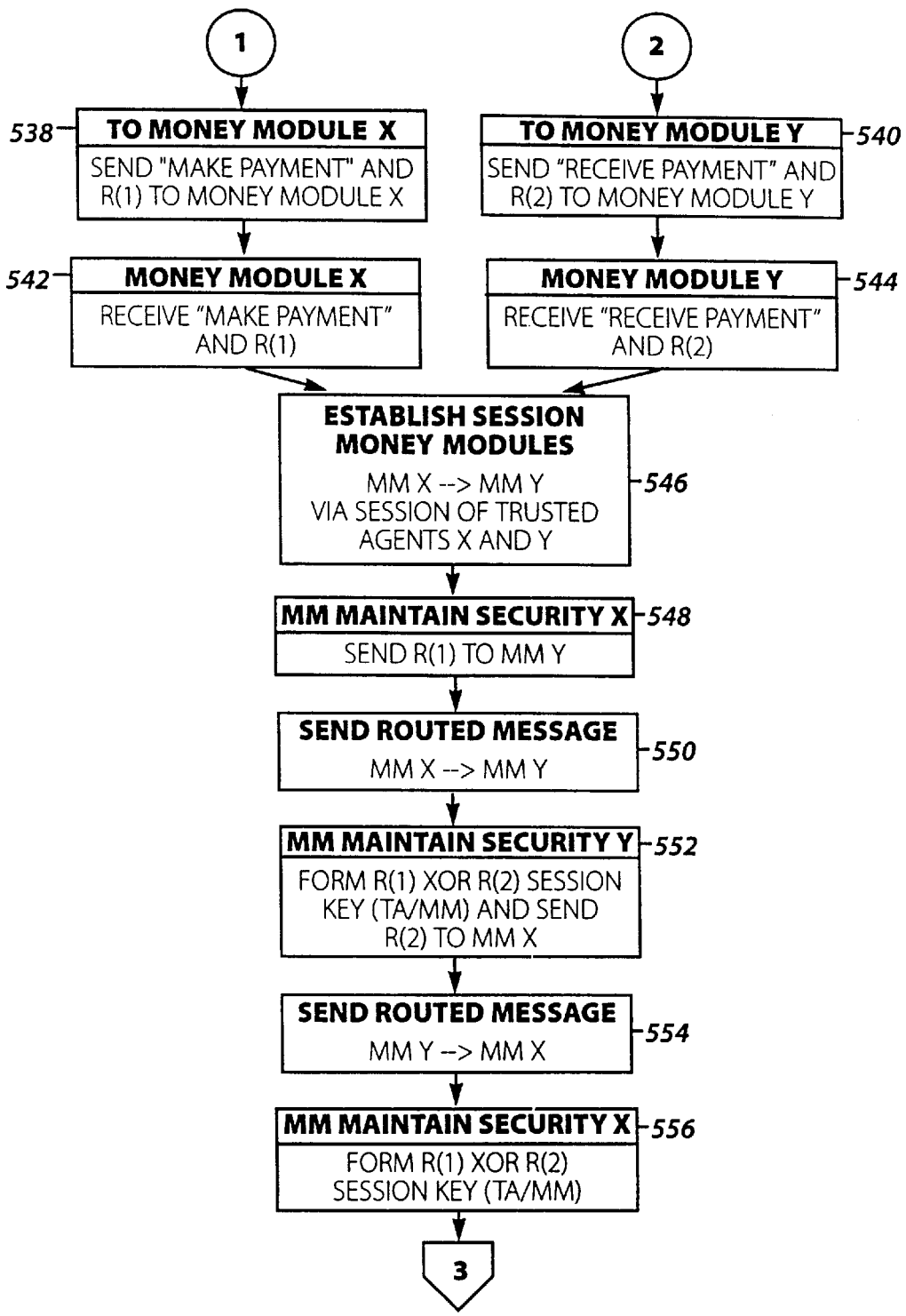
Figure 16C:
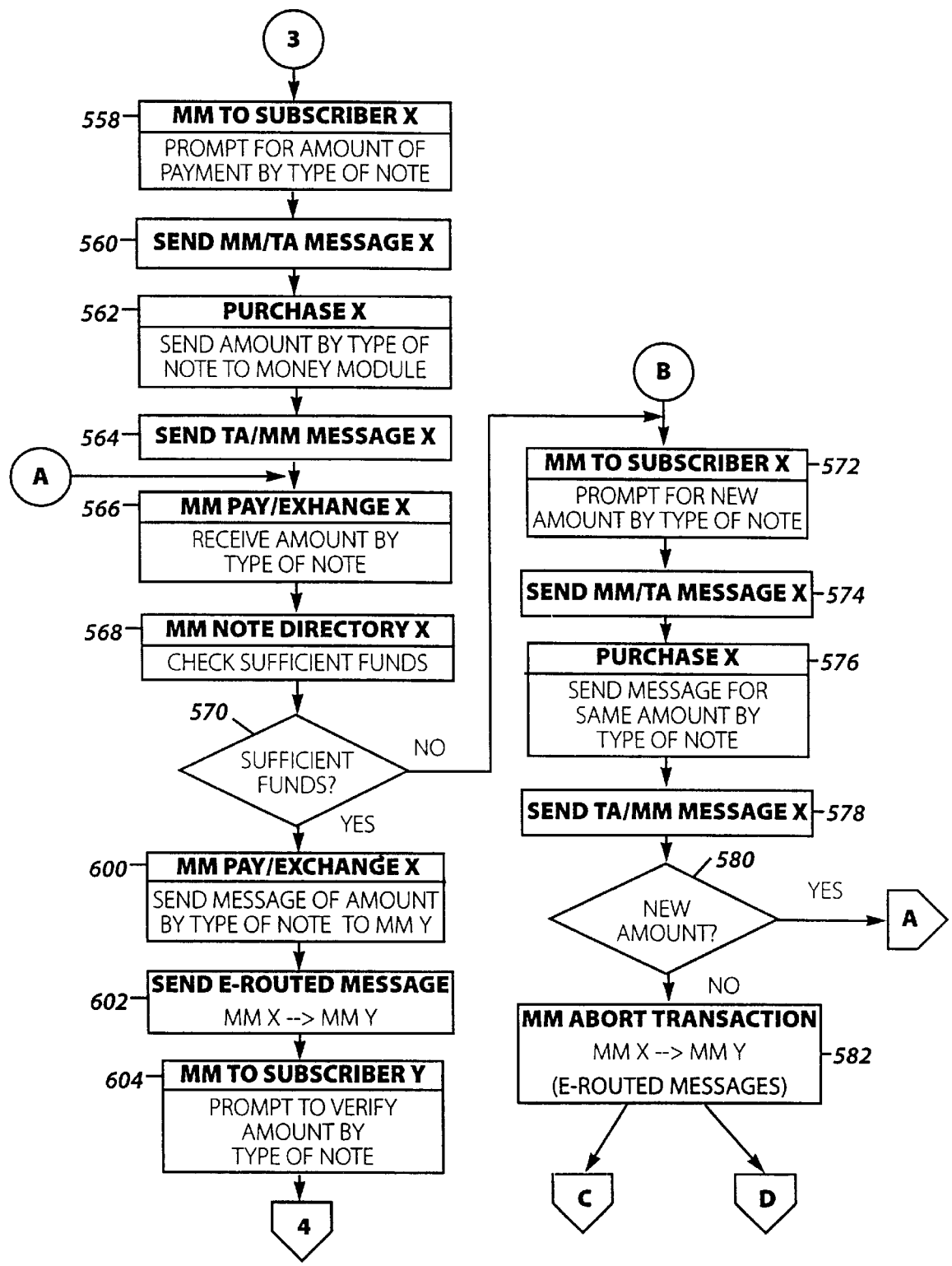
Figure 16D:
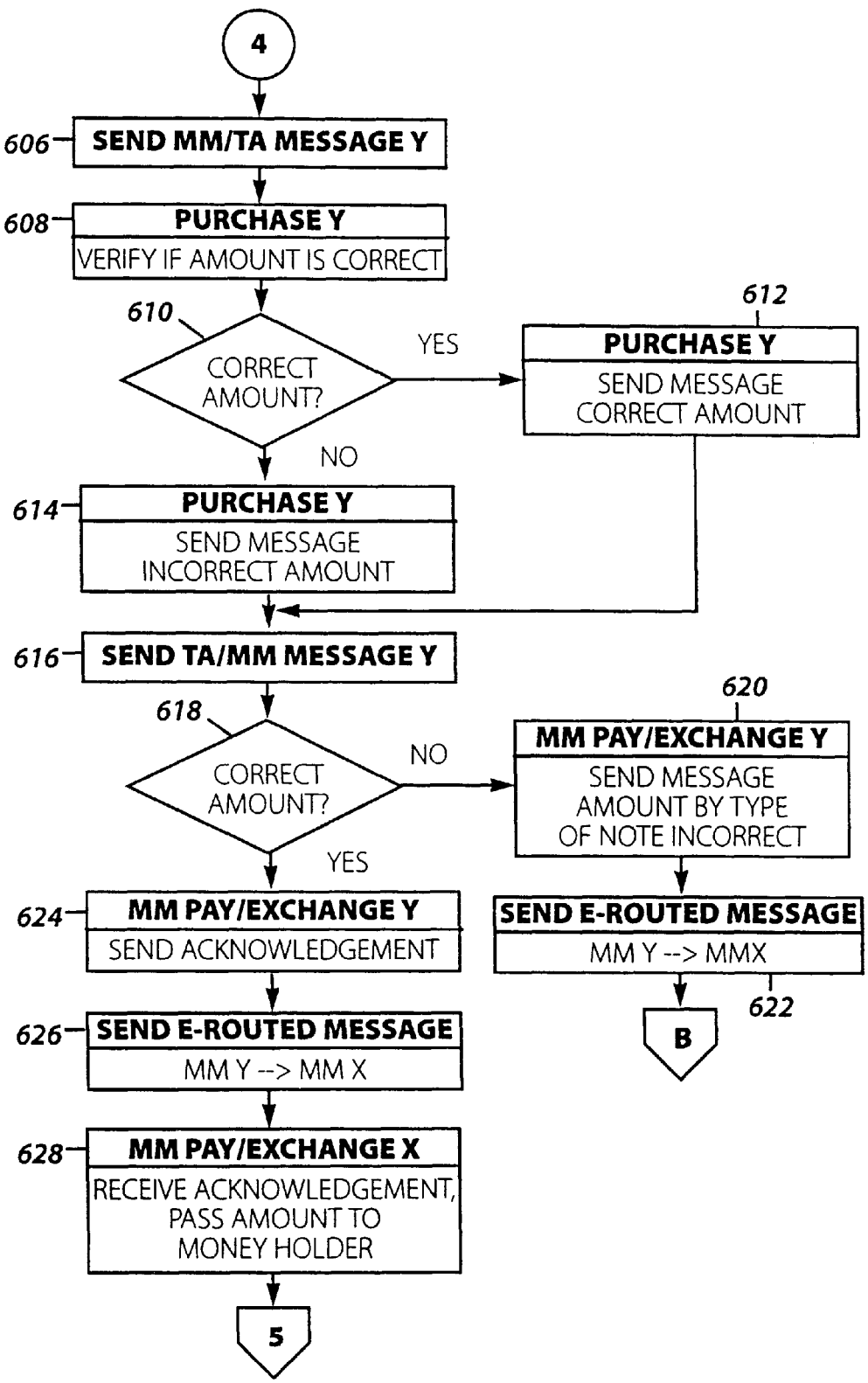
Figure 16E:
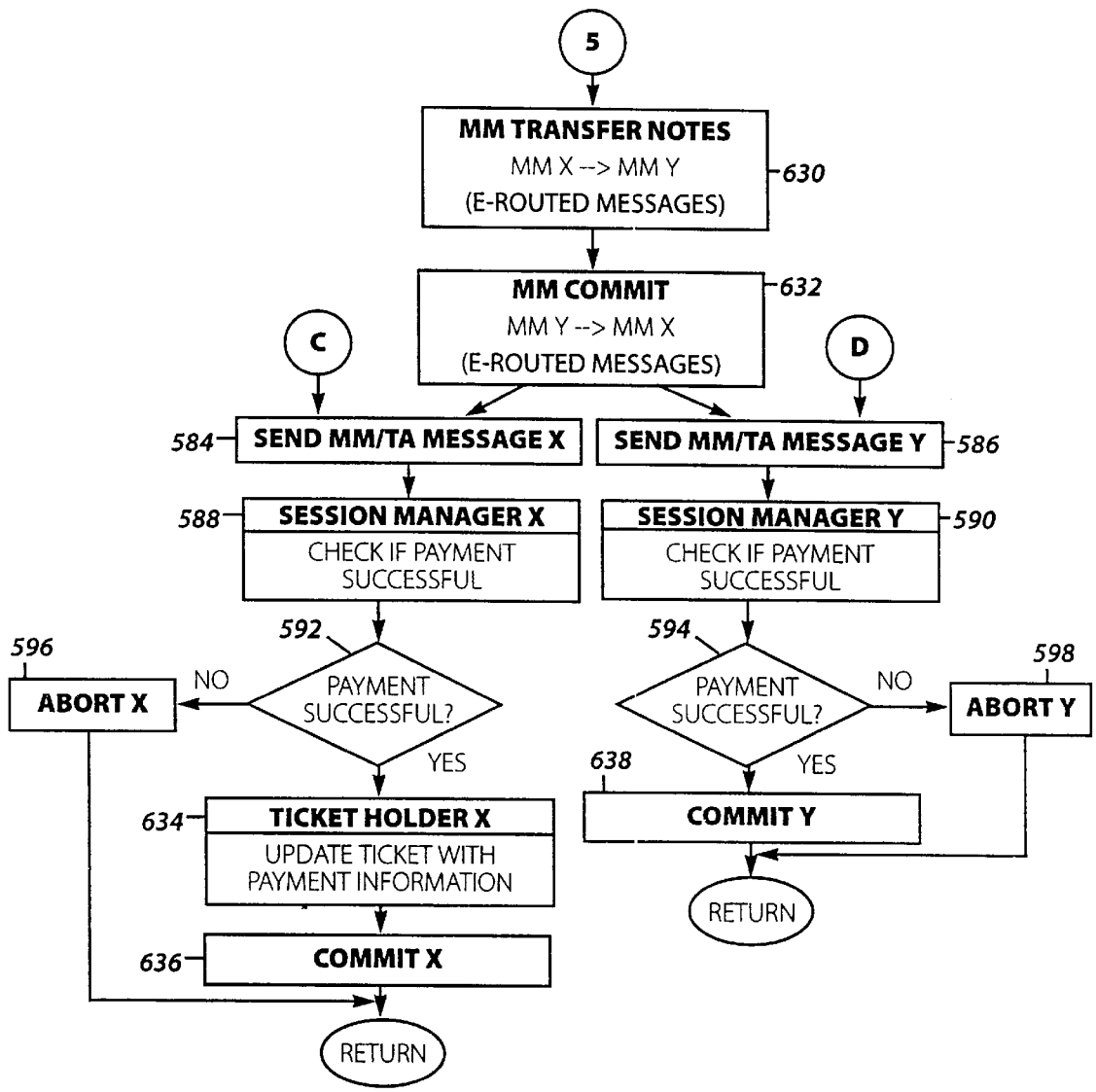

Referring to FIG. 15, Purchase B checks if the merchandise will be embodied as only a ticket (as opposed to a decryption ticket and electronic object) (steps 464–466). If only a ticket, then Ticket Holder B creates the ticket (step 468). Purchase B then sends the ticket to trusted agent A (steps 470–472). Purchase A receives the ticket and checks if it is correct by comparing the expected merchandise identity (previously received from the BTA) with information in the ticket (steps 474–476). If not correct, then Purchase A identifies the transaction as a purchase and hence aborts the transaction (steps 478–482). If trusted agent A approves the ticket as correct, it then sends information from the ticket to a host transaction application for purchaser confirmation (steps 486–488). Such information allows the CTD holder to verify that he is getting the merchandise and price that he previously selected. If the ticket information is not correct, then the transaction is aborted (steps 478–482). If the ticket is correct, then Purchase A sends the ticket to Ticket Holder A for storage (steps 490–492). Trusted agent A now provisionally holds the ticket 8. If trusted agent A subsequently aborts, then the ticket 8 is deleted. If trusted agent A subsequently commits, then the owner/holder of A will be able to present the ticket 8.

On the other hand, if the merchandise to be purchased consists of both an electronic object and its associated decryption ticket, then Random Number Generator B in merchant trusted agent B creates a random key (step 494). Symmetric Key B then encrypts the electronic object with the random key and Public Key B digitally signs the encrypted electronic object with the MTA's private key (steps 496–498). Ticket Holder B then creates a decryption ticket containing the random key, price, and other information (step 500). The owner of trusted agent A may now receive the encrypted electronic object from the merchant, but he will be unable to use it unless he has access to the random key contained within the associated decryption ticket.

Purchase B sends the encrypted electronic object and the decryption ticket to trusted agent A (steps 502–504). Purchase A receives the message and passes the encrypted electronic object to the host and retains a copy of the encrypted header information (step 506). Concurrently, Public Key A verifies the encrypted electronic object's signature using B's public key (steps 508–510). If the signature is incorrect, then the transaction is aborted (steps 478–482). If the electronic object's integrity is verified, then Symmetric Key A decrypts the header with the random key from the decryption ticket (step 512). Purchase A checks the identity of the electronic object and the decryption ticket (steps 514–516). Such checking may be performed by comparing the expected merchandise identity with the electronic object's identifier and with information in the decryption ticket. Thus, it is assured that the selected merchandise, electronic object, and decryption ticket are all related. If the identity check fails, then the transaction is aborted (steps 478–482).

If the electronic object and decryption ticket are correct, then Purchase A sends the decrypted header and price information to a host transaction application for purchaser confirmation (steps 518, 488). If the purchaser does not accept the merchandise, then the transaction is aborted (steps 478–482). If the purchaser accepts the merchandise, then Purchase A sends the decryption ticket to Ticket Holder A for storage (steps 490–492).

Referring again to FIG. 12, now that the delivery of merchandise from merchant to customer is complete (and the merchandise is inaccessible to the customer due to its encryption and/or its storage within his trusted agent 2) Purchase A sends a message to a host transaction application requesting the customer's desired payment method (steps 426–428). Payment may be made in one of two alternative forms: by anonymous payment using a money module 6 or by authorization-based payment (requiring identification of the customer) using a credit card or debit card credential.

If an anonymous payment is desired, then the Money Module Payment subroutine is called (step 430). Referring to FIG. 16, Random Number Generator A creates random number R(1) (step 520). Purchase A then sends a message to trusted agent B indicating that a "money module payment" will be made and also containing R(1) (step 522–524). Purchase B receives the message and sends R(1) to Security Manager B (steps 526–528). Random Number Generator B creates random number R(2) and sends it to trusted agent A (steps 530–532). Security Managers A and B both form session key (TA/MM) by exclusive ORing R(1) and R(2) (Steps 534–536).

Referring to FIG. 13, session key (TA/MM) is used for encrypting messages sent between a trusted agent 120 and its associated money module 6 via encryption channels 438 and 440. At the present point in the flow diagram, only the two trusted agents 120 have session keys (TA/MM). Both money modules 6 will later in the flow diagram form copies of session key (TA/MM) so as to enable encrypted communication between the trusted agents 120 and their money modules 6.

It may be noted that instead of the trusted agent 120 and money module 6 being embodied as discrete tamper-proof components, they may be fabricated as one tamper-proof module. In this case, it would not be necessary to establish a secure session for communication between trusted agent 120 and money module 6 in the same transaction device 122. However, discrete money modules 6 and trusted agents 120 are preferable in that such a configuration allows for greater application flexibility.

Referring back to FIG. 16, To Money Module A sends a "Make Payment" message and R(1) to its associated money module A. Also, To Money Module B sends a "Receive Payment" message and R(2) to its associated money module B (steps 538–544).

At this stage, money module A (within the CTA 2) and money module B (within the MTA 4) establish a session between them so that each money module 6 winds up holding new session key (MM/MM) (step 546). In establishing this money module to money module session, the money modules exchange messages via the pre-existing trusted agent's session. Referring to FIG. 13, the session key for encryption channel 442 is formed by exchanging messages encrypted by channel 436. After the money module session is established, messages sent between money modules will be encrypted twice, by both session key (MM/MM) and session key (TA/TA), along the portion of the communication path between trusted agents 120.

In the preferred embodiment, the money module session is established in a manner similar to the establishment of a trusted agent session. The money modules 6 would therefore hold their own certificates containing their public keys. The swapping of certificates and random numbers (for XORing) enables the secure creation of session keys (MM/MM). The Establish Session protocol used by money modules is shown in FIG. 38 and described subsequently. The overall system security pertaining to the money modules may be integrated with that for the trusted agents 120, but is preferably separate to provide for enhanced system security and system flexibility.

Referring back to FIG. 16, money module A sends R(l) to money module B. This function may be initiated by a MM Maintain Security A application residing in money module A (step 548). This application and other money module applications are prefaced by the designations "MM" and are described in PCT patent application WO 93/10503 together with any modifications and/or additions herein.

Figure 17:
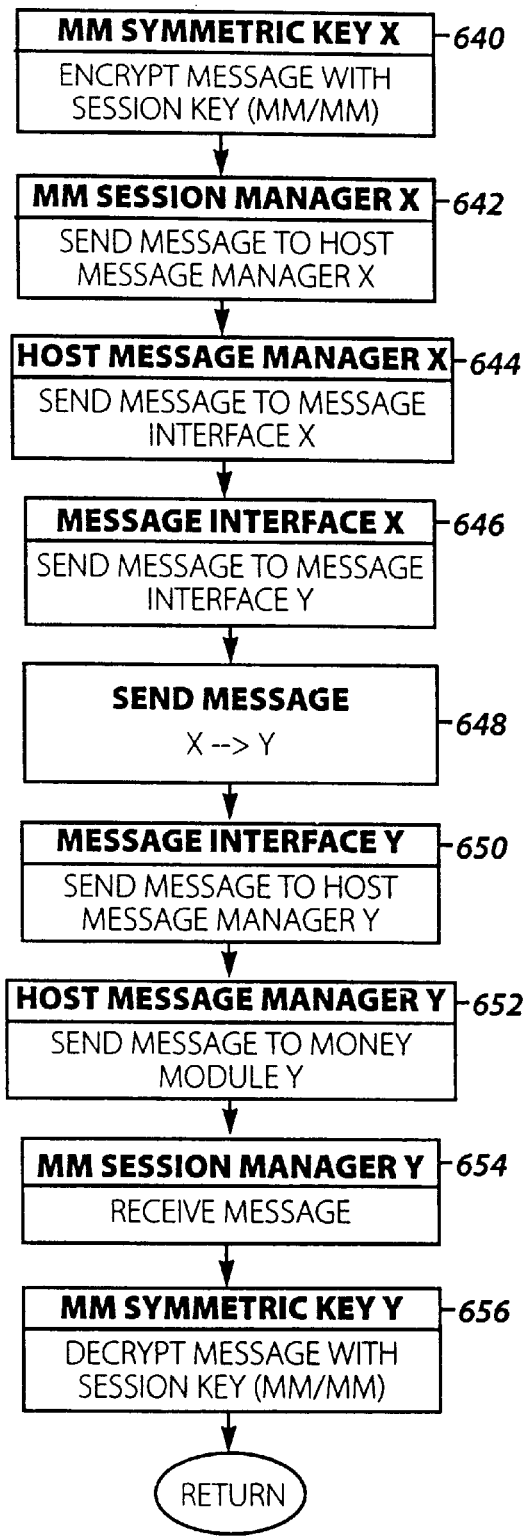
FIG. 17 illustrates a Send Routed Message protocol.

Random number R(1) is sent from money module A to money module B by the subroutine Send Routed Message (step 550). Referring to FIG. 17, MM Symmetric Key A encrypts the message (including R(1)) with session key (MM/MM) (step 640). MM Session Manager A sends the message to Host Message Manager A which, in turn, sends the message to Message Interface A of trusted agent A (steps 642–646). Trusted agent A then sends the message to Message Interface B of trusted agent B using the Send Message subroutine (step 648) which encrypts and decrypts the message with session key (TA/TA) in between the trusted agents. Message Interface B then sends the message to MM Session Manager B in money module B via Host Message Manager B (steps 650–654). Finally, MM Symmetric Key B decrypts the message with session key (MM/MM) (step 656).

Referring again to FIG. 16, MM Maintain Security B (in money module B) forms session key (TA/MM) by exclusive ORing R(1) and R(2). Money module B then sends R(2) to money module A which also forms session key (TA/MM) by exclusive ORing R(1) and R(2) (Steps 552–556). Referring to FIG. 13, at this stage, three session keys exist: (MM/MM), (MM/TA), and (TA/TA). Thus, the four encryption channels shown are in place.

Referring to FIG. 16, MM To Subscriber A prompts trusted agent A for the amount of payment by type of note (e.g., dollars, yen, pounds, etc.) (step 558). A money module as described in U.S. Pat. No. 5,453,601, incorporated by reference herein, would generally use the To Subscriber application for communication with the owner/holder of the money module. However, as used in the present instance, the To Subscriber application communicates with the trusted agent 120 for getting various instructions. Here, the trusted agent 120 delivers amount of payment and type of note information (trusted agent A has previously communicated with the owner/holder of the CTD 2 to confirm the price of the selected merchandise).

Figure 18:
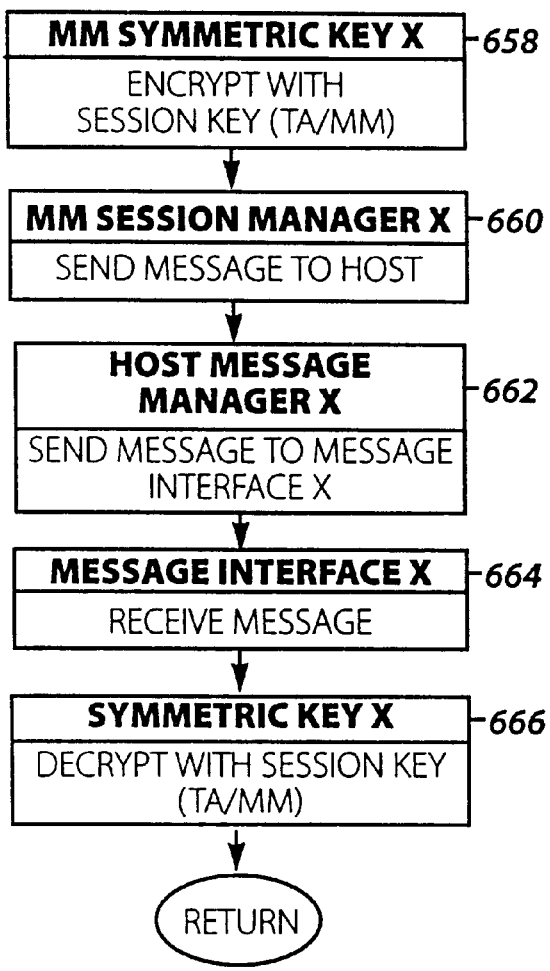
FIG. 18 illustrates a Send MM/TA Message protocol.
Figure 19:
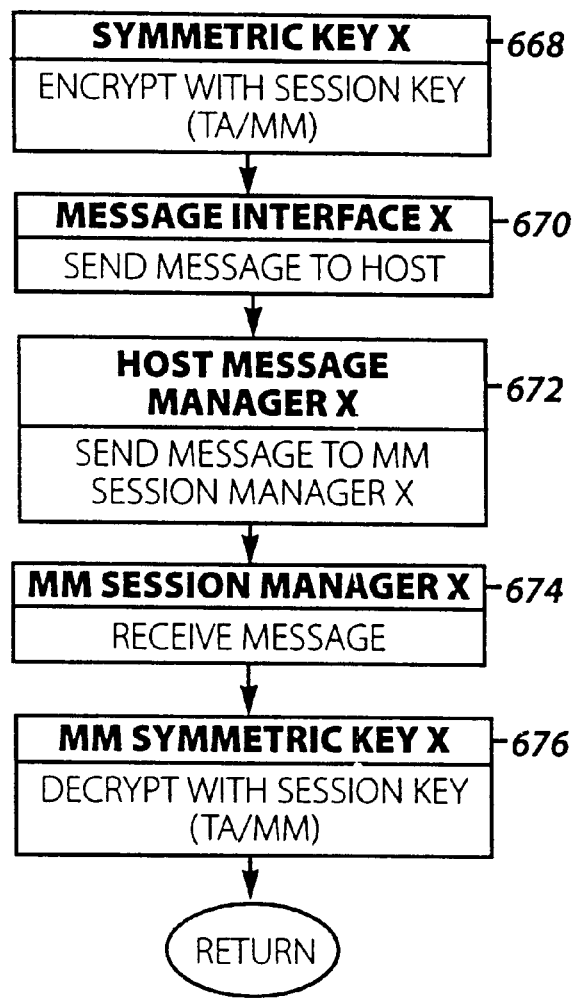
FIG. 19 illustrates a Send TA/MM Message protocol.

The prompt from the money module 6 to the trusted agent 120 is sent via the Send MM/TA Message subroutine (step 560). Referring to FIG. 18, MM Symmetric Key A encrypts the message with session key (TA/MM) (step 658). MM Session Manager A sends the message to trusted agent A's Message Interface via Host Message Manager A (steps 660–664). Symmetric Key A decrypts the message with session key (TA/MM) (step 666). Referring back to FIG. 16, Purchase A of trusted agent A sends the amount (price of selected merchandise) by type of note to MM Pay/Exchange A of money module A (steps 562–566). This message is sent via the Send TA/MM Message subroutine (step 564). Referring to FIG. 19, Symmetric Key A encrypts the message with session key (TA/MM) (step 668). Message Interface A sends the message to money module A's MM Session Manager via Host Message Manager A (steps 670–674). Finally, MM Symmetric Key A decrypts the message with session key (TA/MM) (step 676).

Referring to FIG. 16, MM Note Directory A checks if the money module 6 has sufficient funds to cover the payment (steps 568–570). If insufficient, then money modules A and B abort the transaction (steps 572–582).

Figure 20:
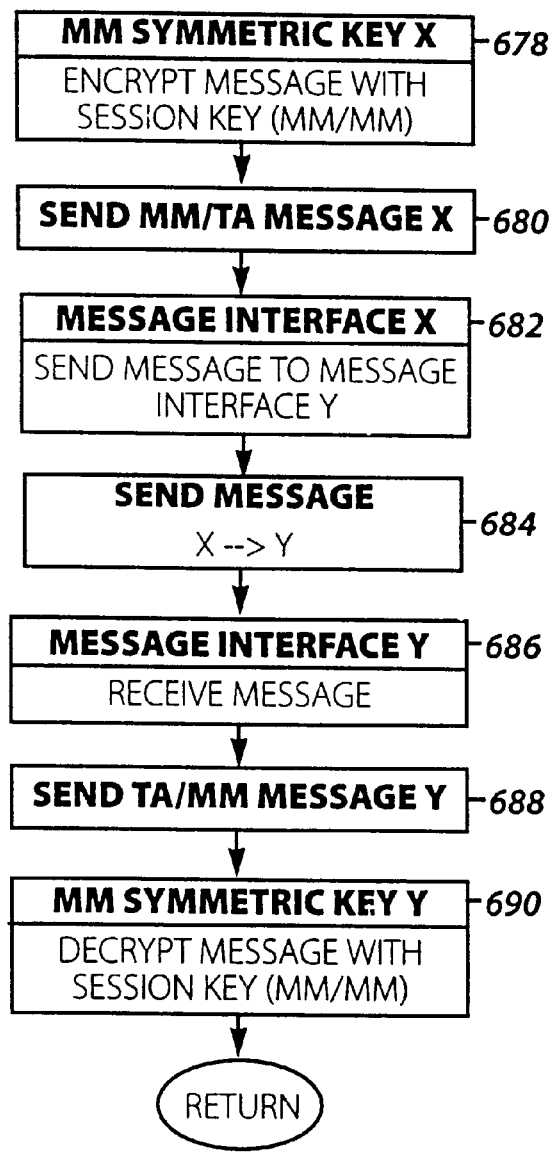
FIG. 20 illustrates a Send E-Routed Message protocol.

The MM Abort transaction protocol (step 582) of the preferred electronic monetary system is described subsequently and shown in FIG. 42. The messages between money module A and money module B are sent via a Send E-Routed Message subroutine which utilizes all three session keys (MM/MM), (TA/MM), and (TA/TA). Referring to FIG. 20, MM Symmetric Key A encrypts a message with session key (MM/MM) (step 678). The message is then double encrypted by session key (MM/TA) before it is sent to trusted agent A. Once received by trusted agent A, the message is decrypted by session key (MM/TA). (Step 680). Message Interface A then sends the message to Message Interface B (steps 682–684). In between trusted agents 120, the message is double encrypted by session key (TA/TA). In like manner, Message Interface B sends the message to MM Symmetric Key B for final decrypting (steps 686–690). FIG. 13 illustrates the various encryption layers.

Referring again to FIG. 16, during the abort routines of money modules A and B (step 582), they generate messages sent to their trusted agents A and B. respectively (steps 584–586) informing them that they have aborted the transaction and hence that payment was unsuccessful. Session Managers A and B note that the payment was unsuccessful and consequently trusted agents A and B abort (steps 588–598).

If, on the other hand, the customer's money module 2 has sufficient funds then MM Pay/Exchange A sends a message to the merchant's money module containing the amount of money to be transferred in payment and the type of notes (step 600). This message is sent by the Send E-Routed Message subroutine (step 602).

Money module B receives the message containing the payment amount according to money module A. MM To Subscriber B then sends a prompt to trusted agent B to verify this payment amount (steps 604–606). Accordingly, Purchase B in trusted agent B verifies if the amount is correct (steps 608–610). If correct, then trusted agent B sends a "Correct Amount" message to money module B. If incorrect, then an "Incorrect Amount" message is sent. (Steps 612–616). In the event of an "Incorrect Amount" message, money module B informs money module A which, in turn, requests its trusted agent to resend a new amount or else abort (steps 618–622, 572–582). In money module payments made during an electronic merchandise purchase, the trusted agent will not send a new amount and hence both money modules 6 and both trusted agents 120 will abort.

If, on the other hand, money module B receives a "Correct Amount" message from its trusted agent, then money module B sends an Acknowledgement message back to the customer's money module (steps 624–626). When MM Pay/Exchange A receives the Acknowledgement message, it then passes the amount to Money Holder A (the application which contains and manages the electronic representations of money) (step 628).

Note that the payor initiated protocol just described may instead be implemented as a payee initiated payment as in the POS Payment protocol shown in FIG. 43 and described subsequently. In such a protocol, the merchant's trusted agent instructs its money module as to the payment amount it expects to receive, this payment information is sent to the customer's money module which prompts its trusted agent for verification, and if the amount is correct, then the customer's trusted agent informs its money module.

Figure 39A:
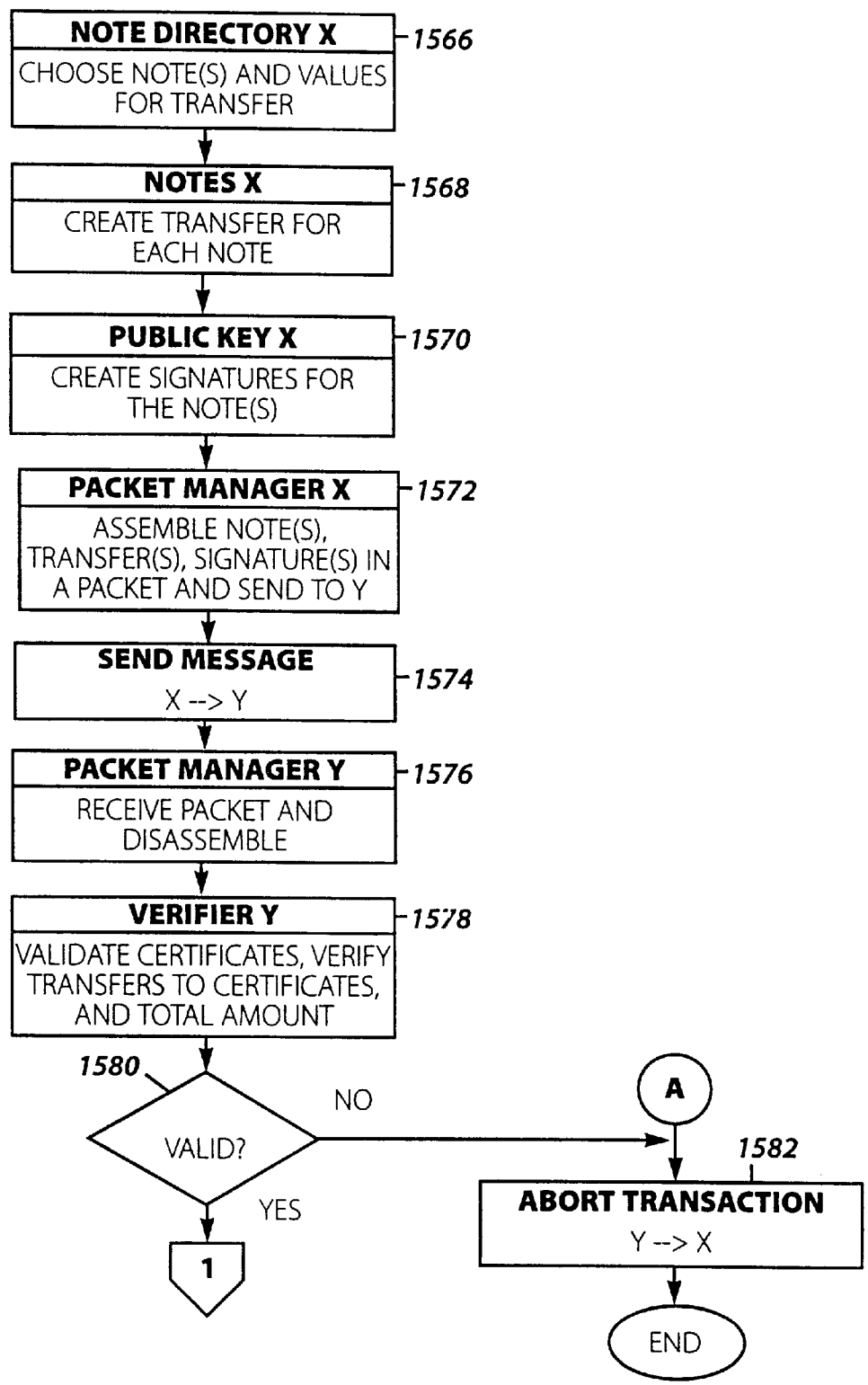
FIGS. 39A–39B illustrate a Transfer Notes protocol.
Figure 39B:
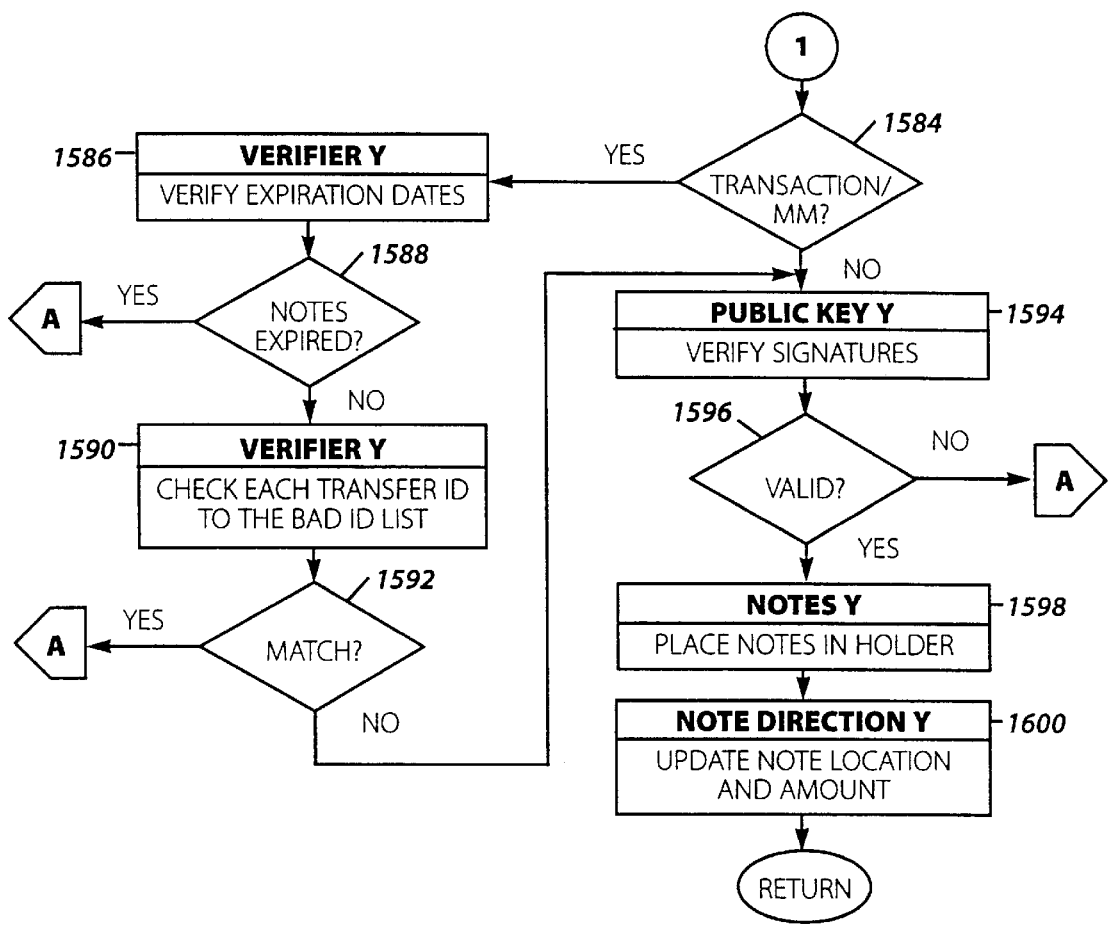
Figure 40A:
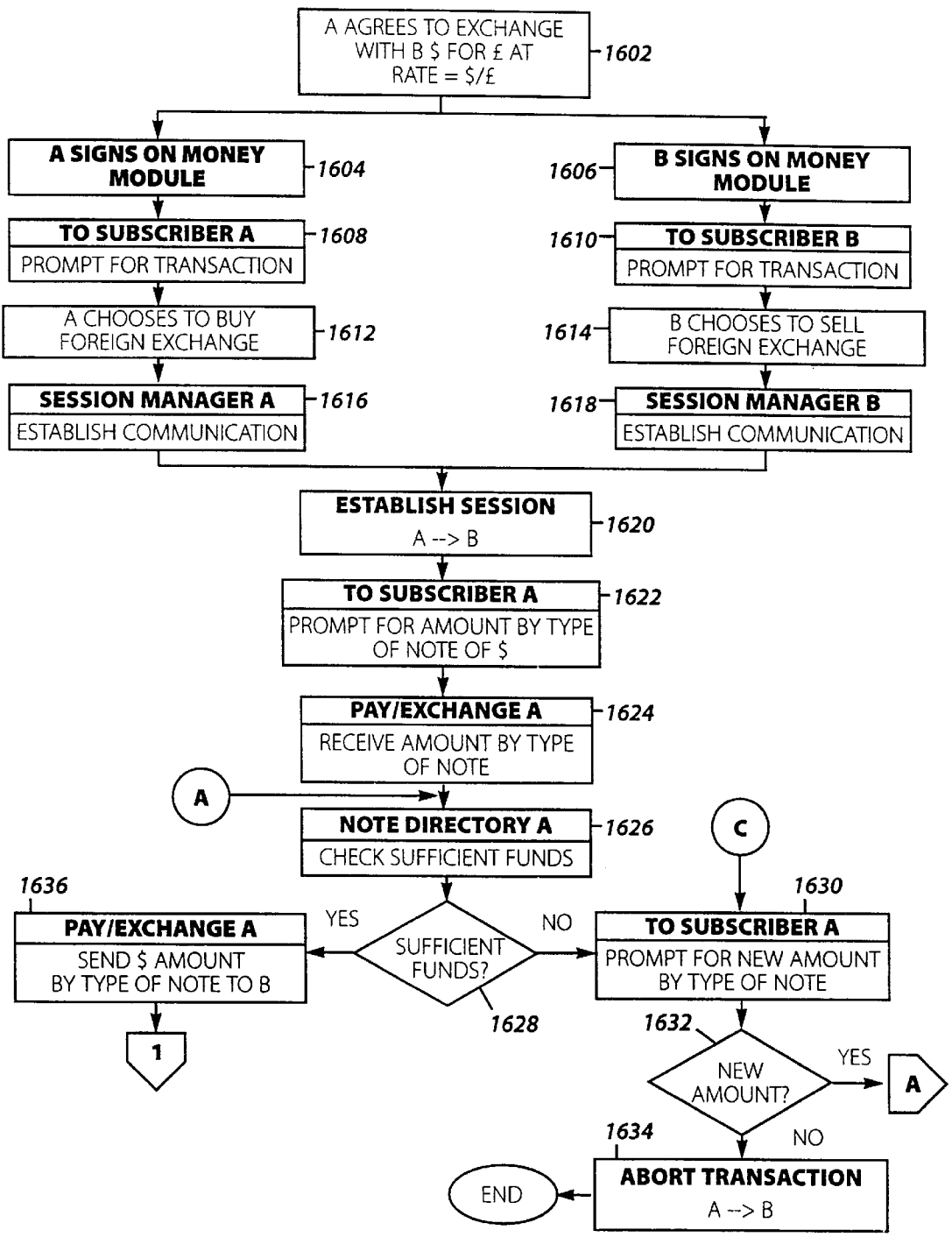
FIGS. 40A–40D illustrate a Foreign Exchange protocol.
Figure 40B:
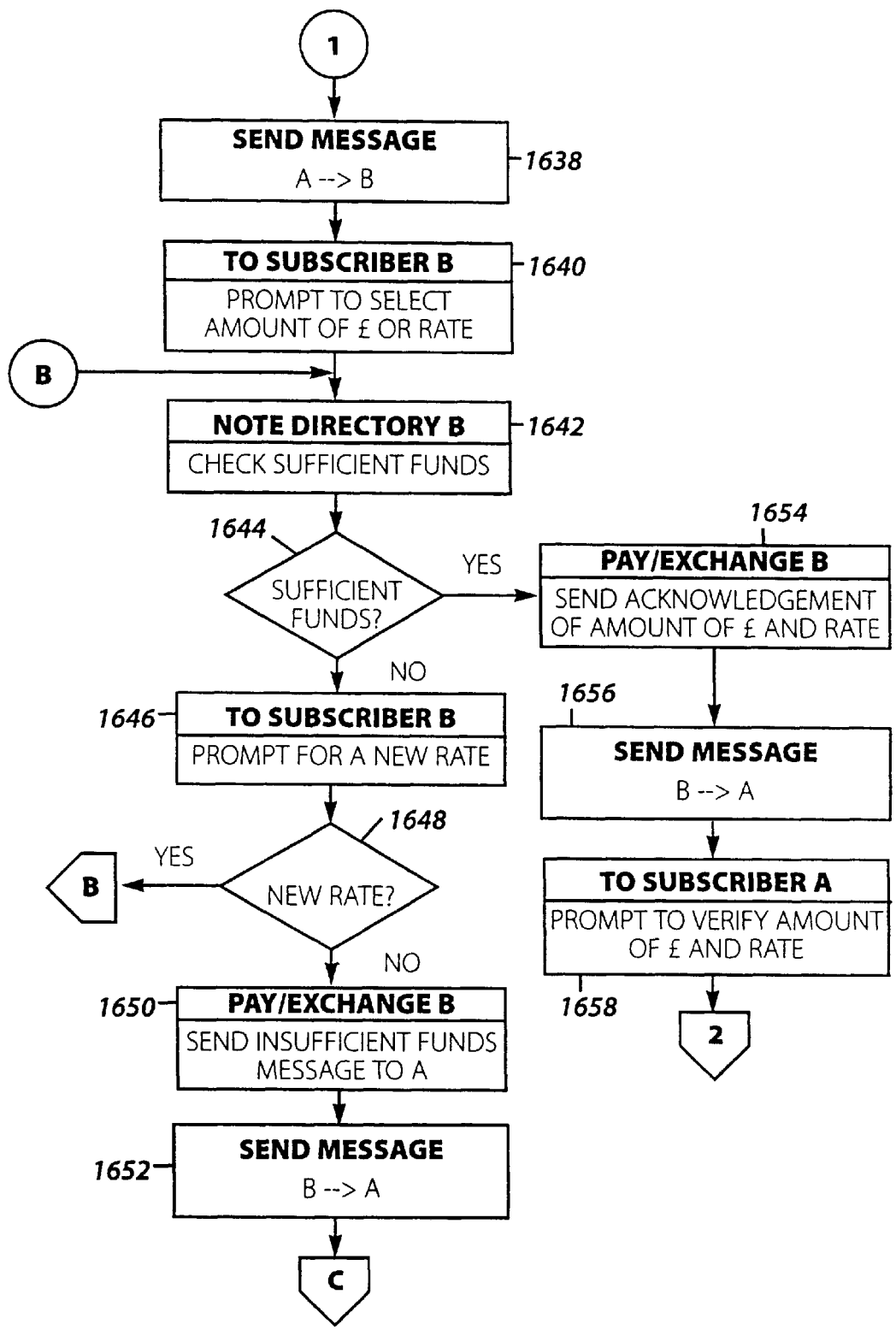
Figure 40C:
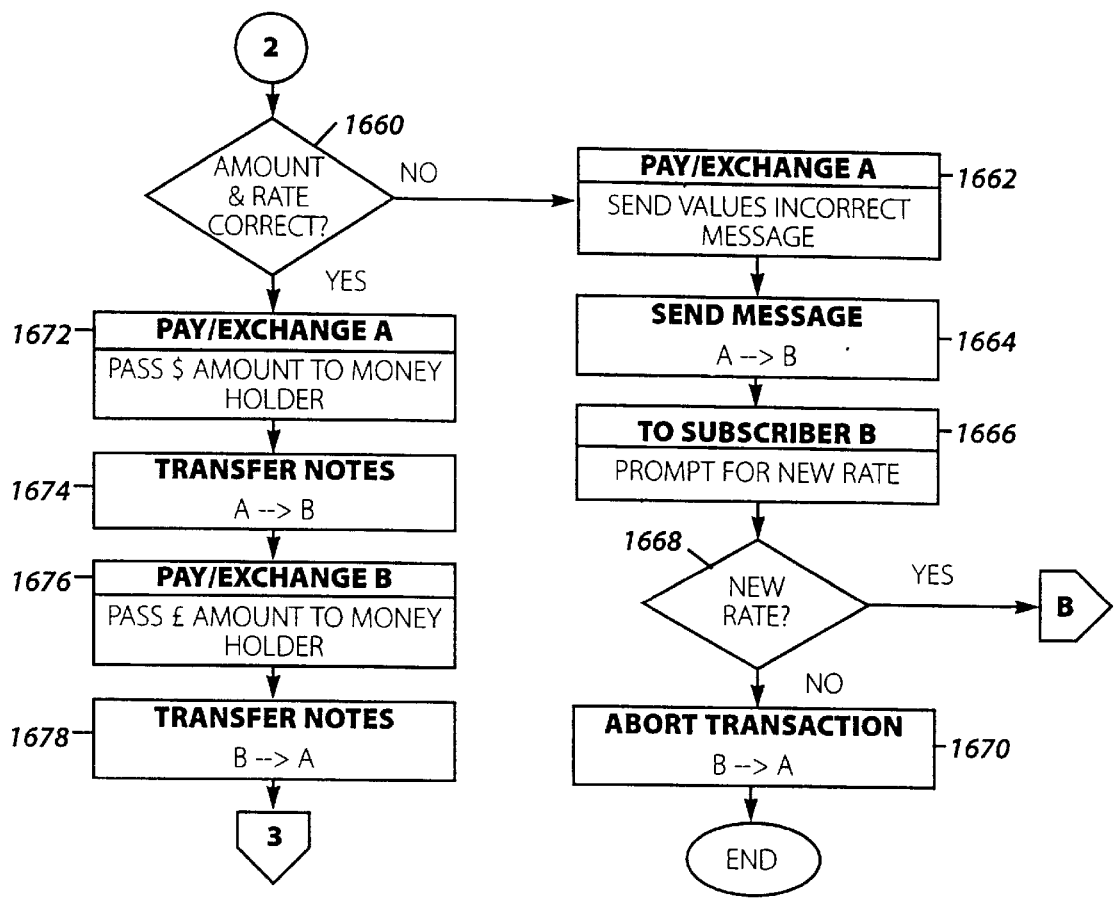
Figure 40D:
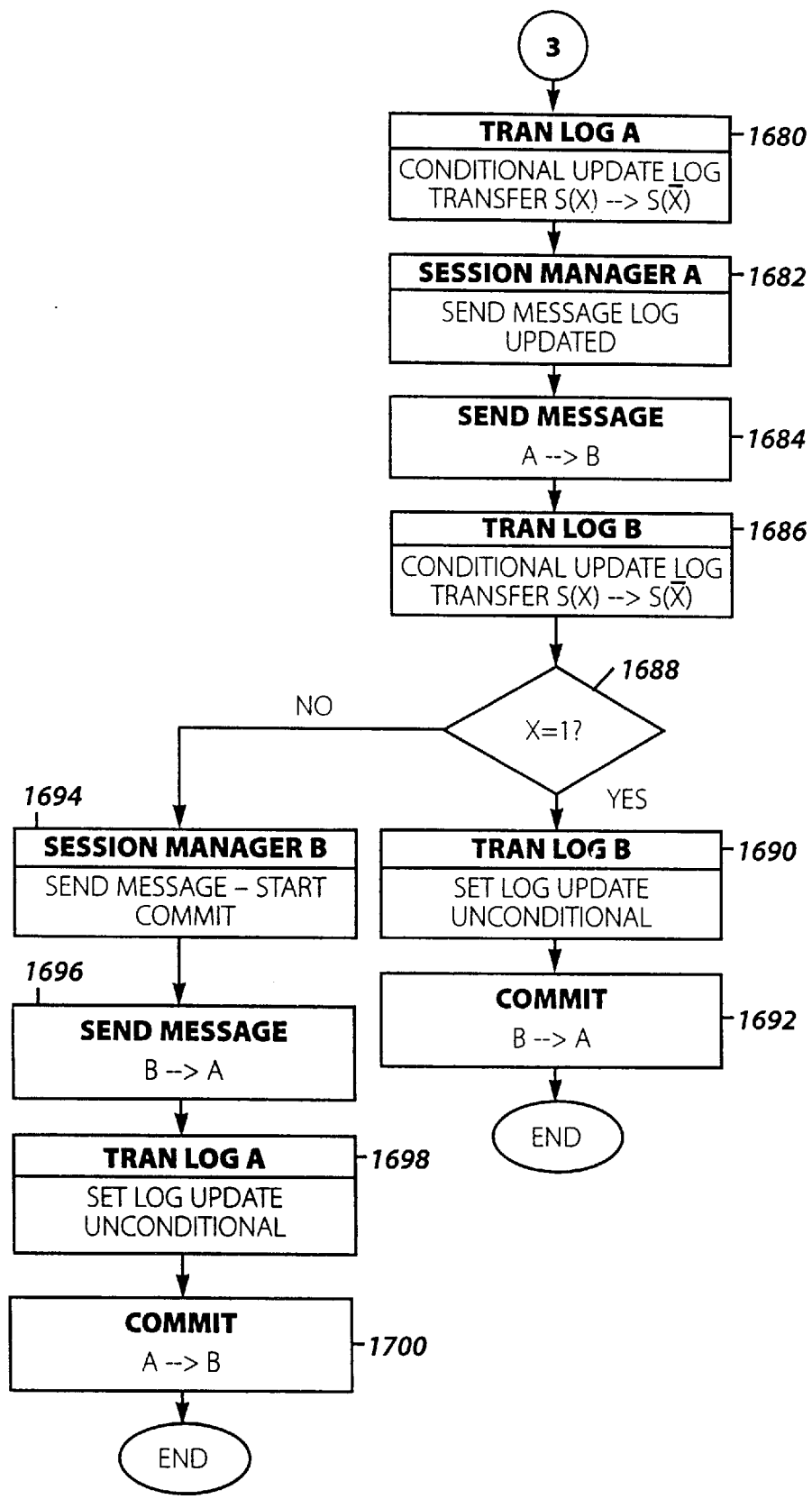

Referring again to FIG. 16, the customer's money module A then transfers electronic notes in the amount specified to the merchant's money module 4 via the E-Routed message path (step 630). At this stage in the transaction, A provisionally retains a correct ticket 8 (and perhaps an encrypted electronic object) and B provisionally retains electronic notes in the correct amount. FIG. 39 shows a Transfer Notes protocol described subsequently.

Figure 41:
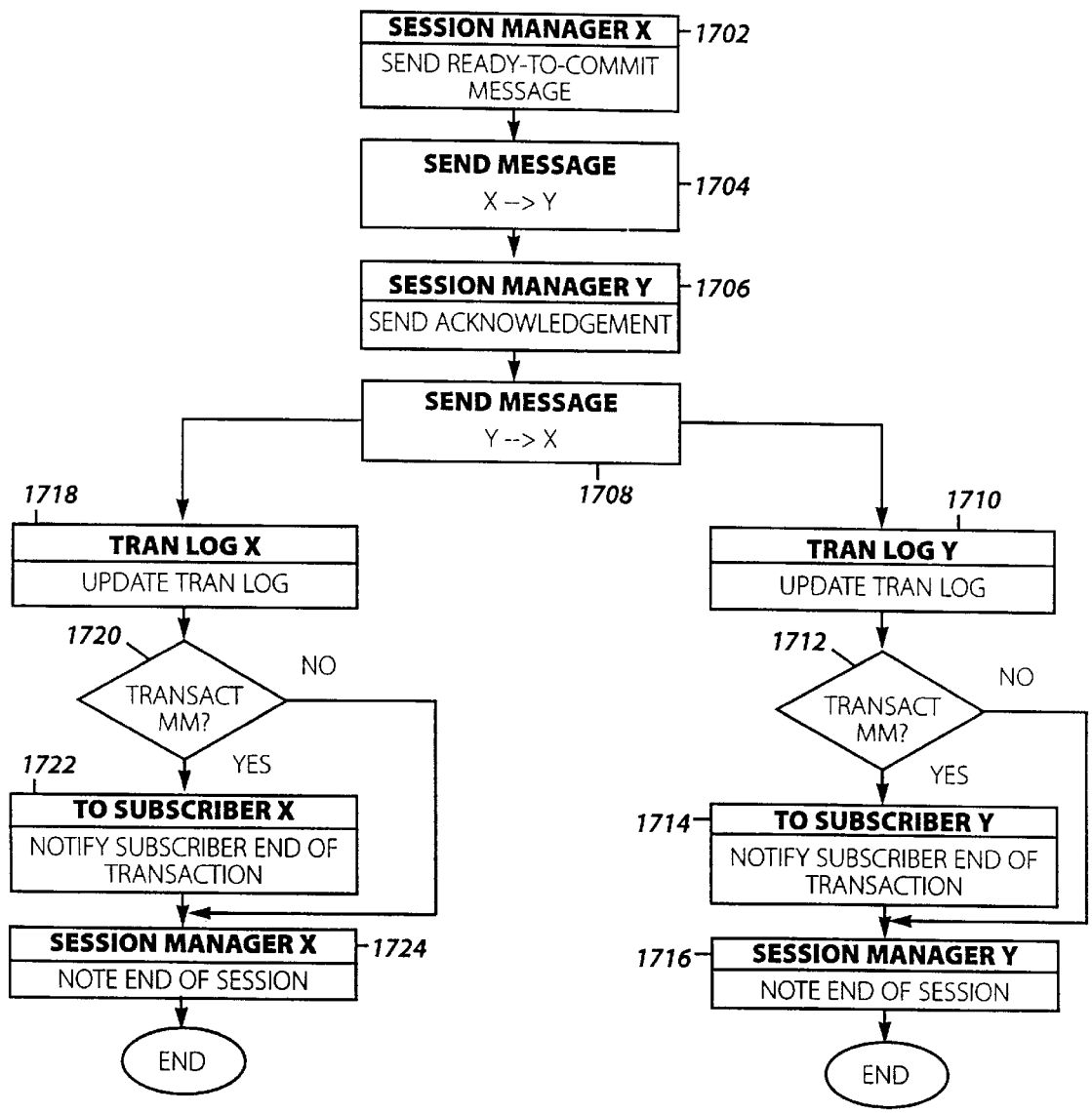
FIG. 41 illustrates a Commit protocol for modules in the EMS.

Next, a MM Commit subroutine is called (step 632). FIG. 41 shows the Commit protocol used in the preferred electronic monetary system. This flow diagram is still followed when money modules 6 are interacting with trusted agents 120 with the understanding that Send Message =Send E-Routed Message and that To Subscriber messages are actually sent encrypted to the trusted agent 120. With the foregoing in mind, money module B's MM Session Manager sends a "Ready-To-Commit" message to money module A's MM Session Manager via the send E-Routed Message subroutine (steps 1702–1704). MM Session Manager A then sends an "Acknowledgement" message to money module B and money module A commits (steps 1706–1716). When money module B receives the "Acknowledgement" message it too commits (steps 1718–1724).

During the commit routines of money modules A and B, they generate messages sent to their trusted agents A and B, respectively (steps 1714, 1722) informing them that they have committed to the transaction and hence that the payment was successful.

Referring again to FIG. 16, the money modules then both send the aforementioned "Payment Successful" messages to their trusted agents (steps 584–586). These messages are encrypted by session key (TA/MM). Session Manager A detects that a successful payment has been made and Ticket Holder A updates the ticket with payment information such as the date of purchase (steps 588, 592, 634). Trusted agent A then commits (step 636) so that its retention of the ticket is no longer "provisional". Similarly, Session Manager B detects a successful payment (steps 590, 594) and trusted agent B commits (step 638). The transaction is now complete.

In summary, a secure purchase transaction in accordance with the preferred embodiment of the present invention occurs as follows:

(1) a secure transaction session is established between the buyer's and seller's money modules, between the buyer's and seller's trusted agents, and between the money module and trusted agent of each transaction device;

(2) selected electronic merchandise is transferred from the seller's trusted agent to the buyer's trusted agent (where it is retained provisionally)—in the event that the electronic merchandise includes an electronic object, the electronic object is encrypted so that it may be stored outside of the trusted agent;

(3) after verifying the correctness of the transferred electronic merchandise, the buyer's trusted agent instructs its money module to pay a certain amount of electronic money to the seller's money module;

(4) the buyer's money module informs the seller's money module of the amount of electronic money to be paid to it and the seller's money module checks with its trusted agent to verify that this is the correct price of the merchandise;

(5) if the amount is correct, the seller's money module sends an acknowledgement to the buyer's money module;

(6) the buyer's money module transfers the electronic money to the seller's money module (the seller's MM provisionally retains the note(s) and the buyer's MM provisionally decrements the value of the note(s) in the transferred amount);

(7) both the buyer's and seller's money modules commit (the seller MM's retention of the note(s) is no longer provisional and the buyer's MM retains the new value (s) of the note(s)) and, in so doing, send "payment successful" messages to their respective trusted agents;

(8) finally, both the buyer's and seller's trusted agents commit (the seller's trusted agent records the sale and the customer trusted agent's retention of the merchandise is no longer provisional), so that the buyer can now use his/her electronic merchandise and the seller has his/her electronic money.

It may be noted that in an alternative embodiment, the order of exchanging electronic merchandise and money may be reversed. In such a case, the electronic money may be transferred (provisionally) first followed by the (provisional) transfer of the electronic merchandise. The customer's trusted agent would then instruct its money module to commit, and the transaction would proceed as previously described. Such an alternative embodiment would require modifying the money module payment protocols accordingly.

We have shown how to secure simultaneous payment to delivery of electronic merchandise over a communication network where the seller does not know the identity of the buyer. This is a direct analogy to a buyer purchasing merchandise in a store with cash. The store clerk does not know the identity of the customer, but will sell to him for cash. The customer trusts he will get the merchandise since he is in physical proximity to the clerk across the "counter". We have produced with the above protocol an electronic "counter" across which the customer's trusted agent 2 and merchant's trusted agent 4 can transact as securely as in the physical analogue.

In addition to anonymous money module payments, the trusted agent 120 also provides a secure platform for providing identity-based transactions, i.e., transactions requiring disclosure of the customer's identity. Examples of such transactions are credit or debit card payments, opening a checking account, purchase of an item which requires buyer registration such as a car or truck or paying a bill or invoice. Today it is risky for a merchant to remotely accept a credit or debit card number for payment and deliver the merchandise to other than the customer address. If the transaction is fraudulent, the merchant is responsible. However, the merchant could take the card number as part of a trusted agent's credential, which would be secure enough for the card issuer to take the risk of fraud.

Figure 21A:
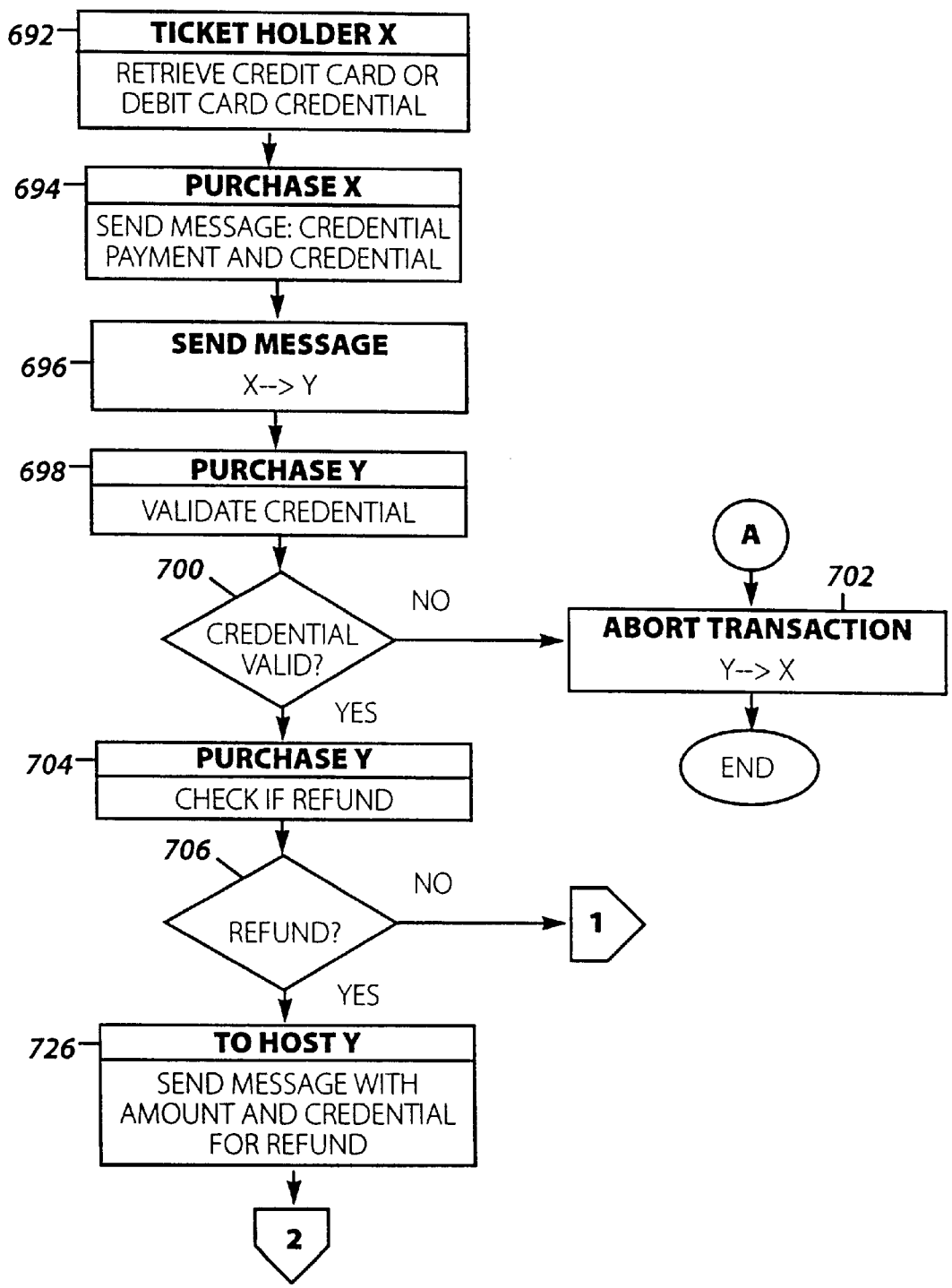
FIGS. 21A–21B illustrate an Authorization-Based Payment/Refund protocol.
Figure 21B:
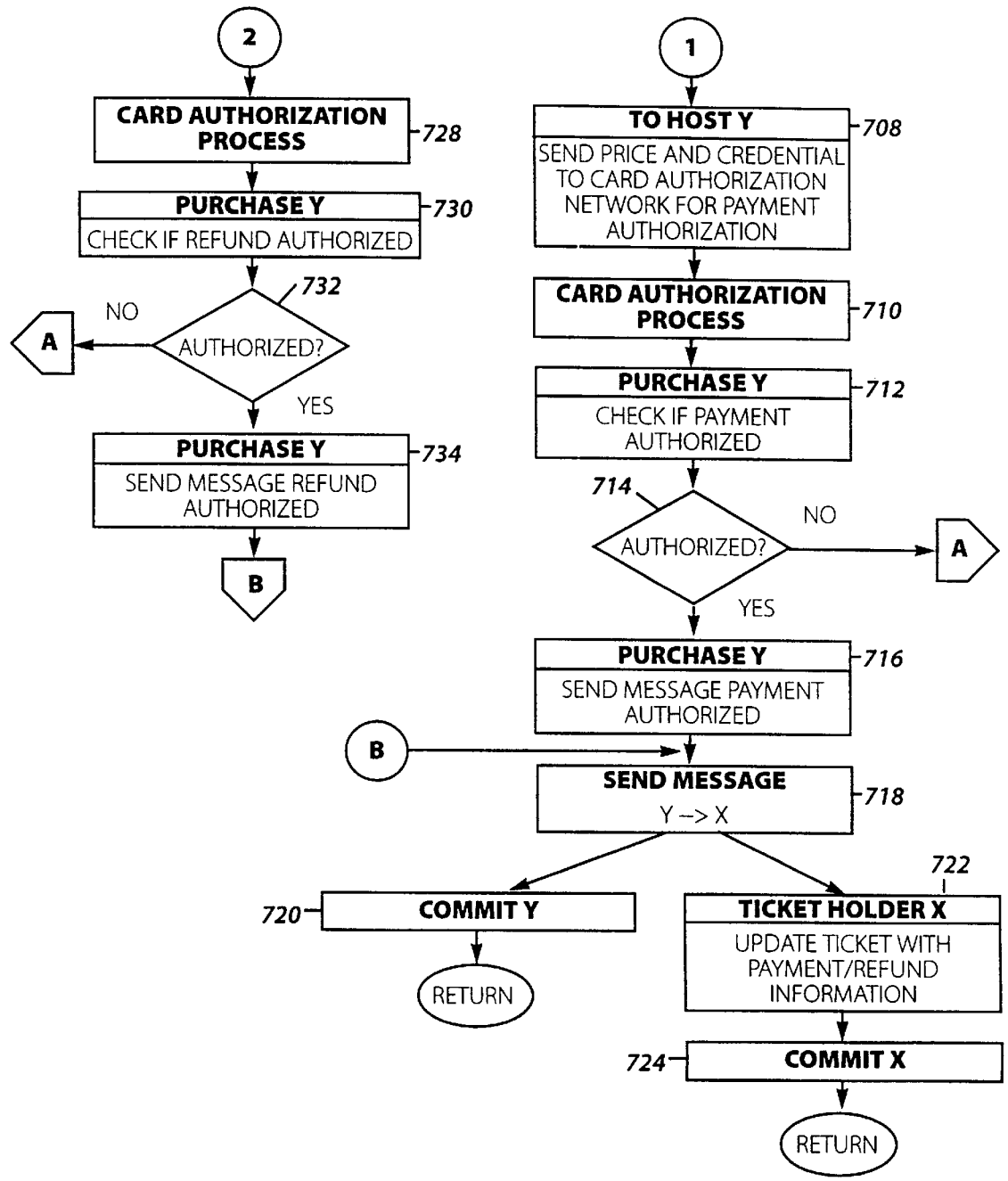

Referring back to FIG. 12, if instead of an anonymous money module payment, the customer decides to pay via a credit or debit card credential, then the Authorization-Based Payment/Refund subroutine is called (step 432). Referring to FIG. 21, Ticket Holder A retrieves a credit card or debit card credential (step 692). Purchase A sends a message indicating that payment is a "Credential Payment" and containing the credential to Purchase B for validation (steps 694–700). If invalid, the transaction is aborted (step 702). If valid, then Purchase B checks to see whether the customer is requesting a refund (steps 704–706). Assuming it is not a refund transaction, To Host B sends the price and credential to a card authorization network for payment authorization (step 708). The MTD initiates a card authorization process (step 710). Card authorization is well known in the art and typically involves the card issuer or its agent authorizing a particular payment when sufficient funds are present or the amount is within the card holder's credit limit. Upon completion of the card authorization process, Purchase B checks if a payment was authorized (steps 712–714).

If payment is not authorized, then the transaction is aborted (step 702). If payment is authorized, then Purchase B sends message "Payment Authorized" to Ticket Holder A and trusted agent B commits (steps 716–720). When Ticket Holder A receives the "Payment Authorized" message, it updates the ticket with payment information (e.g., date of purchase) (step 722). Trusted agent A then commits (step 724), completing the authorization-based payment.

Figure 22:
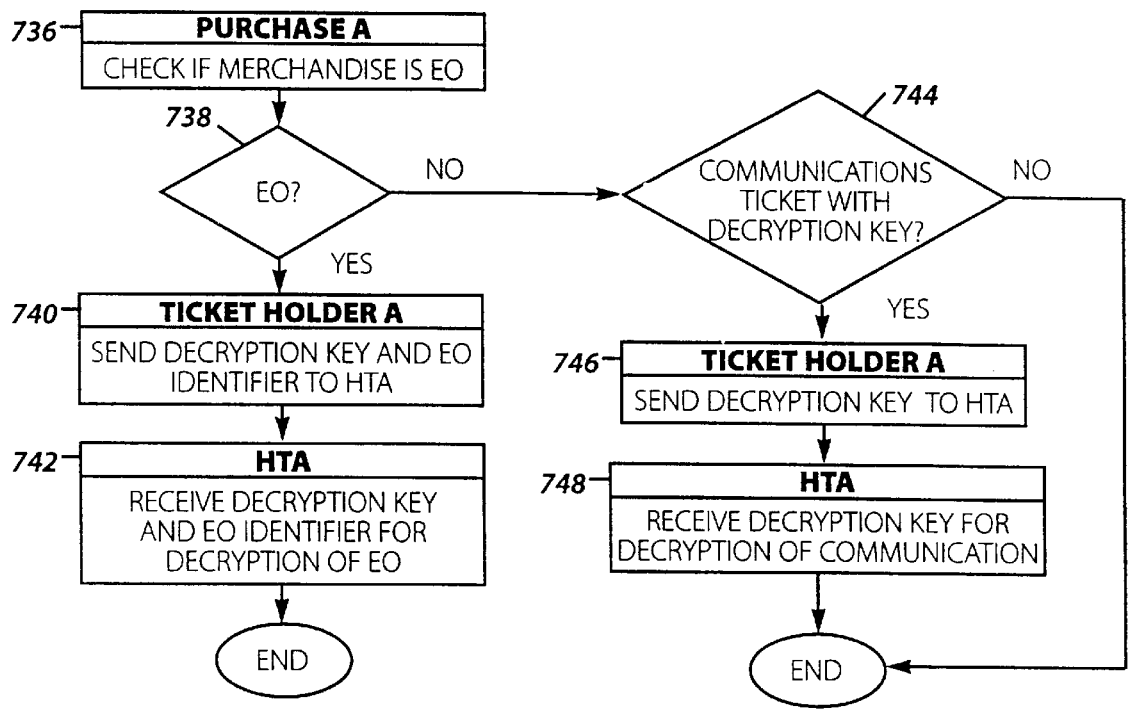
FIG. 22 illustrates an Open Merchandise protocol.
Figure 23A:
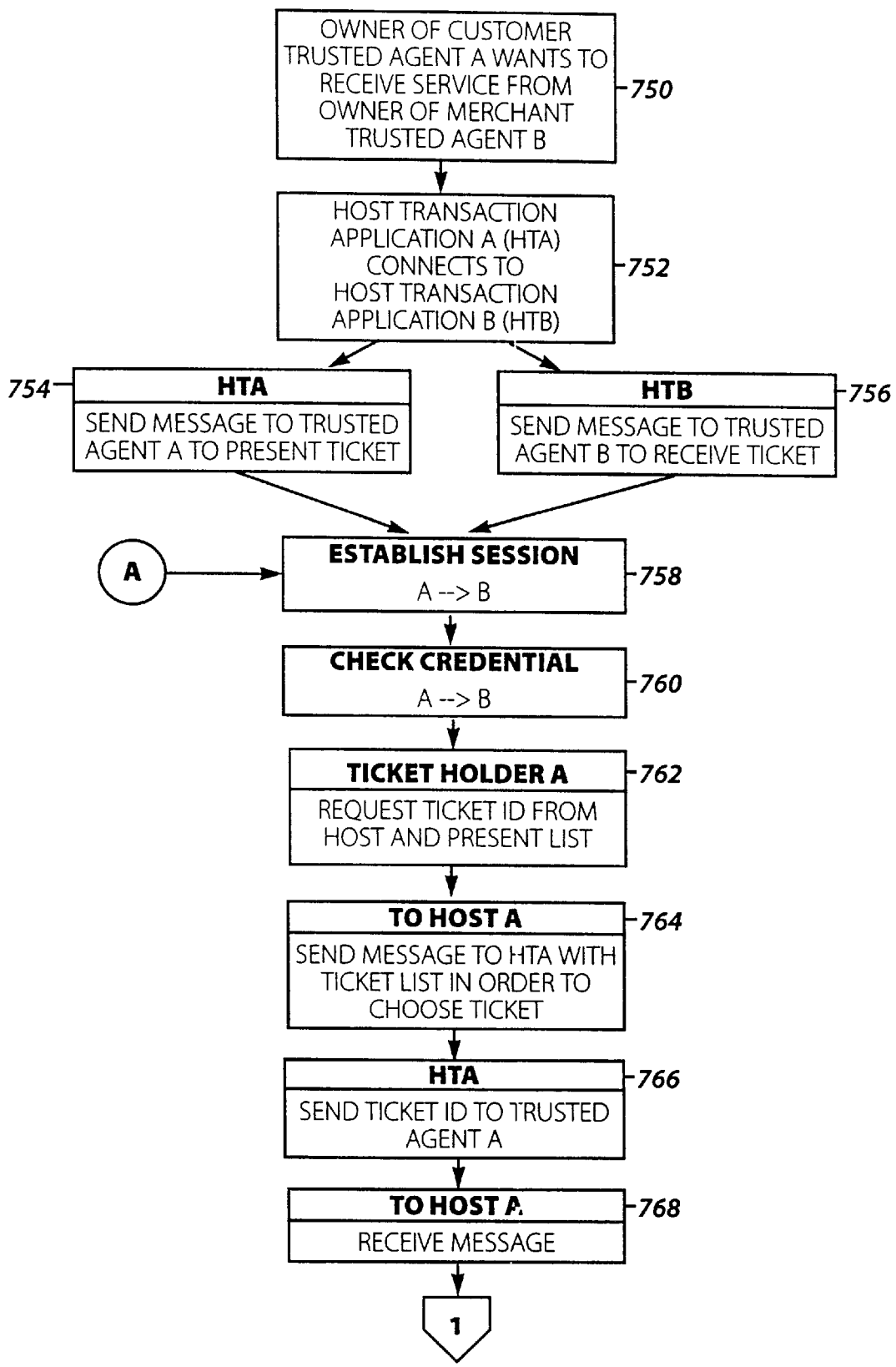
FIGS. 23A–23D illustrate a Present Electronic Ticket for Services protocol.
Figure 23B:
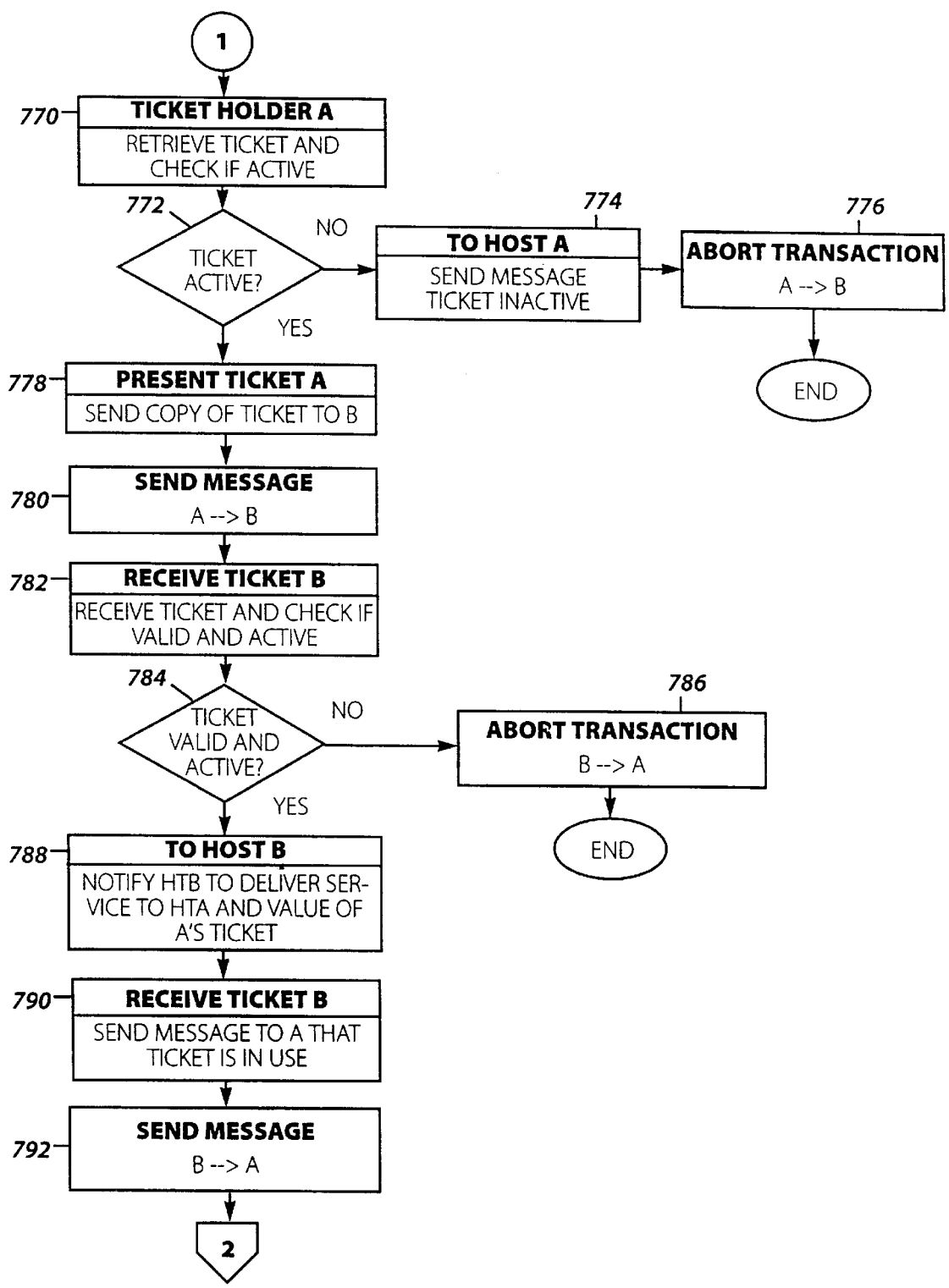
Figure 23C:
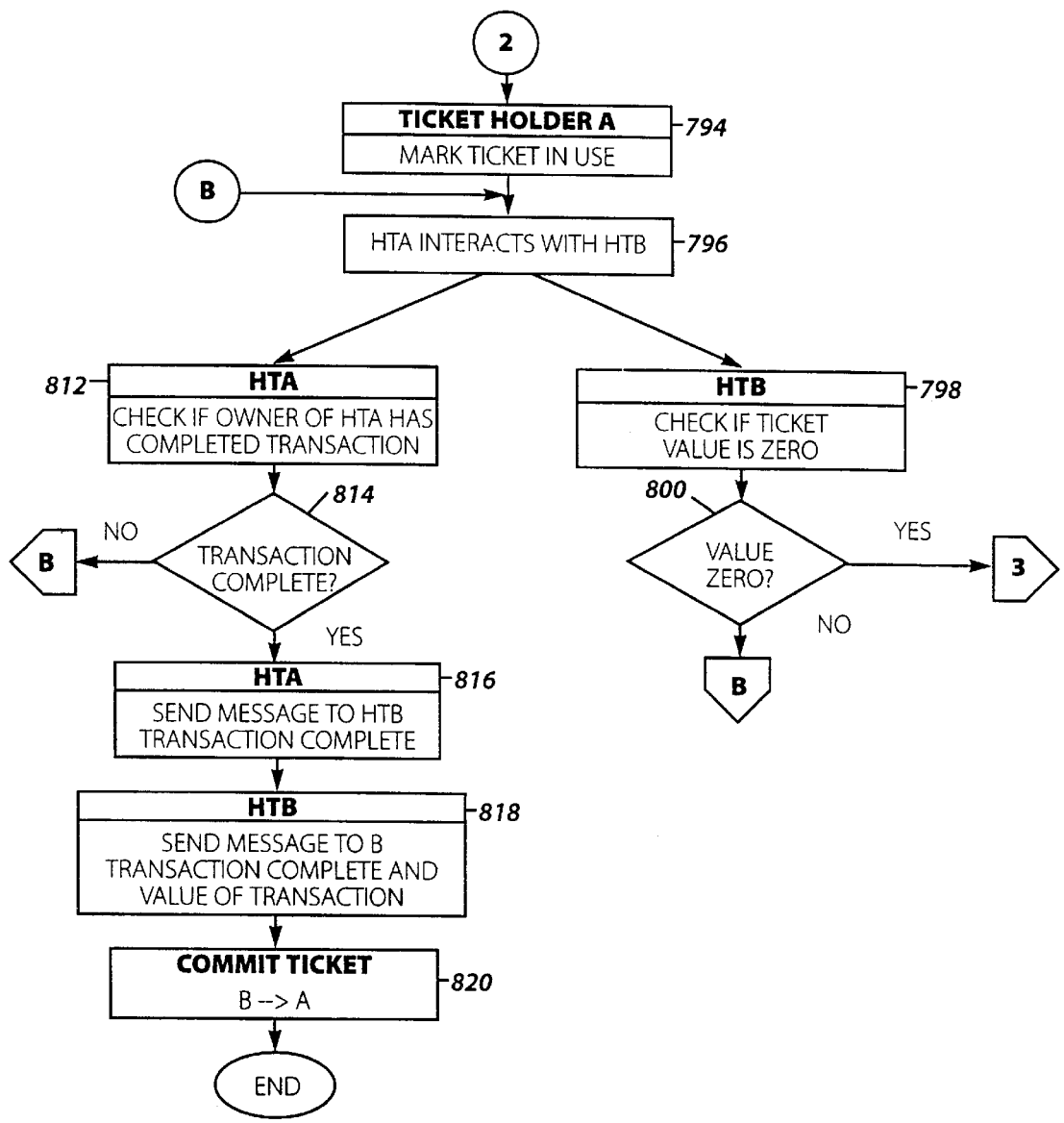
Figure 23D:
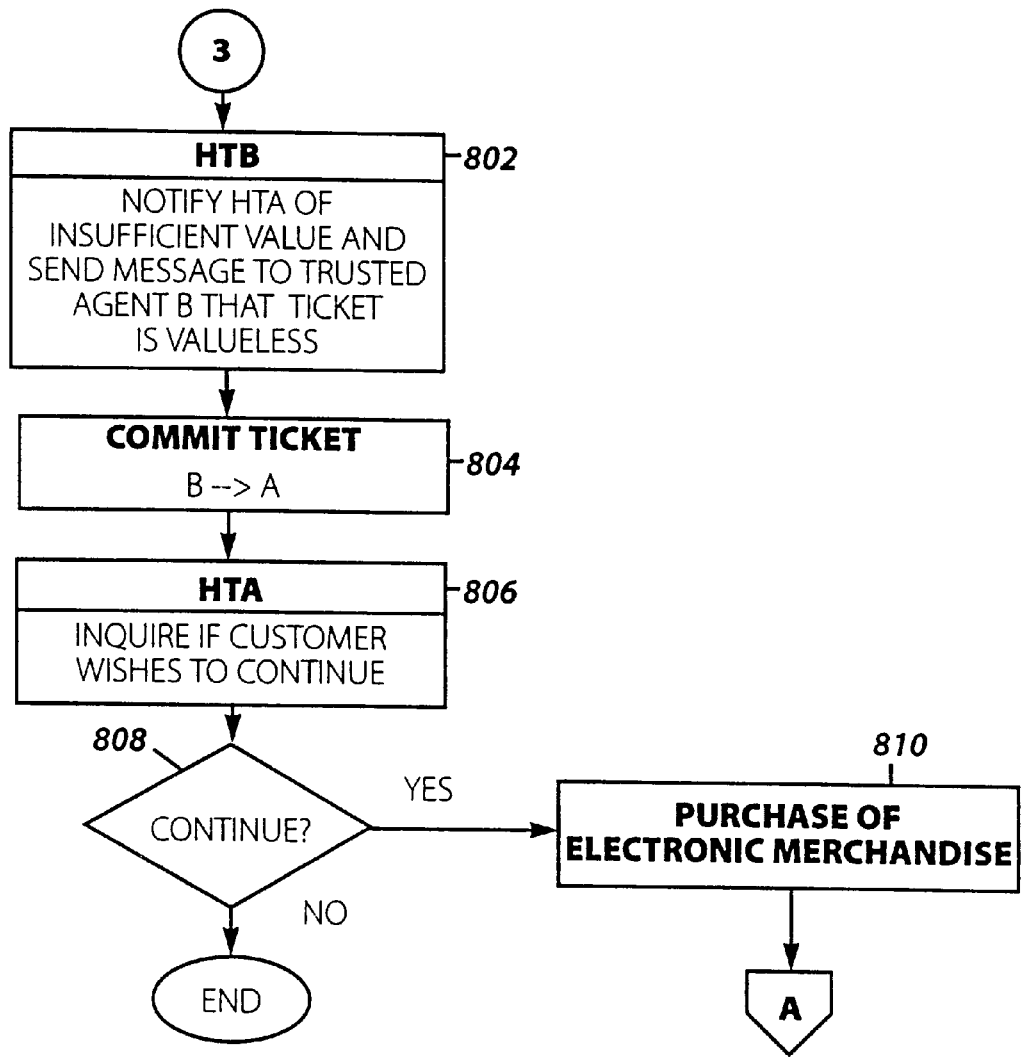

Referring back to FIG. 12, after payment the Open Merchandise subroutine is called (step 434). Referring to FIG. 22, Purchase A checks if merchandise is an electronic object (steps 736–738). If so, Ticket Holder A sends the decryption key and the electronic object identifier from the decryption ticket to a host transaction application for its use in decryption of the electronic object (steps 740–742). If, however, the merchandise is a communications ticket with a decryption key, then Ticket Holder A sends the decryption key to the HTA (step 746). The HTA uses the key for decrypting communications (step 748). If the merchandise is neither an electronic object nor a communications ticket with decryption key, then the process simply ends. The other forms of ticket 8 must be presented in order to obtain services.

Present Ticket

Referring to FIG. 23, when the owner of a customer trusted agent A wants to use a ticket for receiving services from the owner of a merchant trusted agent B, a host transaction application A (HTA) connects to a host transaction application B (HTB) (steps 750–752). HTA sends a message to its trusted agent to "Present Ticket" and HTB sends a message to its trusted agent to "Receive Ticket" (steps 754–756).

The trusted agents establish a session (step 758) and A checks B's merchant credential (step 760). Ticket Holder A requests the ticket ID from the host and presents a list of tickets which it holds (step 762). To Host A sends this message to HTA so that the customer can choose which ticket to present (step 764). After the customer chooses the appropriate ticket, HTA sends the ticket's ID to trusted agent A (steps 766–768). Ticket Holder A retrieves the selected ticket and checks if it is active (steps 770–772). A ticket 8 is "active" if it still has value. For example, in the case of an event ticket the status field 100 indicates whether the ticket 8 has already been presented and is thus valueless. In the case of a communications ticket the Time Available field 116 indicates the remaining value in the ticket 8. If the ticket 8 is not active, then To Host A sends a message to HTA that the ticket is inactive and the transaction is aborted (steps 774–776).

If the ticket 8 is active, then Present Ticket A sends a copy of the ticket to B (steps 778–780). Receive Ticket B receives the ticket and checks if it is both valid and active (steps 782–784). If not active and valid, the transaction is aborted (step 786). If valid and active, then To Host B notifies HTB to deliver services to HTA (step 788). The remaining value of A's ticket is also passed since the ticket may be a type having value that is used up incrementally as services are rendered (e.g., similar to a prepaid phone card). Receive Ticket B then sends a message to A that the ticket 8 is now in use (steps 790–792). Ticket Holder A marks the ticket 8 as "In Use" (step 794).

HTA interacts with HTB in the appropriate fashion depending on the type of ticket and services being rendered (step 796). HTB continually monitors the remaining ticket value until the value is reduced to zero (steps 798–800). At this point, HTB notifies HTA of the insufficient value and sends a message to B that the ticket is valueless (steps 802). The Commit Ticket subroutine is then called (step 804).

Figure 24:
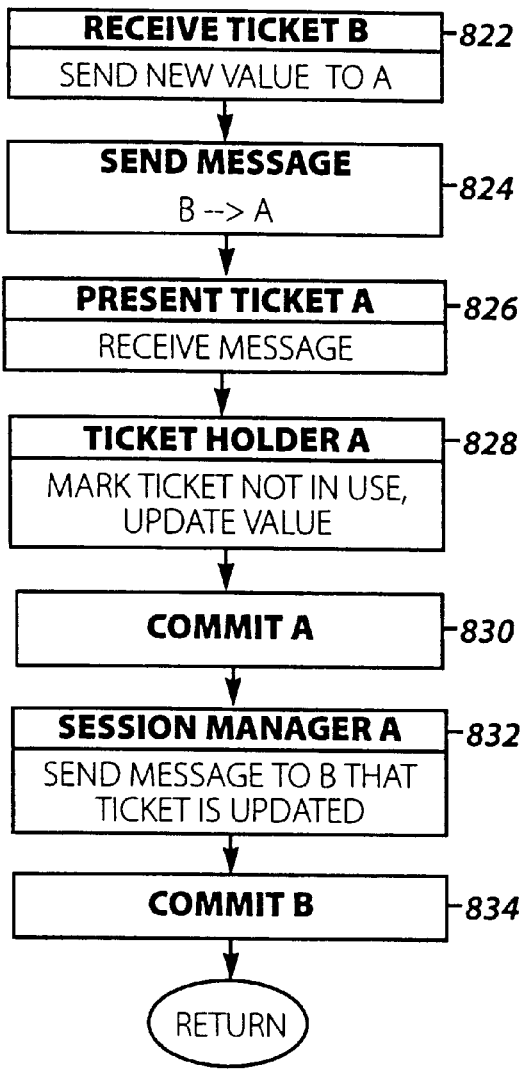
FIG. 24 illustrates a Commit Ticket protocol.

Referring to FIG. 24, Receive Ticket B sends the new remaining ticket value, in this case zero, to Present Ticket A (steps 822–826). Ticket Holder A then marks the ticket 8 as "Not In Use" and updates the ticket value (step 828). Finally, trusted agent A commits, Session Manager A informs B that the ticket 8 is updated, and trusted agent B commits (steps 830–834). Referring back to FIG. 23, HTA then inquires whether the customer wishes to continue (steps 806–808). If so, then trusted agent A undertakes to purchase more ticket value (step 810).

During HTA to HTB interaction (step 796), HTA checks if the owner of HTA has completed the transaction (steps 812–814). If the transaction is completed, then HTA informs HTB which, in turn, informs its trusted agent (steps 816–818). HTB also sends its trusted agent the remaining ticket value. Finally, the Commit Ticket subroutine is called (step 820).

Ticket Transfer

Tickets 8 may be transferred between trusted agents 120 (aside from the initial issuing of the ticket). There are several reasons an owner may wish to do this. For example, if a ticket 8 was purchased via a desktop transaction device 122 (e.g., a CTD 188 embedded in a personal computer), then the owner may wish to transfer it to a portable device (e.g., an electronic wallet). Or, if the owner buys a ticket 8 for a friend or relative, then the owner can transfer the ticket to the other party for their use. Another situation is when the owner purchases a new transaction device 122 and wishes to transfer his credentials to the new device.

Figure 25A:
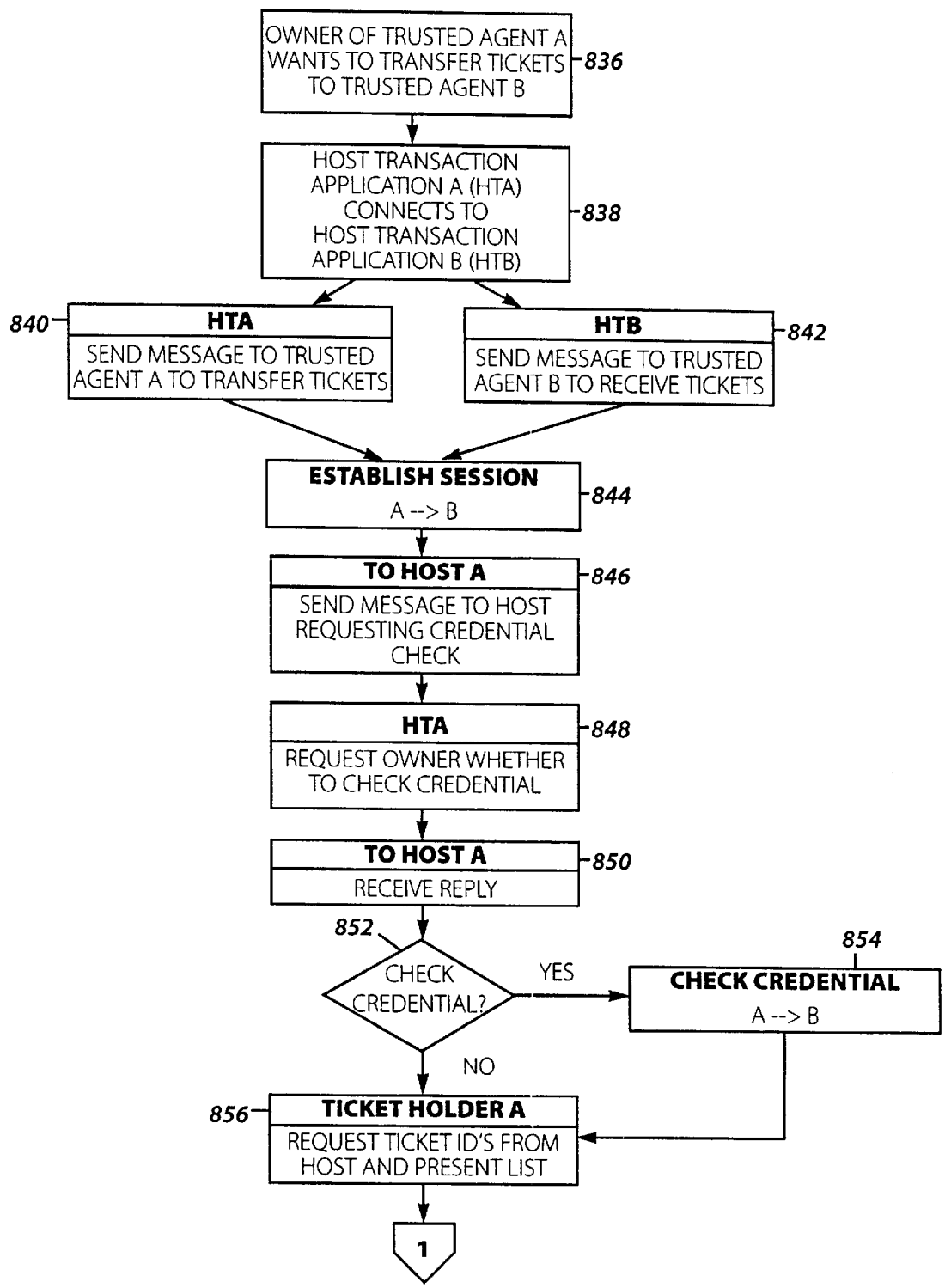
FIGS. 25A–25C illustrate a Transfer Tickets protocol.
Figure 25B:
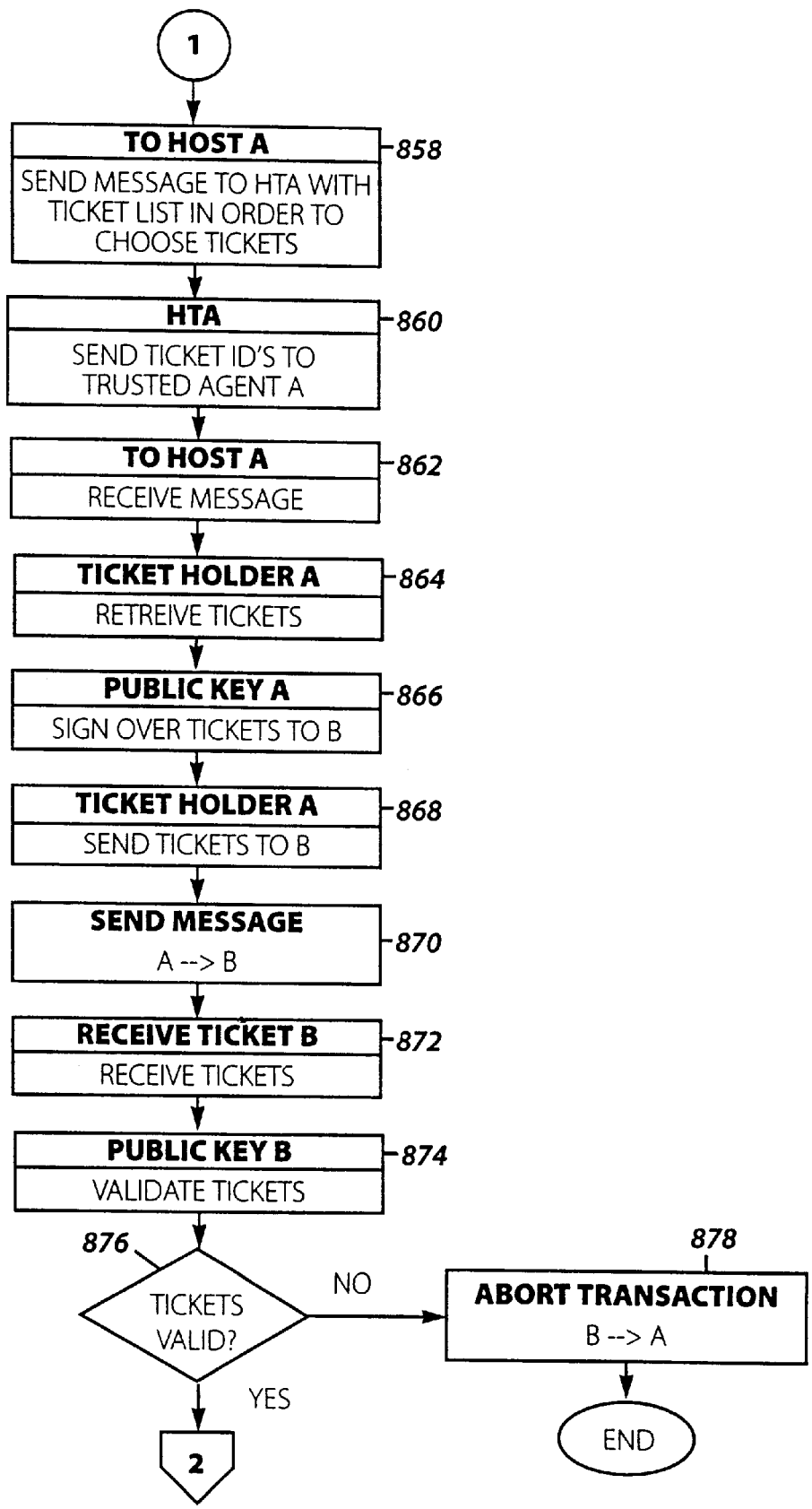
Figure 25C:
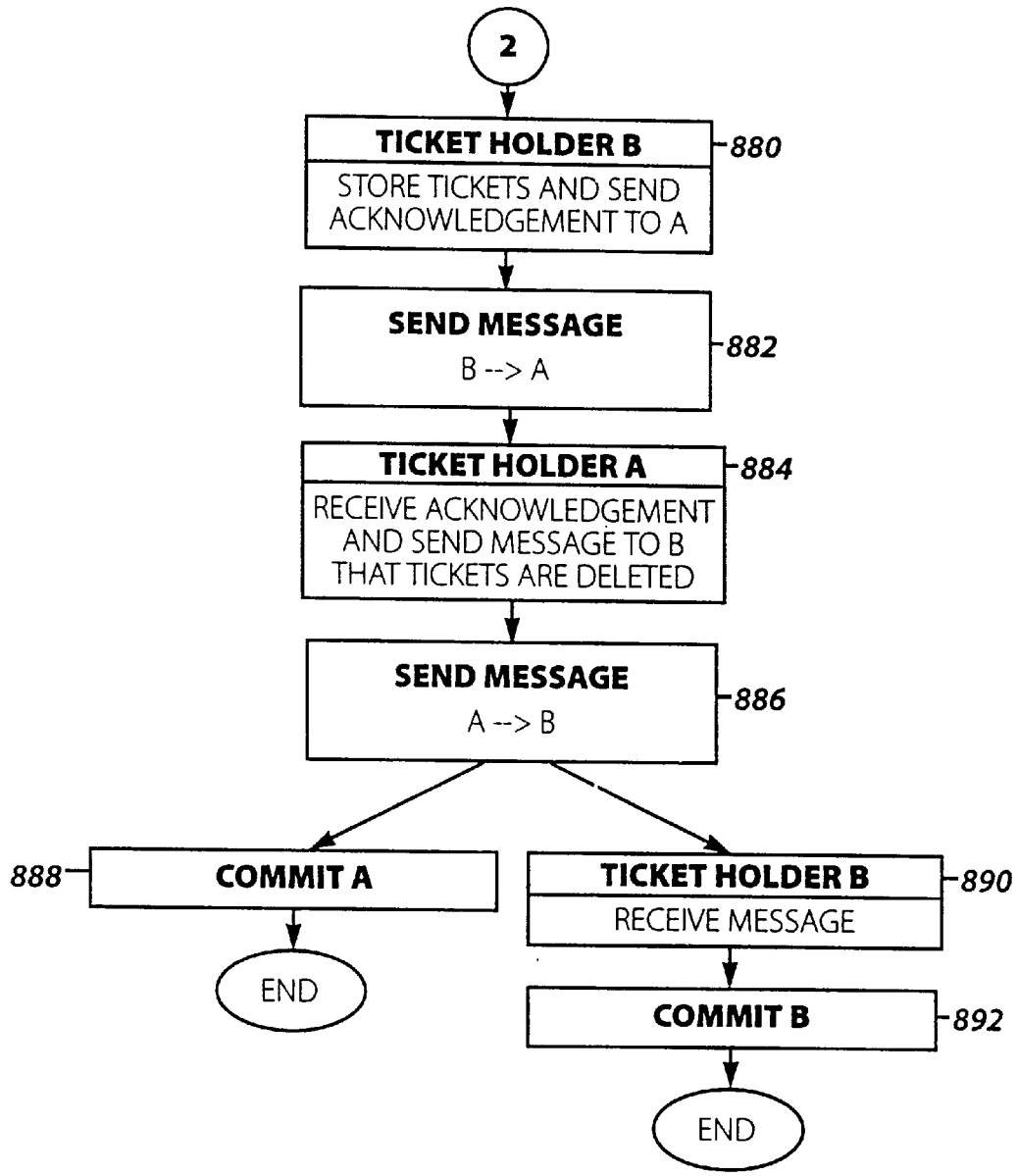

Referring to FIG. 25, there is shown the procedure followed when the owner of trusted agent A wants to transfer one or more tickets 8 to trusted agent B (step 836). Initially, HTA connects to HTB (step 838). HTA then instructs its trusted agent to "Transfer Ticket(s)" and HTB instructs its trusted agent to "Receive Ticket(s)" (steps 840–842). Next, the trusted agents establish a secure session (step 844). To Host A then sends an inquiry to the transaction device owner via HTA whether to check the identifying credential of the party to receive the ticket(s) (steps 846–848). If there is no credential check or a credential check is performed successfully (steps 850–854), then Ticket Holder A requests the ID's of the tickets to be transferred (step 856). Tickets are selected from a list of tickets held by trusted agent A. To Host A sends the message to HTA with the ticket list, the owner chooses, and To Host A receives the response identifying the selected ticket(s) (steps 858–862).

Ticket Holder A retrieves the selected ticket(s) (step 864). Public Key A then signs over the ticket(s) to B by adding the appropriate transfer information to the Transfer History section and appending the digital signature to the Sender Signatures section (step 866). Ticket Holder A then sends the ticket(s) to Receive Ticket B for validation by Public Key B (steps 868–876). If the ticket(s) are not valid, then the transaction is aborted (step 878). If the ticket(s) are valid, then Ticket Holder B stores the ticket(s) and sends an acknowledgement to A (steps 880–882). Ticket Holder A receives the acknowledgement and deletes the ticket(s) (step 884). Trusted agent A informs Ticket Holder B that the tickets are deleted (steps 884–886) and commits (step 888). Ticket Holder B receives the message (step 890) and then trusted agent B commits (step 892).

Credentials

A customer can acquire credentials in person from an Identification Authority. The credentials could be a driver's license from a motor vehicle administration, a passport from the State Department or a Foreign Office, a credit or debit card from a bank, or a corporate seal (identifier) for a bureau of commerce. The credentials can be revalidated remotely or even acquired remotely in the first place if the trusted agent 120 already contains credentials for proof of identity. With credentials it would be possible to open a checking account remotely even if the customer is unknown to the bank.

Referring to FIG. 26, there is shown the flow diagram followed when the owner of trusted agent A decides to acquire a credential from an identification authority in person (step 894). First, the owner of A presents proof of his/her identity to a representative of the identification authority. The representative then enters various information (e.g., name, address, etc.) via HTB of authority trusted agent B. (Steps 896–898). Next, the owner of A instructs his HTA to acquire a credential. In response, HTA sends the message "Acquire Credential" to trusted agent A. (Steps 900–902). Meanwhile, HTB sends the message "Create Credential" to trusted agent B (step 904). Trusted agent B then establishes a session with trusted agent A (step 906). To Host B notifies HTB that a session has been established. HTB sends the various credential information to trusted agent B (steps 908–910). Create Credential then constructs credential information (i.e., the Identifier and Components sections 10, 12 of a credential ticket) (step 912).

Figure 27A:
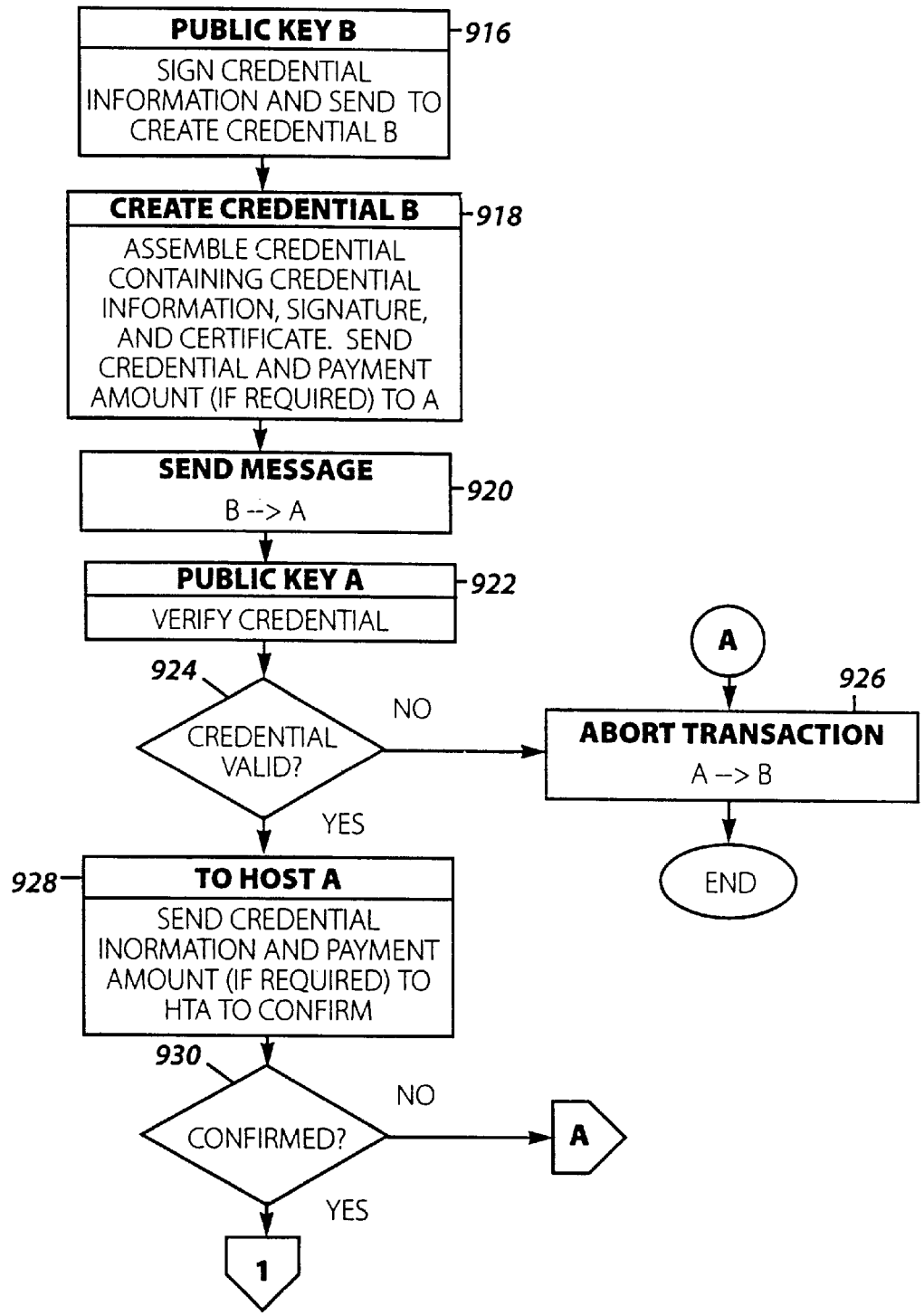
FIGS. 27A–27B illustrate a Deliver Credential protocol.
Figure 27B:
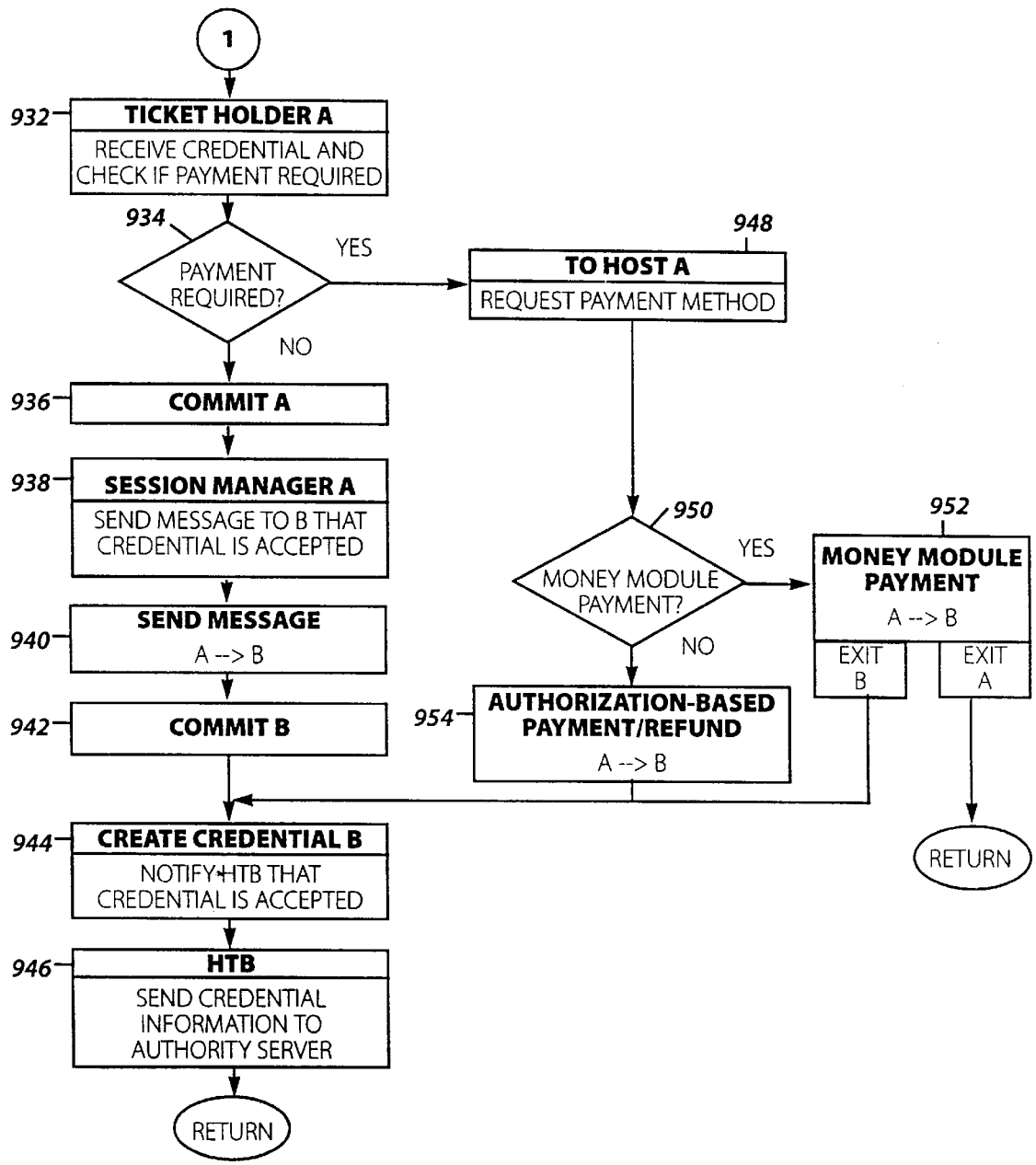

The Deliver Credential subroutine is then called for passing the newly created credential to trusted agent A (step 914). Referring to FIG. 27, Public Key B signs the credential information (with the ATA's private key) and sends it to Create Credential B (step 916). Create Credential B assembles a credential containing the credential information, signature, and certificate (the ATA's cert(TA)) (step 918). Create Credential B then sends the newly created credential to trusted agent A (step 920). If required, Create Credential also sends the price of the credential to A.

Public Key A verifies the credential (steps 922–924). If invalid, the transaction is aborted (step 926). If valid, then To Host A sends the credential information and payment amount (if required) to HTA for confirmation (steps 928–930). If not confirmed by the owner of trusted agent A, then the transaction is aborted (step 926).

If the credential is confirmed, then Ticket Holder A receives the credential and checks if payment is required (steps 932–934). If no payment is required, then trusted agent A commits (step 936) and sends a message to trusted agent B that the credential has been accepted (steps 938–940). Trusted agent B commits upon receiving the message (step 942). Create Credential B then notifies HTB that the credential is accepted and HTB sends the credential information to the credential database maintained by the authority server (steps 944–946).

If, on the other hand, payment for the credential is required, then To Host A requests the owner of trusted agent A to choose a payment method (steps 948–950). If a money module payment is selected, then the Money Module Payment subroutine is called (step 952). At the point where B exits the subroutine, Create Credential B notifies HTB that the credential is accepted and HTB sends the credential information to the authority server (steps 944–946). If, instead, the owner of trusted agent A decides to pay with a credit or debit card, then the Authorization-Based Payment/Refund subroutine is called (step 954).

Figure 28A:
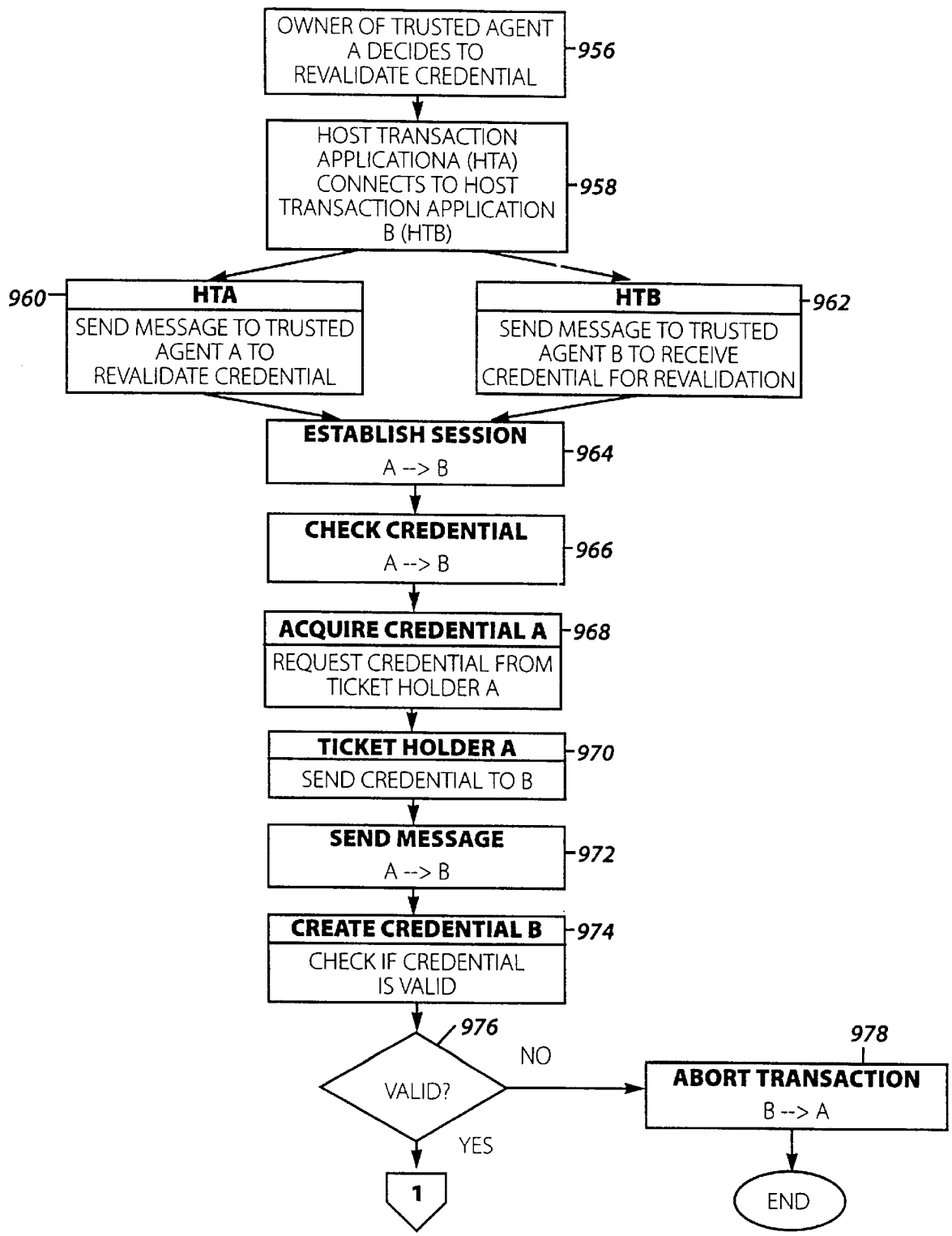
FIGS. 28A–28B illustrate a Revalidate Credential Remotely protocol.
Figure 28B:
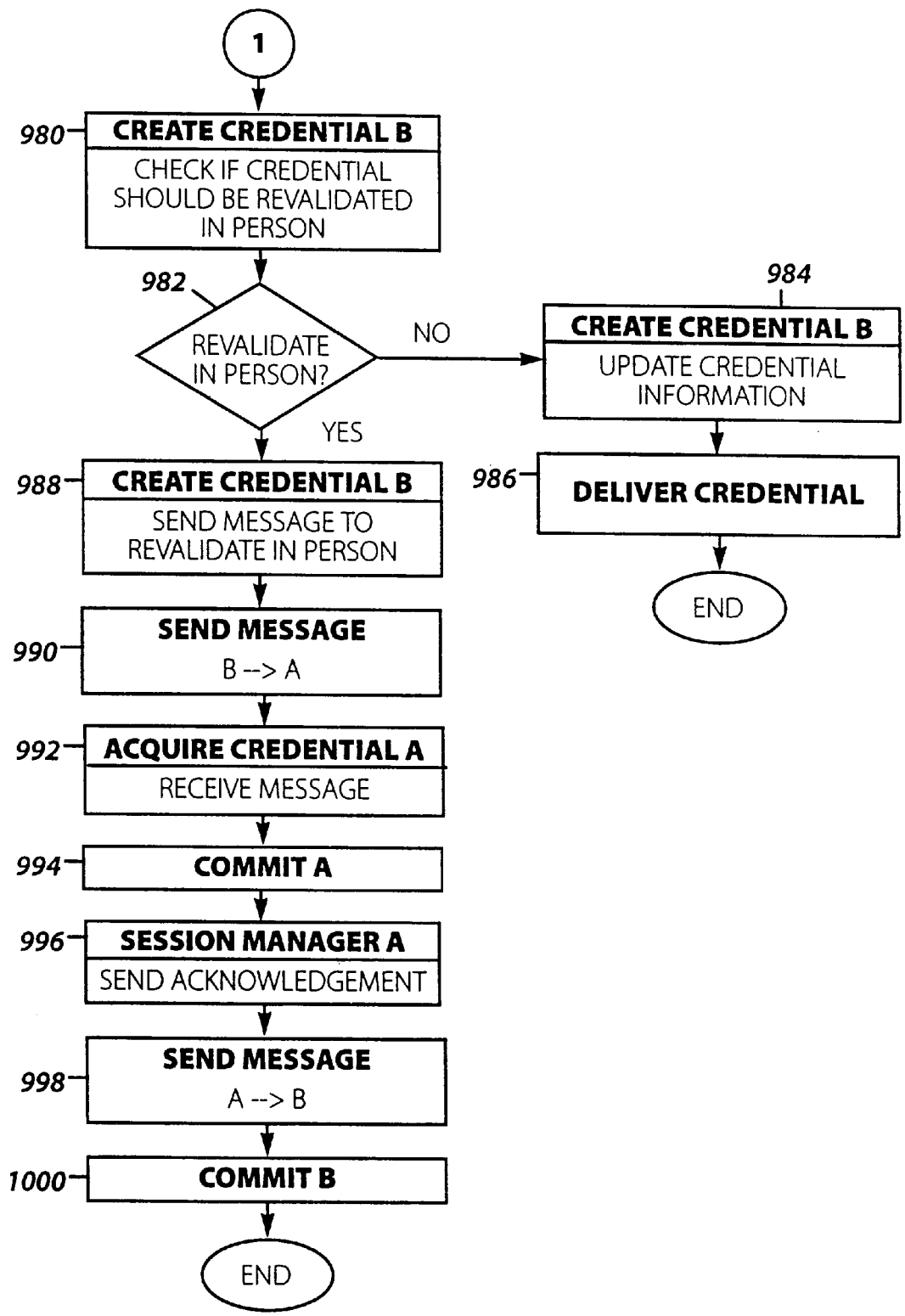

It may be desirable for identification authorities to update their credential information on a periodic basis. Revalidation is thus required by giving credentials expiration dates. FIG. 28 shows how the owner of trusted agent A can revalidate a credential remotely (step 956). Initially, HTA connects to HTB (step 958). HTA sends the message "Revalidate Credential" to trusted agent A (step 960). HTB sends the message "Receive Credential For Revalidation" to trusted agent B (step 962). Trusted agent A then establishes a secure session with trusted agent B (step 964).

Trusted agent A first checks the authority's credential (step 966). Authority credentials may be issued under the supervision of the Trusted Agency. Acquire Credential A requests the credential specified for revalidation from Ticket Holder A which sends the credential to authority trusted agent B (steps 968–972). Create Credential B checks if the credential is valid (steps 974–976). If not valid, the transaction is aborted (step 978). If valid, then Create Credential B checks if the credential should be revalidated in person (steps 980–982). If the credential may be revalidated remotely, then Create Credential B updates the credential information including a new expiration date (step 984). The Deliver Credential subroutine is then called (step 986).

If the credential must be revalidated in person, then Create Credential B sends the message "Revalidate In Person" to trusted agent A (steps 988–990). Acquire Credential A receives the message (step 992). Trusted agent A then commits (step 994) and Session Manager A sends an acknowledgement to trusted agent B (steps 996–998). Trusted agent B then commits (step 1000).

Identity-Based Money Module Payment

Figure 29A:
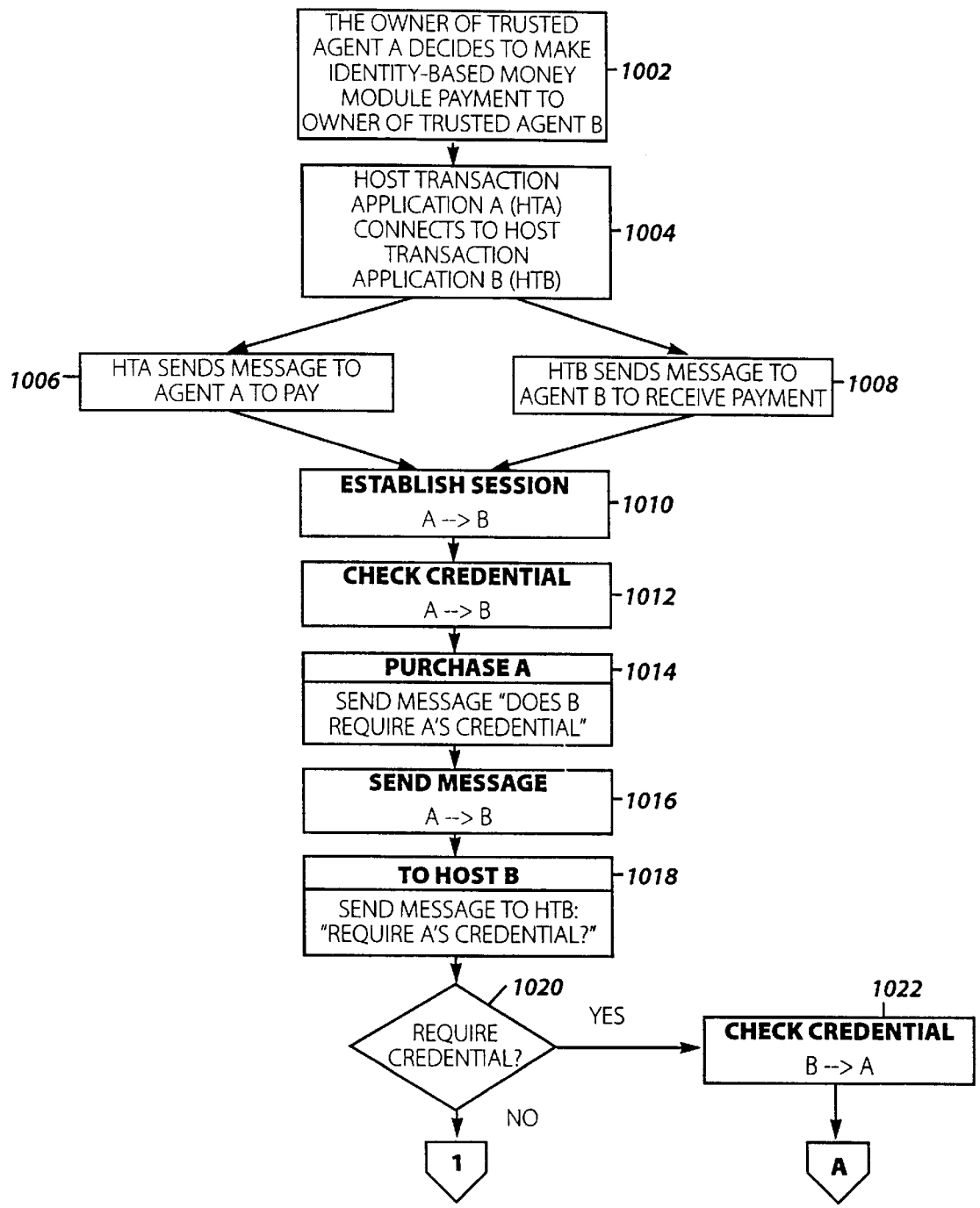
FIGS. 29A–29B illustrate an Identity-Based Money Module Payment protocol.
Figure 29B:
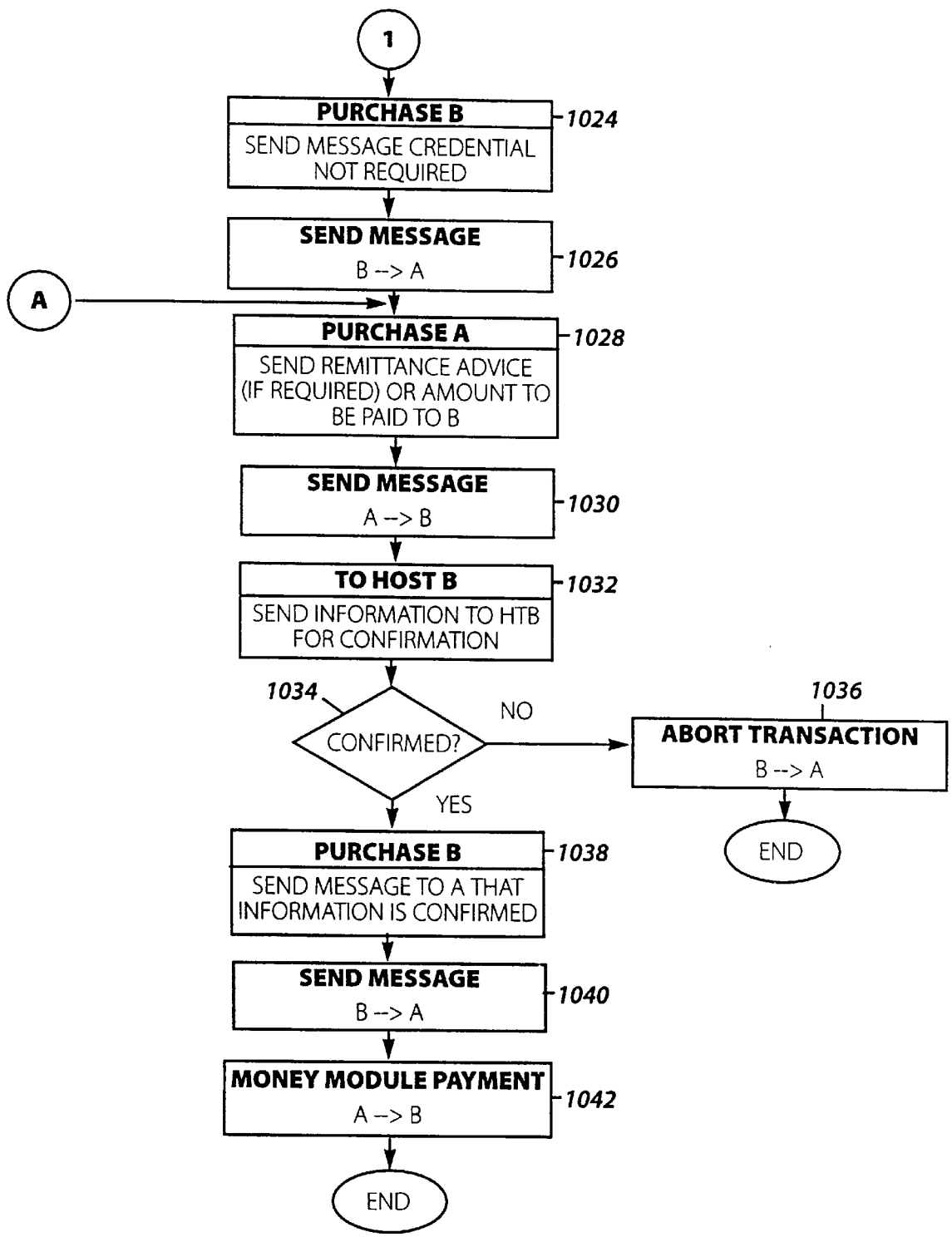
Figure 30A:
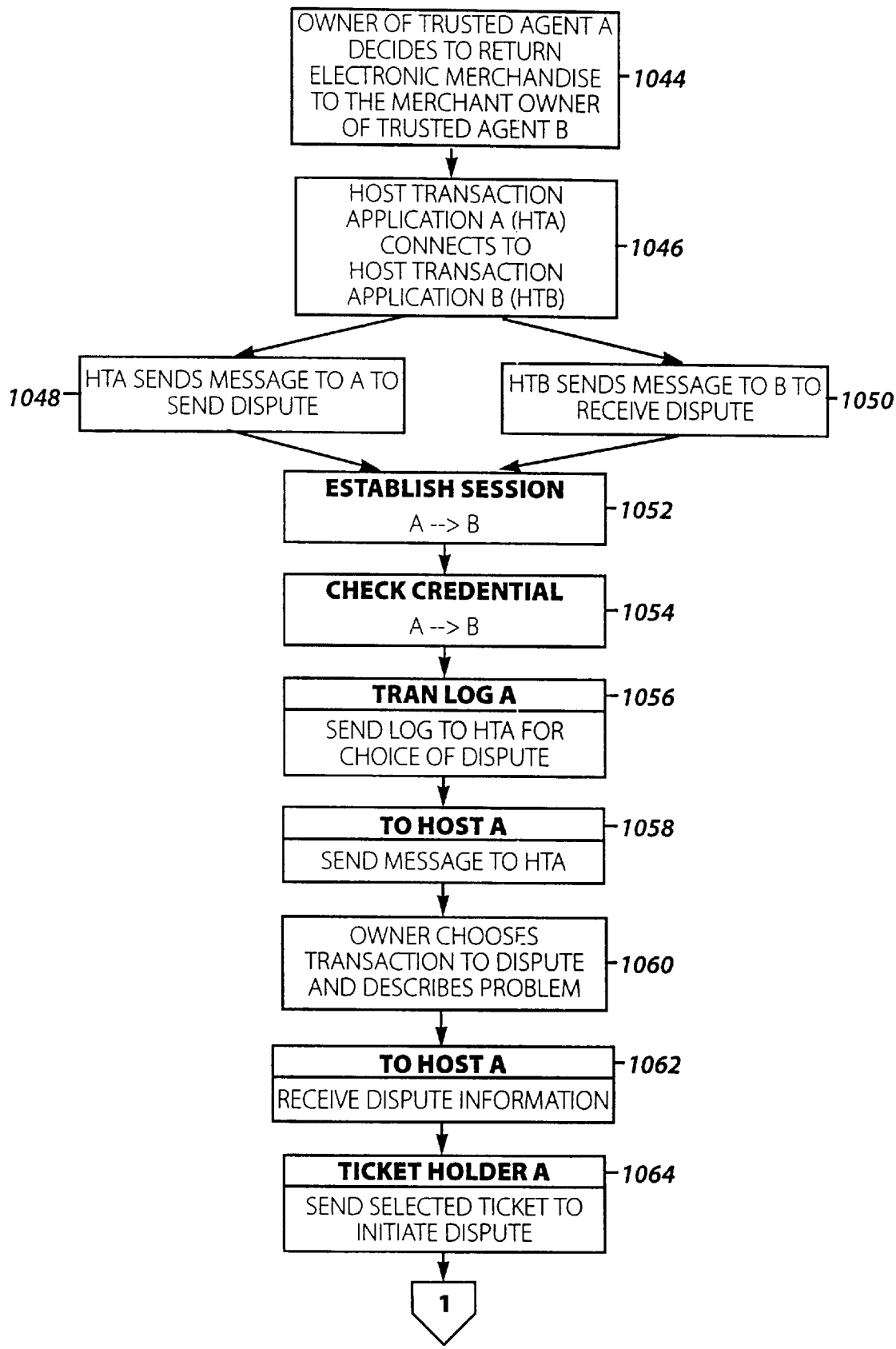
FIGS. 30A–30E illustrate a Dispute Over Electronic Merchandise protocol.
Figure 30B:
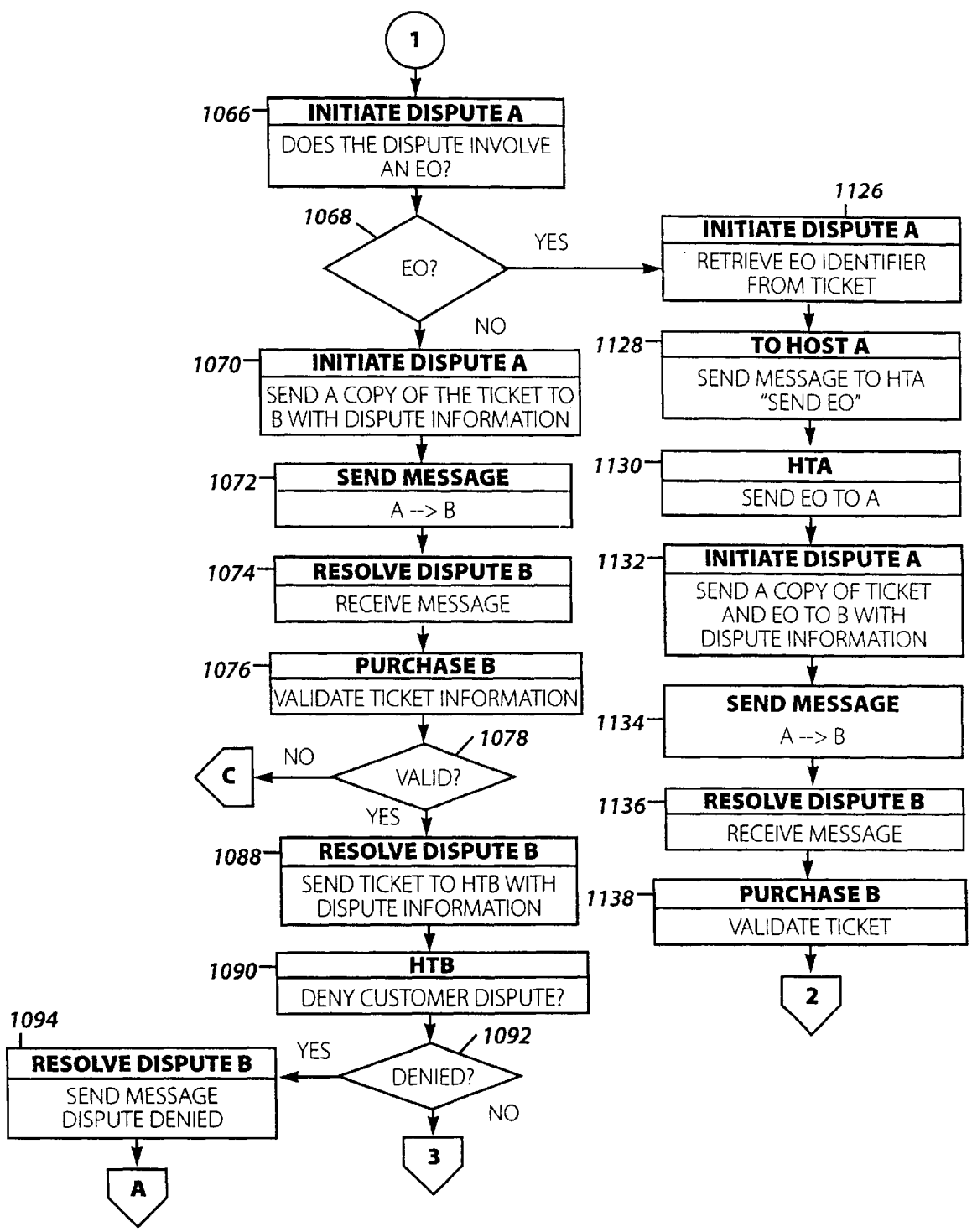
Figure 30C:
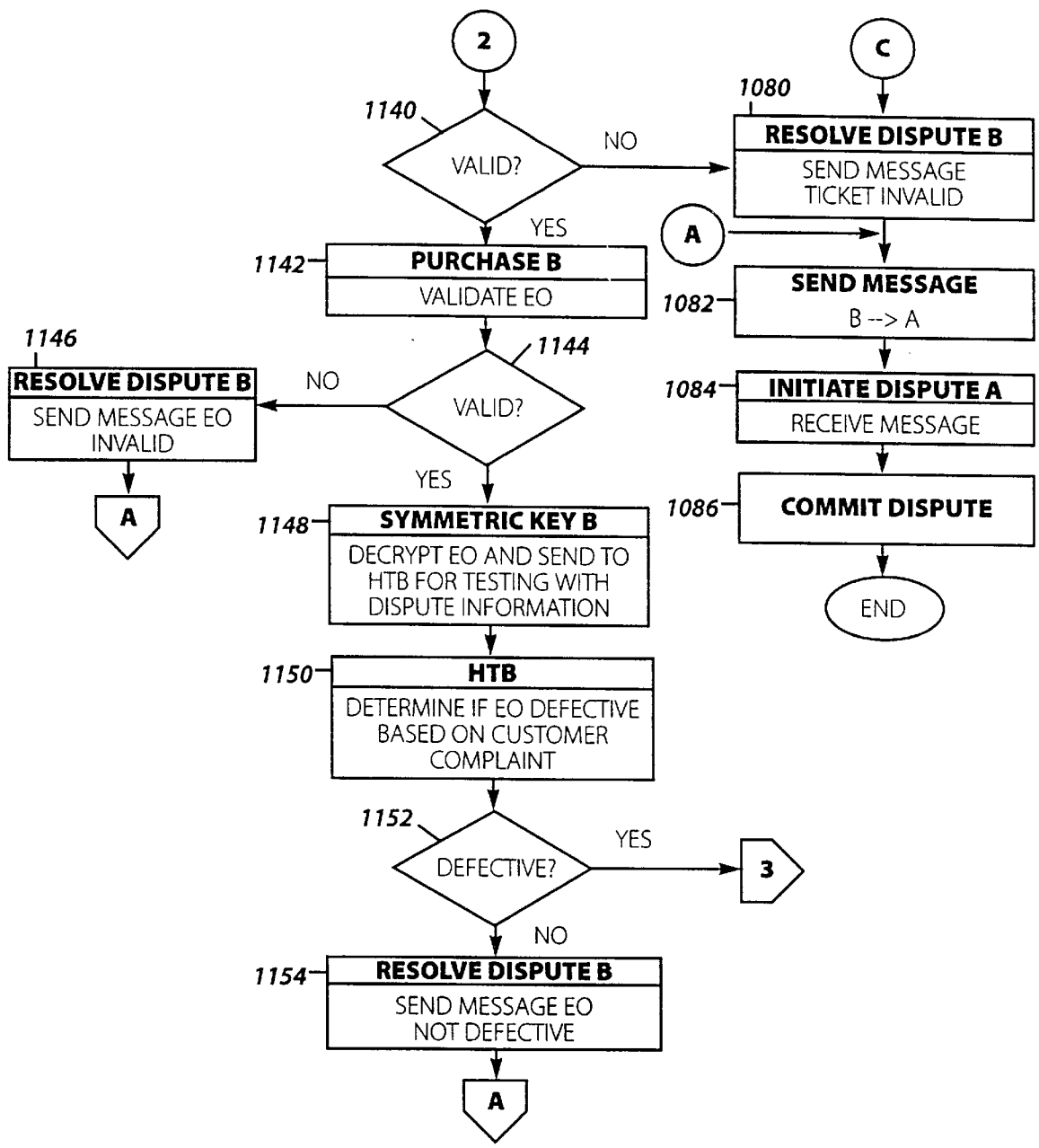
Figure 30D:
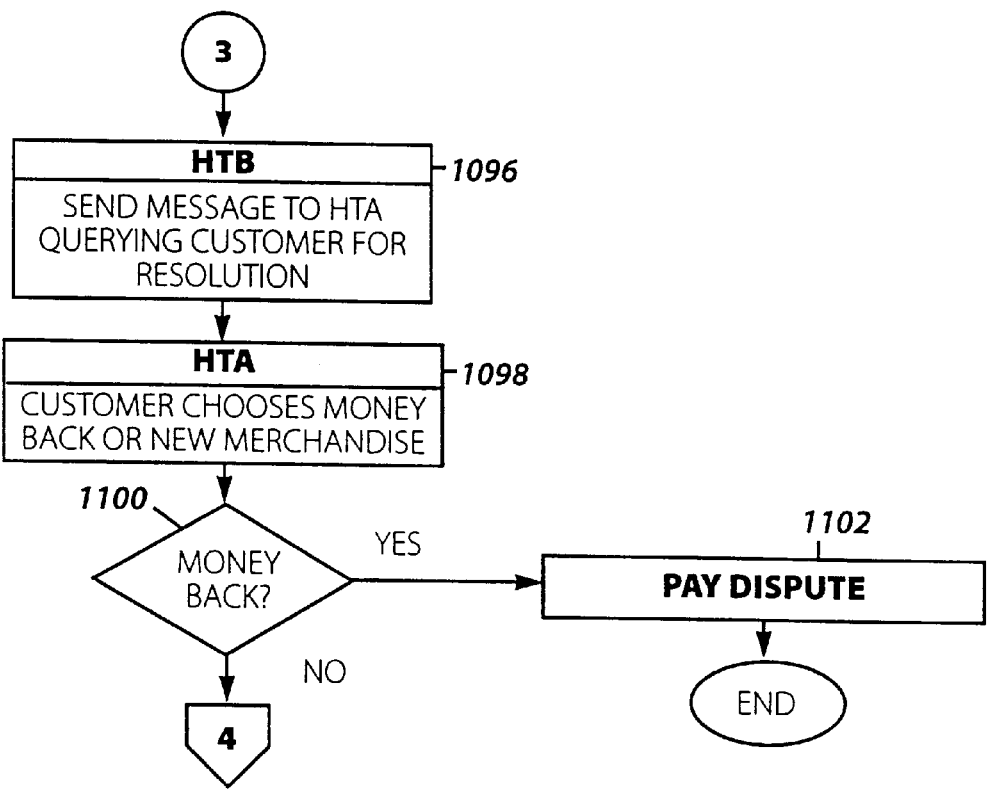
Figure 30E:
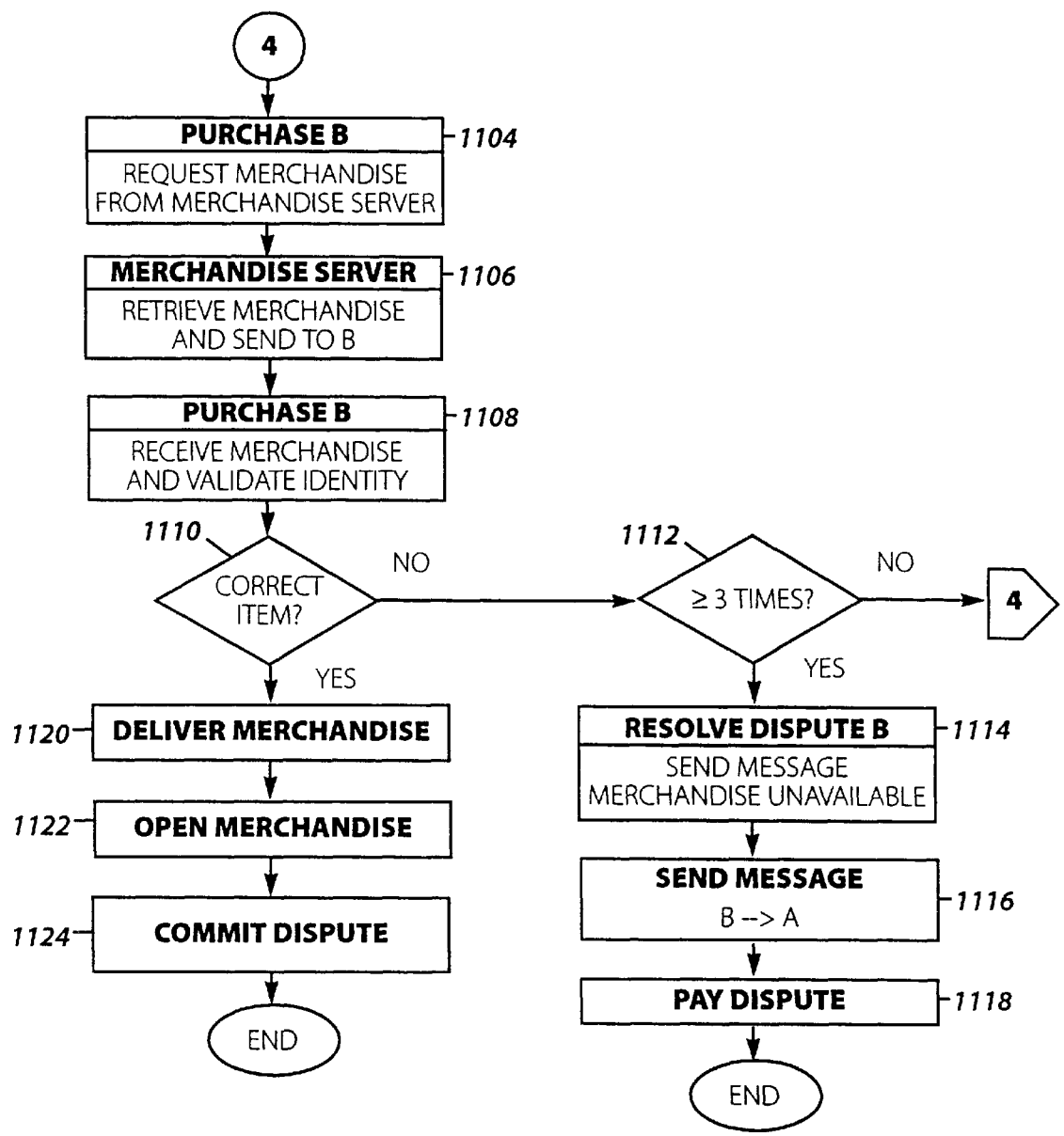

Electronic cash payments not involving the simultaneous purchase of electronic merchandise may be made using the flow diagram shown in FIG. 29. The owner of trusted agent A decides to make a money module payment to the owner of trusted agent B, where the owner of A wants to verify B's identity because they are transacting remotely (step 1002). HTA connects to HTB (step 1004). HTA sends the message "Pay" to its trusted agent (step 1006). HTB sends the message "Receive Payment" to its trusted agent (step 1008). A then establishes a secure session with B (step 1010).

Trusted agent A checks B's credential (step 1012). This credential may be a driver's license, credit card, or other acceptable credential. If the credential is valid and acceptable to A then Purchase A sends the message "Does B require A's credential" to trusted agent B (steps 1014–1016). To Host B then sends the message "Require A's Credential?" to HTB for checking if B requires A's credential (steps 1018–1020). If required, then B checks A's credential (step 1022). Again, various types of credentials may be used. If B does not require A's credential then Purchase B informs trusted agent A (steps 1024–1026).

Purchase A then sends a remittance advice specifying the amount to be paid (if a bill payment) or sends just the amount to be paid to trusted agent B (steps 1028–1030). To Host B sends the information to HTB for confirmation (steps 1032–1034). If not confirmed, the transaction is aborted (step 1036). If confirmed, then Purchase B informs A (steps 1038–1040). A money module payment is then initiated (step 1042__).

Disputes

In case a customer is dissatisfied with a purchase, the trusted agents 120 can act as surrogates for the customer and merchant for remote resolution of the dispute. For example, if an electronic object is perceived to be defective, the customer could connect to the merchant and enter into a dispute dialogue. The merchant cannot repudiate the electronic merchandise if it is validated by his trusted agent 4 [since this will be recorded in the transaction log of the customer's trusted agent 2].

If the customer is not satisfied with the result of the dispute interaction with the merchant, he can take his complaint to the Trusted Agency. The customer's transaction log shows that the dispute was denied by the merchant first. The dispute and accompanying documentation can be presented to a trusted server 200 on the Trusted Agency Network 208. The interaction is then similar to the interaction with the merchant's trusted agent 4. Most merchants will want to resolve the dispute directly with the customer, and not have the customer resort to the Trusted Agency resolution process. Too many disputes could jeopardize the merchant's status with the Trusted Agency.

The dispute process enables the customer to produce electronic merchandise and prove that the merchandise was the merchandise purchased from the merchant. The dispute process also protects the merchant against fraudulent claims. The merchant can believe the customer's trusted agent 2 by verifying that the customer's trusted agent 2 received the merchandise. The customer's complaint can then be resolved by examining the merchandise for defects.

FIG. 30 shows the procedure followed when the owner of trusted agent A decides to return electronic merchandise to the owner of merchant trusted agent B (step 1044). Initially, HTA connects with HTB. HTA sends the message "Send Dispute" to its trusted agent. HTB sends the message "Receive Dispute" to its trusted agent. Trusted agent A then establishes a secure session with trusted agent B. (Steps 1046–1052).

Trusted agent A checks B's merchant credential (step 1054). Tran Log A sends its log via To Host A to HTA so that the owner can choose which transaction to dispute and describe the problem (steps 1056–1060). To Host A receives the dispute information from HTA (step 1062). Ticket Holder A then sends the selected ticket to Initiate Dispute A (step 1064).

Initiate Dispute A checks if the dispute involves an electronic object (steps 1066–1068). If there is no EO (only a ticket is involved), then Initiate Dispute A sends a copy of the ticket along with the dispute information to trusted agent B (steps 1070–1072). Resolve Dispute B receives the message and Purchase B validates the ticket (steps 1074–1078). If the ticket is invalid, then Resolve Dispute B sends the message "Ticket Invalid" to Initiate Dispute A (steps 1080–1084). The Commit Dispute subroutine is called (step 1086).

Figure 31:
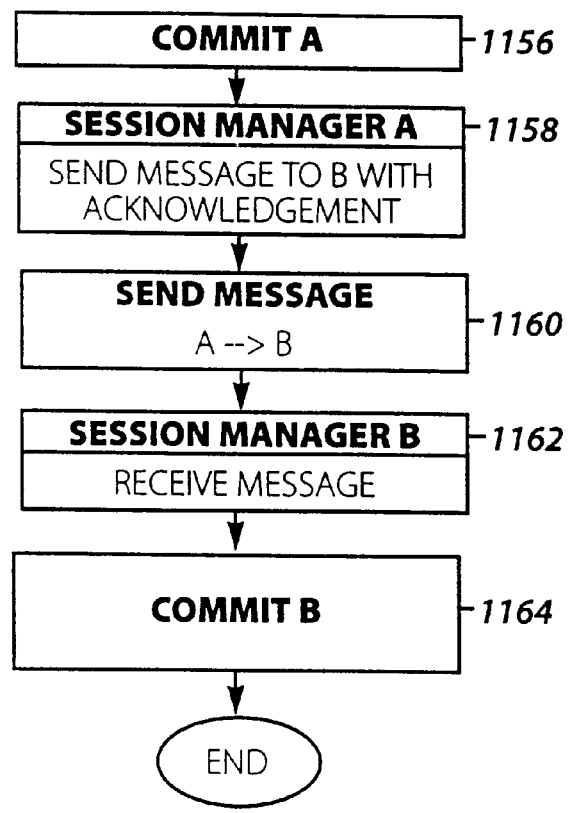
FIG. 31 illustrates a Commit Dispute protocol.

Referring to FIG. 31, trusted agent A commits (step 1156). Session Manager A sends an acknowledgement to Session Manager B (steps 1158–1162). Trusted agent B then commits (step 1164).

Referring back to FIG. 30, if, however, the ticket was valid (step 1078), then Resolve Dispute B sends the ticket and dispute information to HTB. The merchant then reviews the dispute and decides whether or not to deny the customer dispute (steps 1088–1092). If denied, Resolve Dispute B sends the message "Dispute Denied" to trusted agent A which initiates the Commit Dispute subroutine (steps 1094, 1082–1086).

If the merchant does not deny the dispute, then HTB sends a message to HTA querying the customer for resolution (step 1096). The customer then chooses if he wants a refund or new merchandise (assuming the merchant allows these options) (steps 1098–1100).

Figure 32:
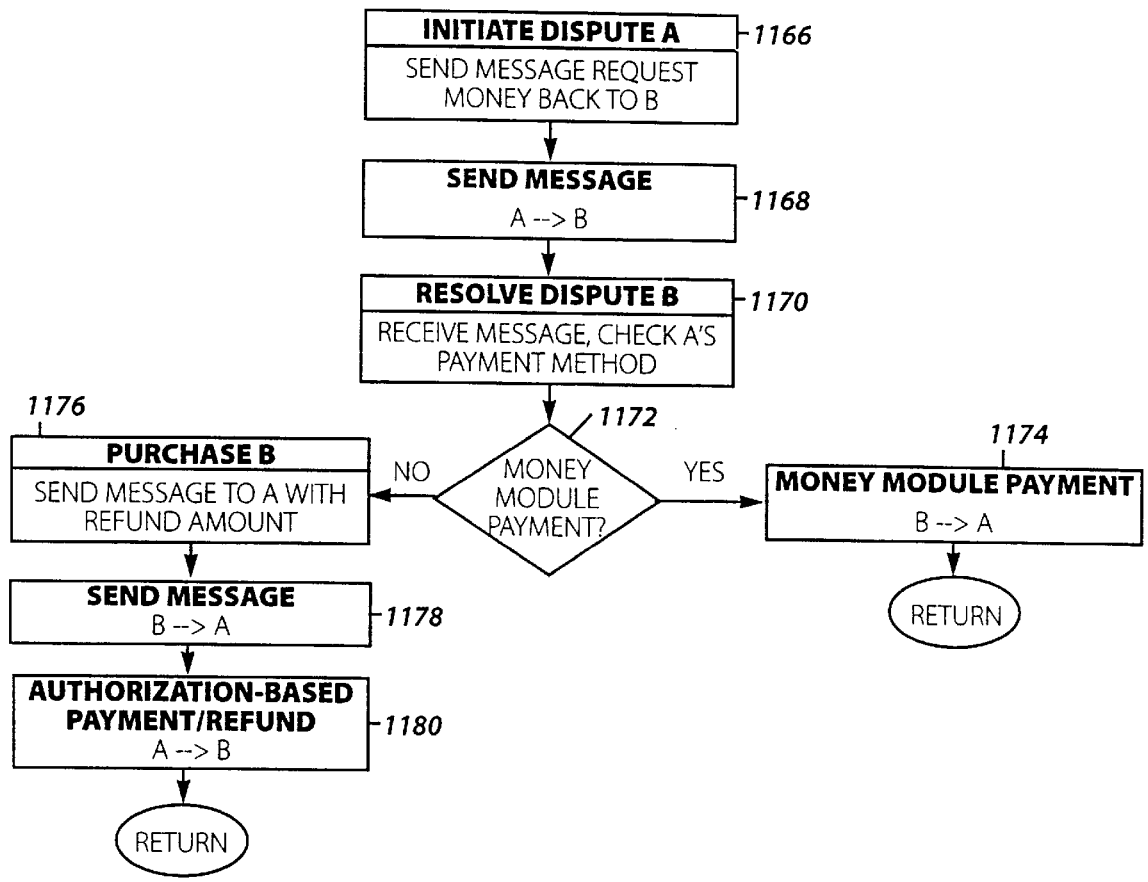
FIG. 32 illustrates a Pay Dispute protocol.

If the customer wants a refund, then the Pay Dispute subroutine is called (step 1102). Referring to FIG. 32, Initiate Dispute A sends the message "Request Money Back" to trusted agent B (steps 1168–1170). Resolve Dispute B receives the message and checks A's payment method (step 1172). If a money module payment is desired, then the Money Module Payment subroutine is called (step 1174).

If a credit or debit card refund is desired, then Purchase B sends a message to A with the refund amount (steps 1176–1178). The Authorization-Based Payment/Refund subroutine is then called (step 1180). Referring to FIG. 21, there is shown the flow diagram followed in the event of a refund. If a refund transaction is being performed (steps 704–706) then To Host B sends a message to HTA containing the credit or debit card credential and the amount to be refunded (step 726). The card authorization process is performed (step 728). Purchase B then checks if the refund was authorized (steps 730–732). If not authorized, then the transaction is aborted (step 702). If authorized, then Purchase B sends the message "Refund Authorized" to trusted agent A (steps 734, 718). Trusted agent B then commits (step 720). Upon receiving B's message, Ticket Holder A updates the ticket with the refund information (step 722). Trusted agent A then commits (step 724).

Referring back to FIG. 30, if instead of a refund the owner of trusted agent A chooses to receive new merchandise, then Purchase B requests merchandise from the merchandise server (step 1104). The merchandise server retrieves the merchandise and sends it to trusted agent B. Purchase B receives the merchandise and validates its identity (steps 1106–1110). If the item is correct, then the subroutines Deliver Merchandise, Open Merchandise, and Commit Dispute are called (steps 1120–1124). If the item is not correct, and unobtainable from the merchandise server, then Resolve Dispute B sends the message "Merchandise Unavailable" to trusted agent A (steps 1114–1116). In this event, a refund is initiated (step 1118).

If the merchandise dispute involves an electronic object (steps 1066–1068), then Initiate Dispute A retrieves the electronic object identifier from its associated decryption ticket. To Host A, then instructs HTA to send the electronic object to trusted agent A (steps 1126–1130). Initiate Dispute A then sends a copy of the ticket and the EO to B along with the dispute information (steps 1132–1134). Resolve Dispute B receives the message (step 1136). Purchase B then validates the ticket (steps 1138–1140). If the ticket is invalid, then trusted agent A is so informed and the dispute is completed (steps 1080–1086). If the ticket is valid, then Purchase B validates the electronic object (steps 1142–1144). If not valid, then Resolve Dispute B informs trusted agent A (step 1146) and the dispute is completed (steps 1082–1086). If the electronic object is valid, then Symmetric Key B decrypts the EO and sends it to HTB for testing. The dispute information is also sent to HTB. (Steps 1148–1152).

HTB determines if the electronic object is defective based on the customer complaint. If the merchant determines that the merchandise is not defective, then Resolve Dispute B informs trusted agent A (step 154) and the dispute is completed (steps 1082–1086). If, however, the merchant determines that the merchandise is defective, then the customer may choose either a refund or new merchandise (steps 1096–1098).

Electronic Monetary System

An electronic monetary system (EMS) which may be used in conjunction with the described system for open electronic commerce is found in U.S. Pat. No. 5,453,601. Described below are various improvements and supplements to that EMS.

Overview

The term "money module" as used in U.S. Pat. No. 5,453,601 generically refers to transaction money modules, teller money modules, and money generator modules. The money modules 6 previously discussed which cooperate with trusted agents 120 generally correspond, in the preferred embodiment, to transaction money modules. In the following discussion of the EMS, the term "money module"

is again used in its generic sense to refer to transaction money modules, teller money modules, and money generator modules.

Effective security for a monetary system has three characteristics: inhibit counterfeiters, detect counterfeiters, and contain counterfeiters. The described EMS is designed to have components which exhibit all three characteristics.

In order to inhibit counterfeiters, the money modules communicate using symmetric and asymmetric key cryptography. None of the messages are in the clear. The module's protocols are also physically protected by tamper-proof hardware.

Counterfeiting is detected by note reconciliation processes. System-wide time protocols (e.g., note expiration) force electronic notes to be reconciled regularly. Electronic notes are also refreshed (i.e., replaced with a new note with a new expiration date) when banking transactions are performed.

Money modules are blocked (e.g., placed on the bad ID list) if duplicated or counterfeit notes are tied back to them Also, notes which have passed through these modules will not be allowed to transfer. The transfer of duplicated or counterfeit notes will be contained since notes expire or eventually are deposited to a bank. Moreover, in case of a serious system security problem, the EMS may call for a global recertification, thereby requiring all modules to recertify, including transaction money modules the next time they sign on the EMS Network.

Security Hierarchy

Figure 33A:
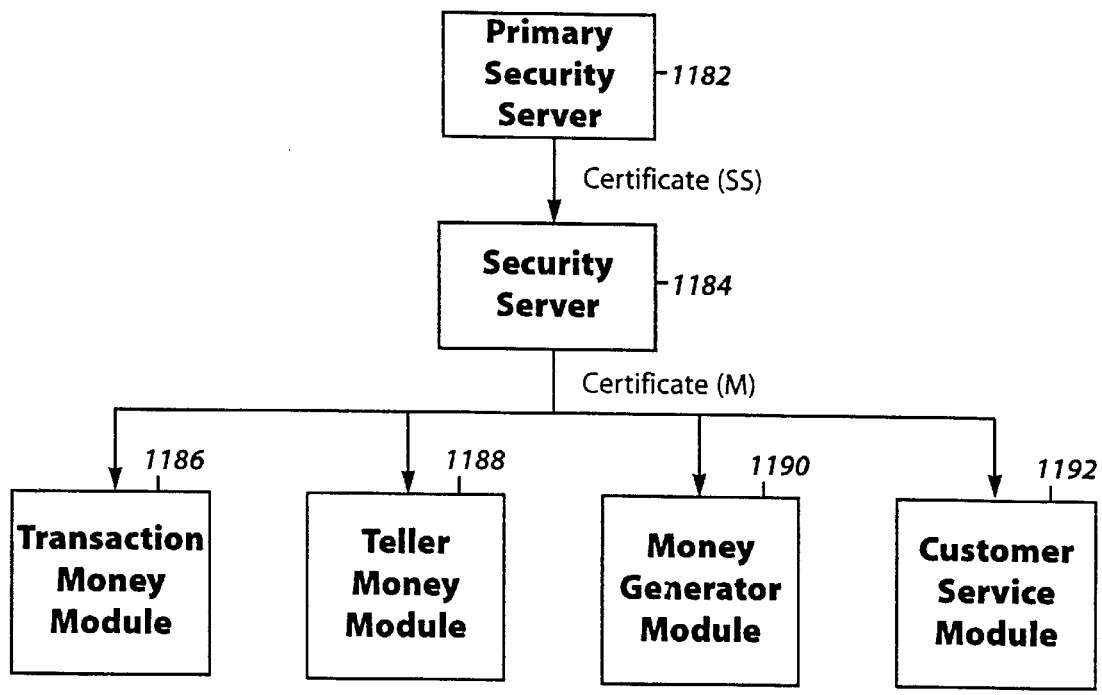
FIG. 33A is a diagram showing the EMS Security Hierarchy.

Referring to FIG. 33A, EMS will have two types of security servers, primary 1182 and ordinary 1184. The primary security servers 1182 certify the (ordinary) security servers 1184. The security servers 1184 certify all other modules (transaction MMs 1186, Teller MMs 1188, money generator modules 1190, and customer service modules 1192) in the system.

Figure 34:
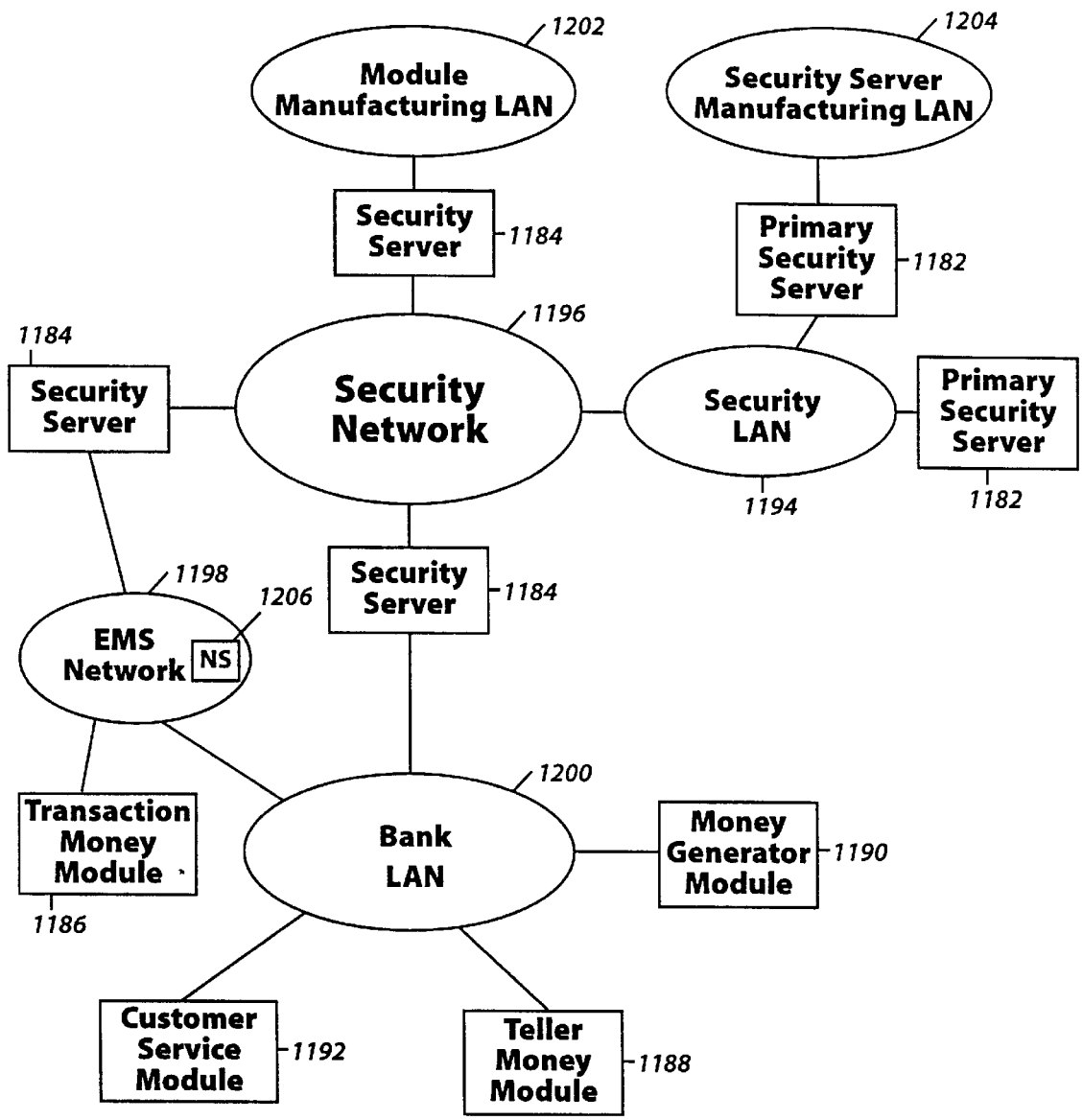
FIG. 34 is a diagram showing the security network structure for the EMS.

The primary servers 1182 only interact with other primary servers 1182 or the security servers 1184. Referring to FIG. 34, the primary security servers 1182 are housed in a secure facility connected to each other by a Security LAN 1194. The LAN 1194 is connected through a secure gateway to the Security Network 1196. Only the security servers communicate over this network. All security servers are physically protected devices.

Security servers 1184 are also attached to the EMS Network 1198 and bank local networks 1200. Security servers are treated as if they could be compromised and are validated upon all interactions with other modules.

Only the security servers 1184 and modules have certificates. The primary security server's public keys are carried by these devices. There are two types of certificate: security server and module.

Certificate Structure And Validation

The structure of a certificate is as follows:

Cert(SS) = $E_{PSS}[SS(id) \| SS(PK) \| \text{expire date} \| \sigma_{PSS}(X)] \| PSS(id) \text{ XOR } C$
————X————

Cert(M) = $E_{SS}[M(id) \| M(PK) \| \text{expire date} \| \sigma_{SS}(Y)] \| \text{Cert(SS)}$
————Y————

The certificate validation protocols are:
1) Validate Cert(SS)
   a) PSS(id)=[PSS(id) XOR C] XOR C
   b) $D_{PSS}(E_{PSS}(X\|\sigma_{PSS}(X)))=X\|\sigma_{PSS}(X)$
   c) Check if SS(id) is authentic (see module numbering scheme)
   d) Check if date is valid
   e) Check if $D_{PSS}(\sigma_{PSS}(X))=h(X)$
2) Validate Cert(M)
   a) Validate Cert(SS)
   b) $D_{SS}(E_{SS}(Y\|\sigma_{SS}(Y)))=Y\|\sigma_{SS}(Y)$
   c) Check if M(id) is authentic (see module numbering scheme)
   d) Check if date is valid
   e) Check if $D_{SS}(\sigma_{SS}(Y))=h(Y)$

| Where | | |
|---|---|---|
| PSS = Primary Security Server | PK = | Public Key (includes length of key) |
| SS = Security Server | σ = | Digital Signature = E · h |
| M = Module | Cert = | Certificate |
| ‖ = Concatenate | E = | Algorithm with private key used for encrypting and for encrypting and for creating digital signature |
| id = identification number | | |
| h = Hash function | | |
| C = Constant random number shared by all modules | | |
| | D = | Algorithm with public key used for decryption and for checking digital signature |

Note E and D may also be used for decrypting and encrypting, respectively, when applied in other applications.

Module Numbering Scheme

The primary security servers 1182, security servers 1184, teller money modules 1188, money generator modules 1190, customer service modules 1192, and transaction money modules 1186 are assigned identification numbers (id's) so that the numbers can be checked for authenticity. A 48-bit prime number "p" is generated and a primitive root "a" modulo p (where $a^n$ 1(p) for all $1 \leq n < p-1$) is found via a secure process. Both a and p are loaded to all modules in the system securely by the primary security servers when they are manufactured.

The scheme works as follows:
If $a^n \equiv m(p)$ and
 (1) $1 \leq m \leq 99,999$ then n is assigned as the id of a primary security server,
 (2) $100,000 \leq m \leq 999,999$ then n is assigned as the id of a security server,
 (3) $1,000,000 \leq m \leq 6,999,999$ then n is assigned as the id of a teller money module,
 (4) $7,000,000 \leq m \leq 9,999,999$ then n is assigned as the id of a money generator module,
 (5) $10,000,000 \leq m \leq 11,999,999$ then n is assigned as the id of a customer service module,
 (6) $m \geq 12,000,000$ then n is assigned as the id of a transaction money module.

If a module or server is validating a certificate, it checks the authenticity of the identification number (e.g., M(id), SS(id), or PSS(id)) n by computing $a^n \equiv m(p)$ and then checks if m is in the correct range.

Security Network

As shown in FIG. 34, the Security Network 1196 and the Security LAN 1194 connect the security servers 1184 to the primary security servers 1182. Security servers 1184 initially certify the money modules and customer service modules 1192 at manufacturing. Such security servers may be connected by a Module Manufacturing LAN 1202. They pass security information such as the bad id list and the list of primary security servers and their public keys to the modules. The bad id list contains the identities of the money modules, customer service modules, and security servers which are blocked from transacting. Recertification of these modules is described subsequently in the network sign-on flow diagram.

Figure 33B:
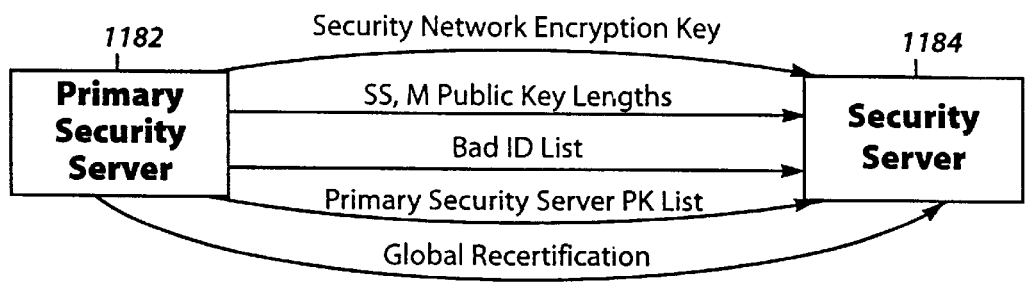
FIG. 33B is a diagram showing the security network messaging between a primary security server and an ordinary security server.

The security servers 1184 are initially certified by the primary security servers 1182 at manufacturing. Such primary security servers may be connected by a Security Server Manufacturing LAN 1204. Referring to FIG. 33B, the security servers 1184 receive various security information which they pass to the other modules. The security servers provide security services for the EMS Network 1198 and the bank LANs 1200, such as network sign-on where they pass updated security information. The security servers 1184 receive this information from the primary security servers 1182 over the Security Network 1196. Transaction money modules 1186 communicate with the EMS Network 1198 via network servers 1206 (NS). Participating banks have teller money module(s) 1188 and perhaps money generator (s) 1190 connected to their LANs 1200.

The Security Network 1196 is link encrypted. In addition, the primary security servers and security servers share a common symmetric key (a Security Network encryption key). This key is changed periodically by a designated primary server 1182 by public key, key exchange. The primary server 1182 encrypts the symmetric key with its private key, signing the key and broadcasting the change to the other primary servers 1182 over the Security LAN 1194, and to the security servers 1184 over the Security Network 1196.

The list of bad id's is maintained by a designated primary server 1182. The list is accumulated from interactions with participating banks, law enforcement authorities, and subscribers to the system.

Periodically the length of the public keys for the security servers and the modules will be changed. The key length will be normally lengthened to maintain a high security level. The new designated key lengths will be communicated to the primary security servers by a designated primary server. The new lengths will be communicated to the security servers by the primary servers when new bad id lists are sent or upon recertification. In case of a dangerous breach of security, a primary security server can call for global recertification.

The length of the public key for each primary server will not change. A timetable will be created which will schedule the implementation and decommission of primary security servers. The new servers will most likely have longer keys unless they are implemented because of increased transaction volume. The list of active PSS public keys is created by a primary security server and encrypted by the server with its private key. The list is then broadcast to other security servers.

Figure 35A:
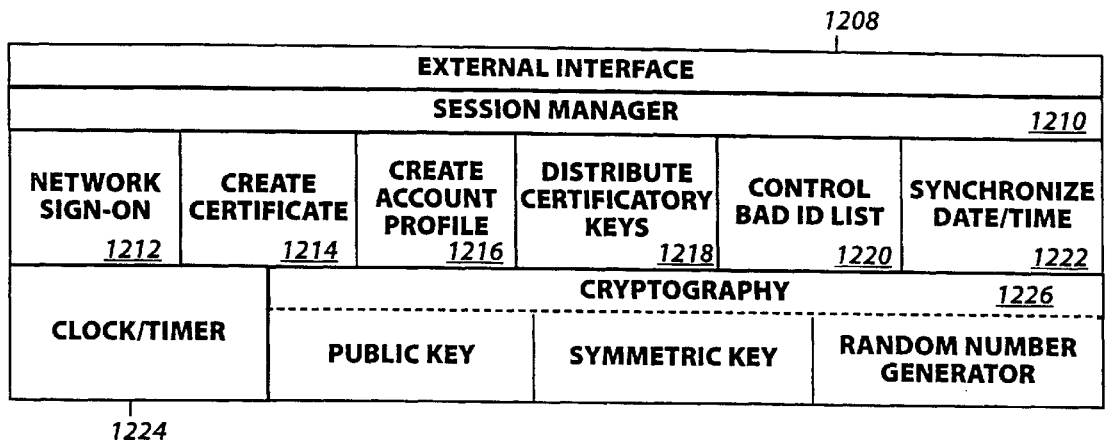
FIG. 35A illustrates the functional components of a security server.

FIG. 35A shows the functional components of a security server 1184. An External Interface function 1208 provides a communications layer for network interfacing. A Session Manager function 1210 controls the security aspects of a transaction session. A Network Sign-On function 1212 manages the security functions for network sign-on. A Create Certificate function 1214 certifies a certificate for any of the money modules (in a primary security server, this function certifies security servers). A Create Account Profile function 1216 certifies and signs a bank account profile that allows a money module to access the subscriber's different bank accounts. A Distribute Certificatory Keys function 1218 distributes the Certification Agency's list of valid primary security server public keys to the money modules (primary security server also distributes global certification message). A Control Bad ID List function 1220 controls and distributes the list of bad identifiers. A Synchronize Date/Time function 1222 keeps money module Clock/Timer services synchronized to a system time. Clock/Timer 1224 and Cryptography functions 1226 are identical to those functions in the money modules.

Figure 35B:
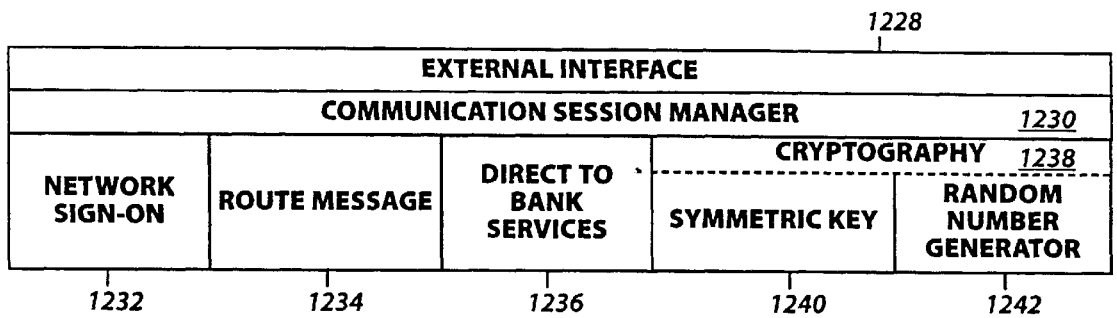
FIG. 35B illustrates the functional components of a network server.

FIG. 35B shows the functional components of a network server 1206. An External Interface function 1228 provides a communications layer for network interfacing. A Communication Session manager function 1230 manages a communication session between money modules, and between a money module and a security server. A Network Sign-On function 1232 controls the money module network sign-on process. A Route Message function 1234 provides directory services for routing messages, controlling message routing during sign-on and during a money module session. A Direct to Bank Services function 1236 provides information on services provided by participating banks. A Cryptography function 1238 provides a Symmetric Key function 1240 and a Random Number Generator function 1242. The Symmetric Key function 1240 encrypts messages between the network server 1206 and the modules accessing the network and between the network server 1206 and the security servers 1184. The Random Number Generator function 1242 generates random numbers for encryption keys and verification messages.

Network Sign-On

Figure 36:
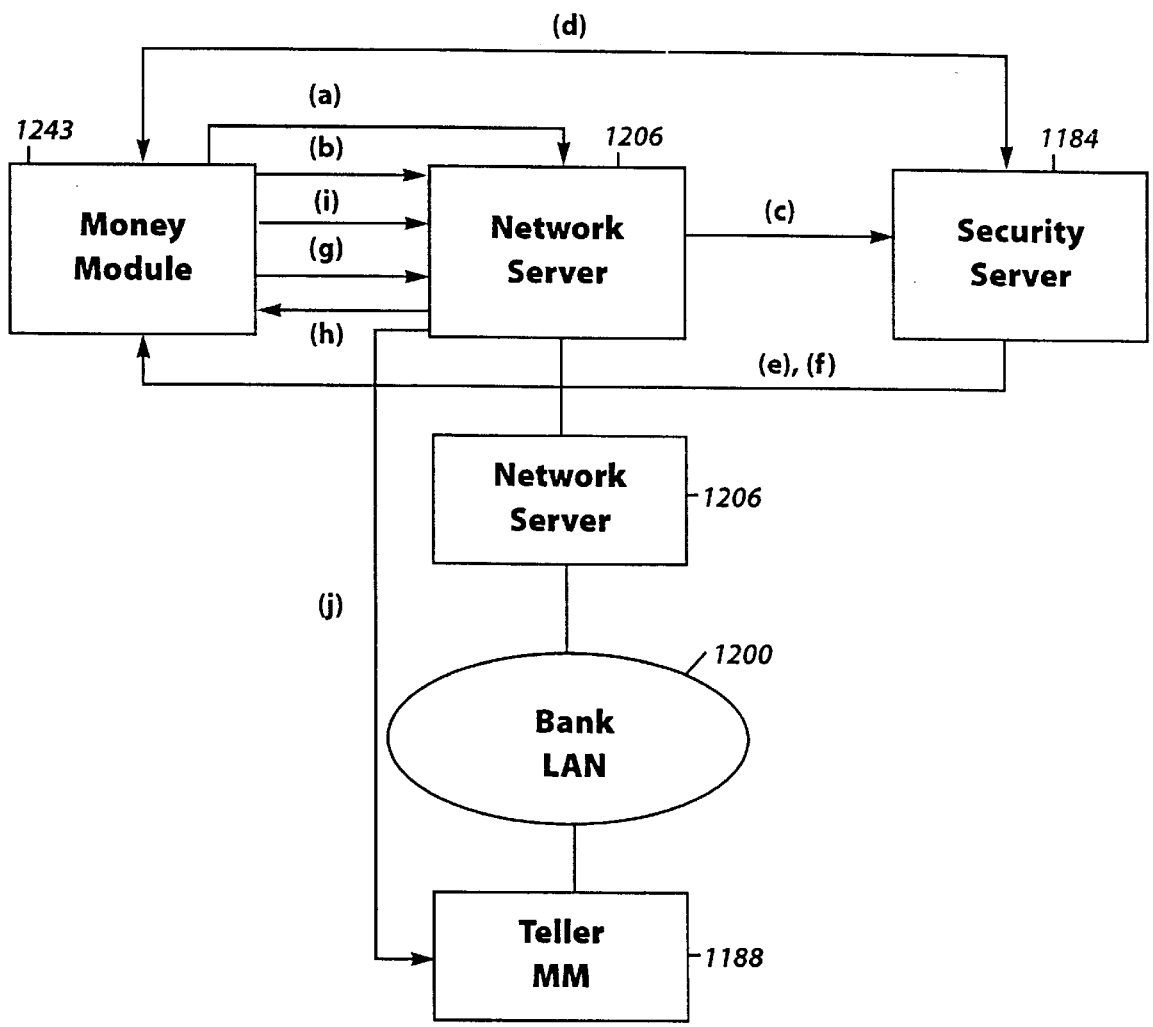
FIG. 36 shows an overview of the network sign-on procedure.
Figure 37A:
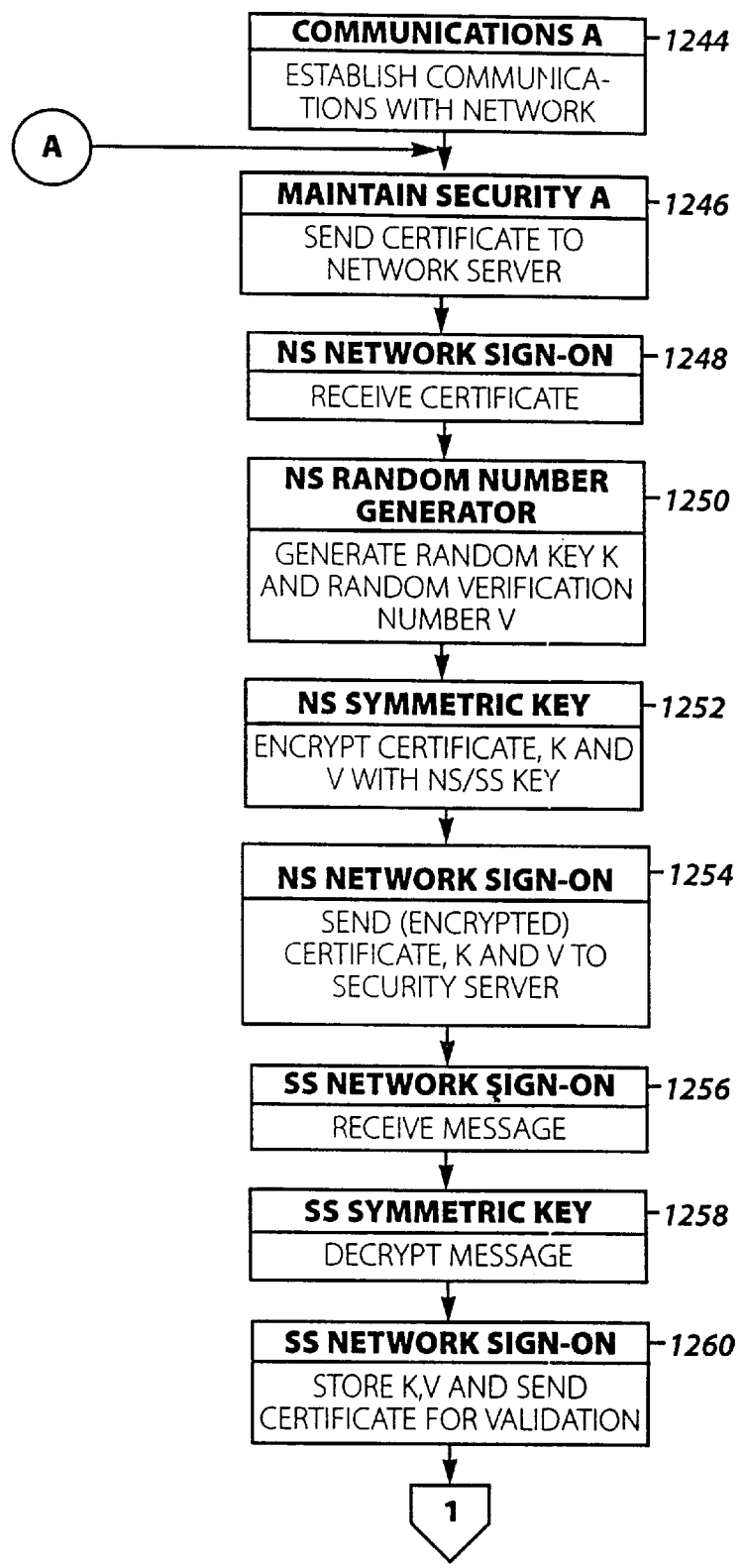
FIGS. 37A–37K illustrate a Network Sign-On protocol.
Figure 37B:
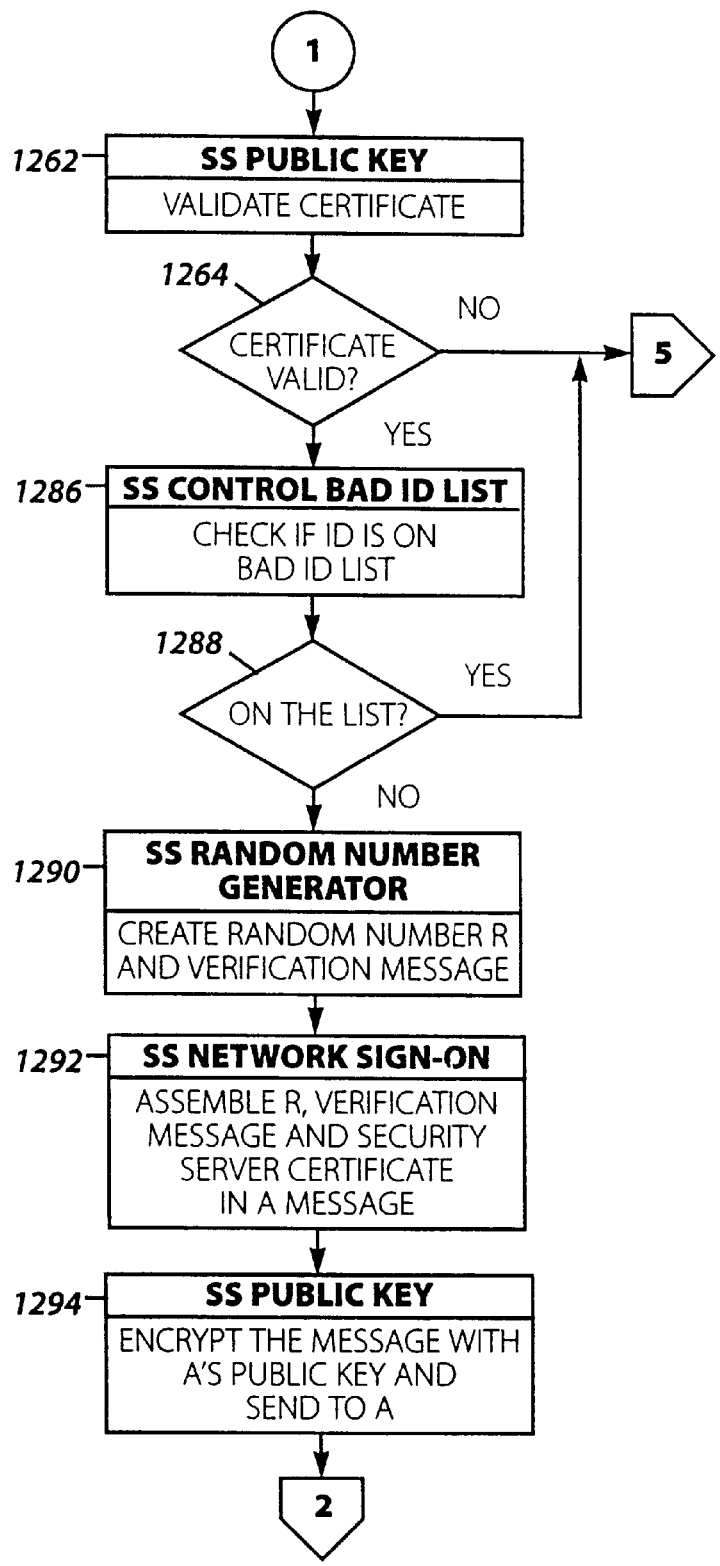
Figure 37C:
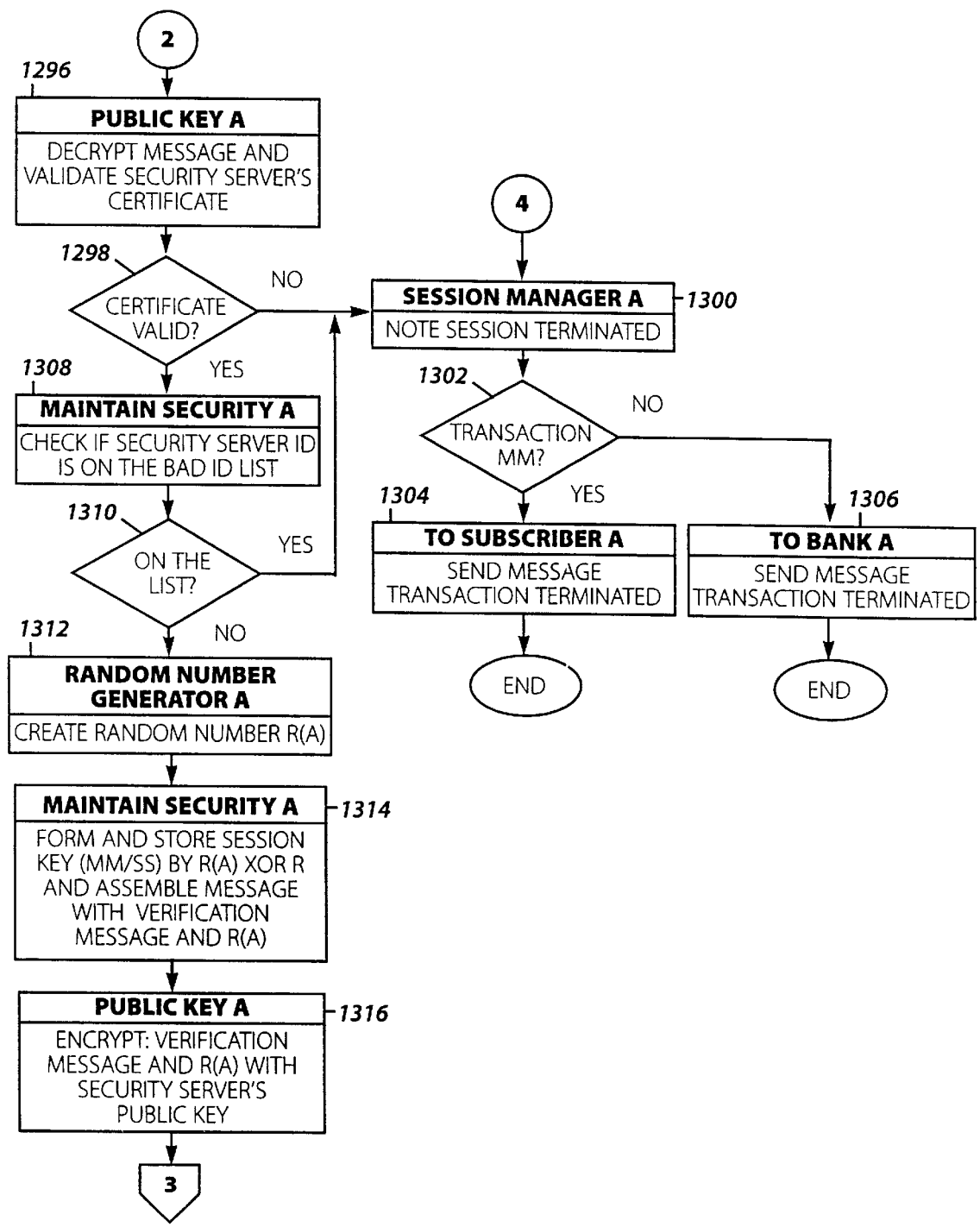
Figure 37D:
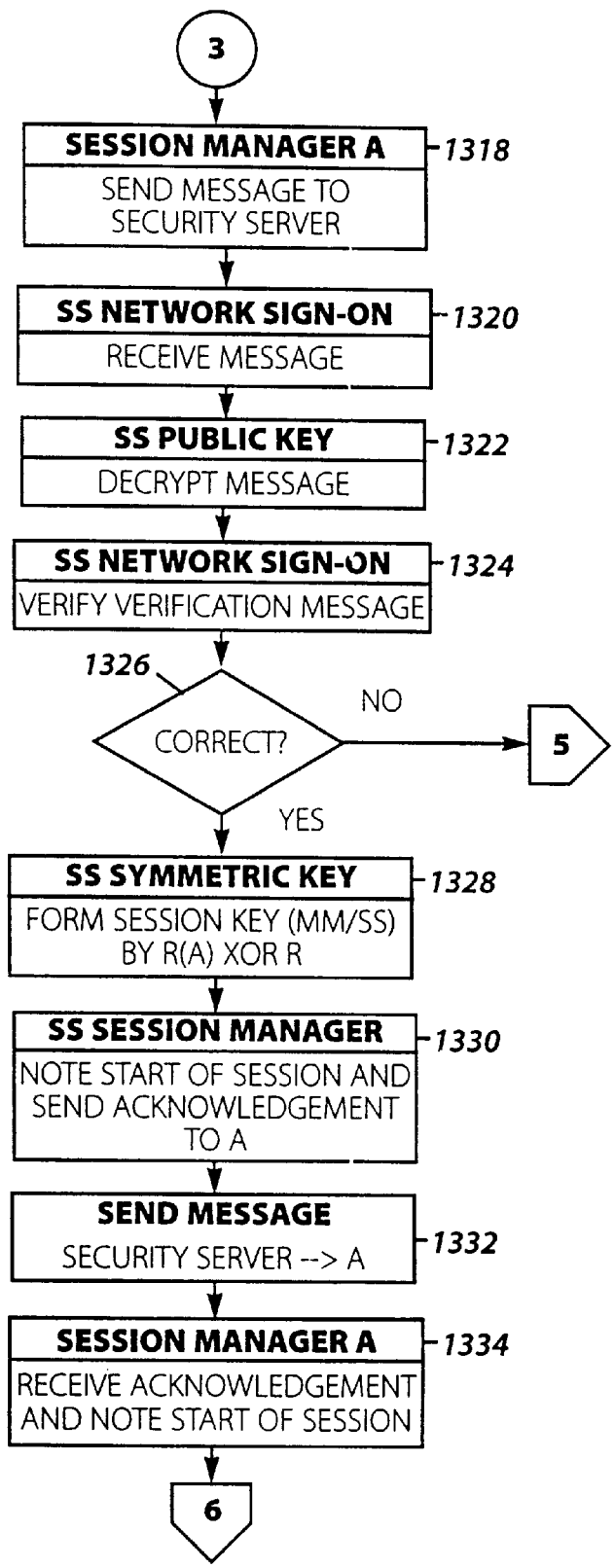
Figure 37E:
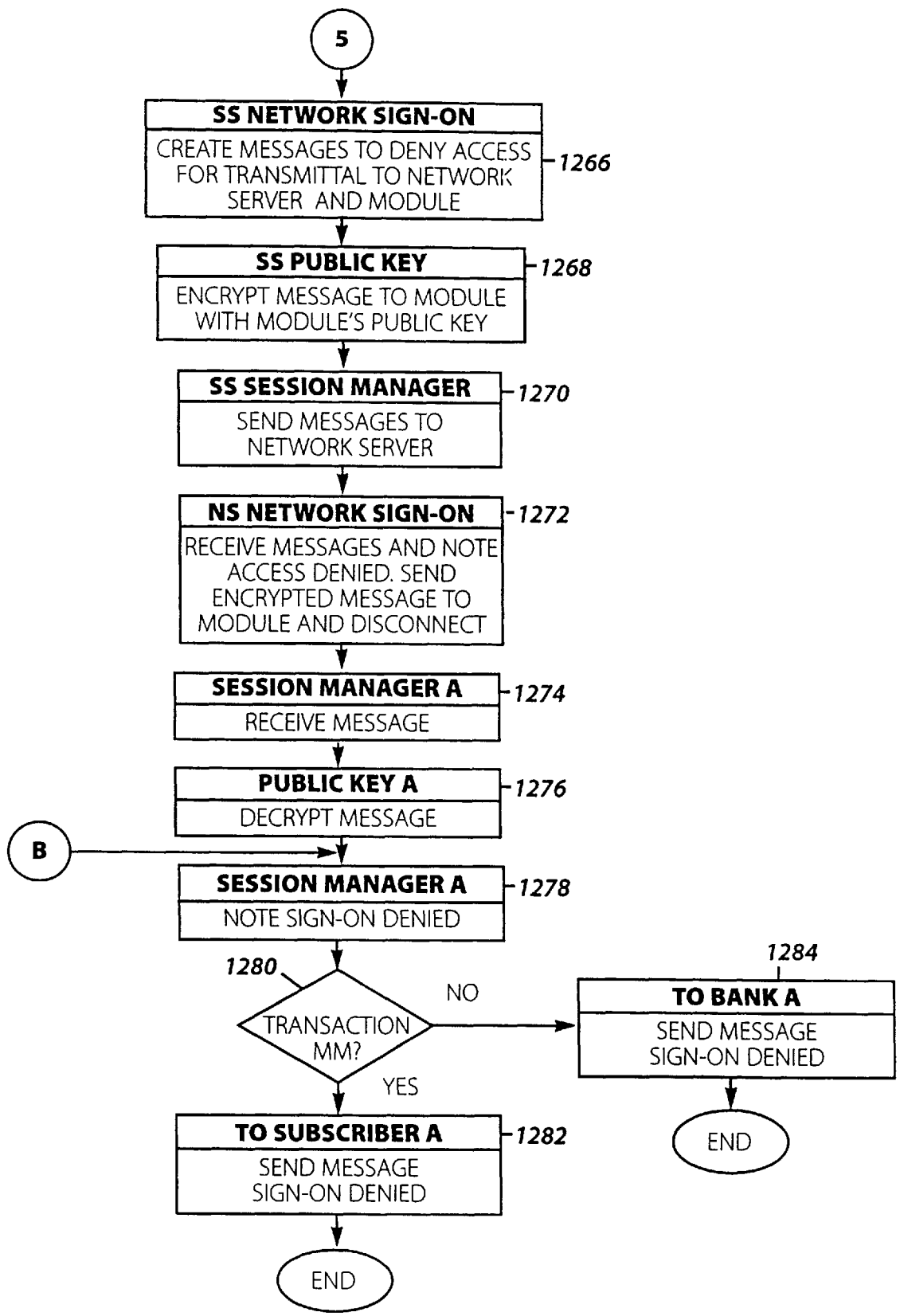
Figure 37F:
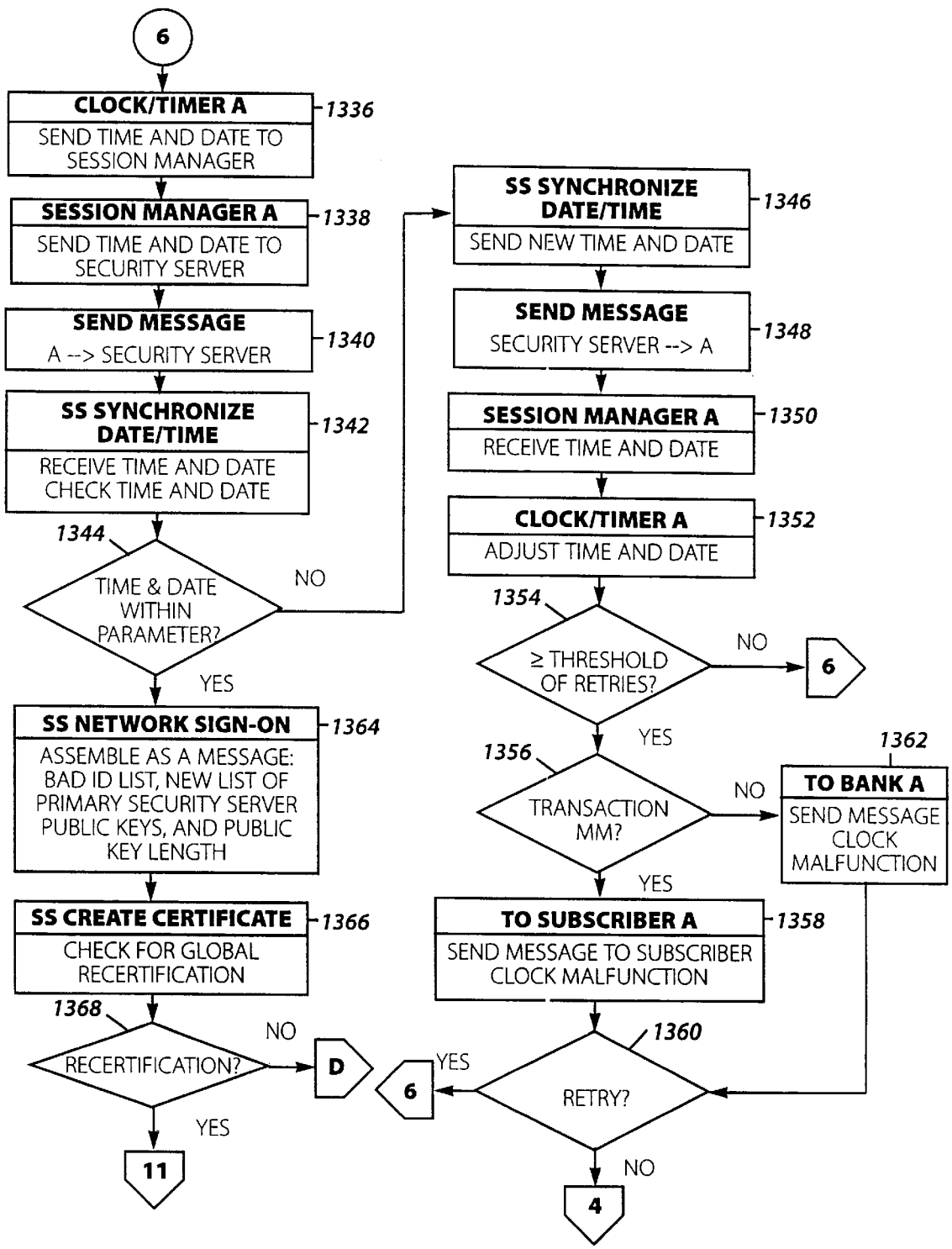
Figure 37G:
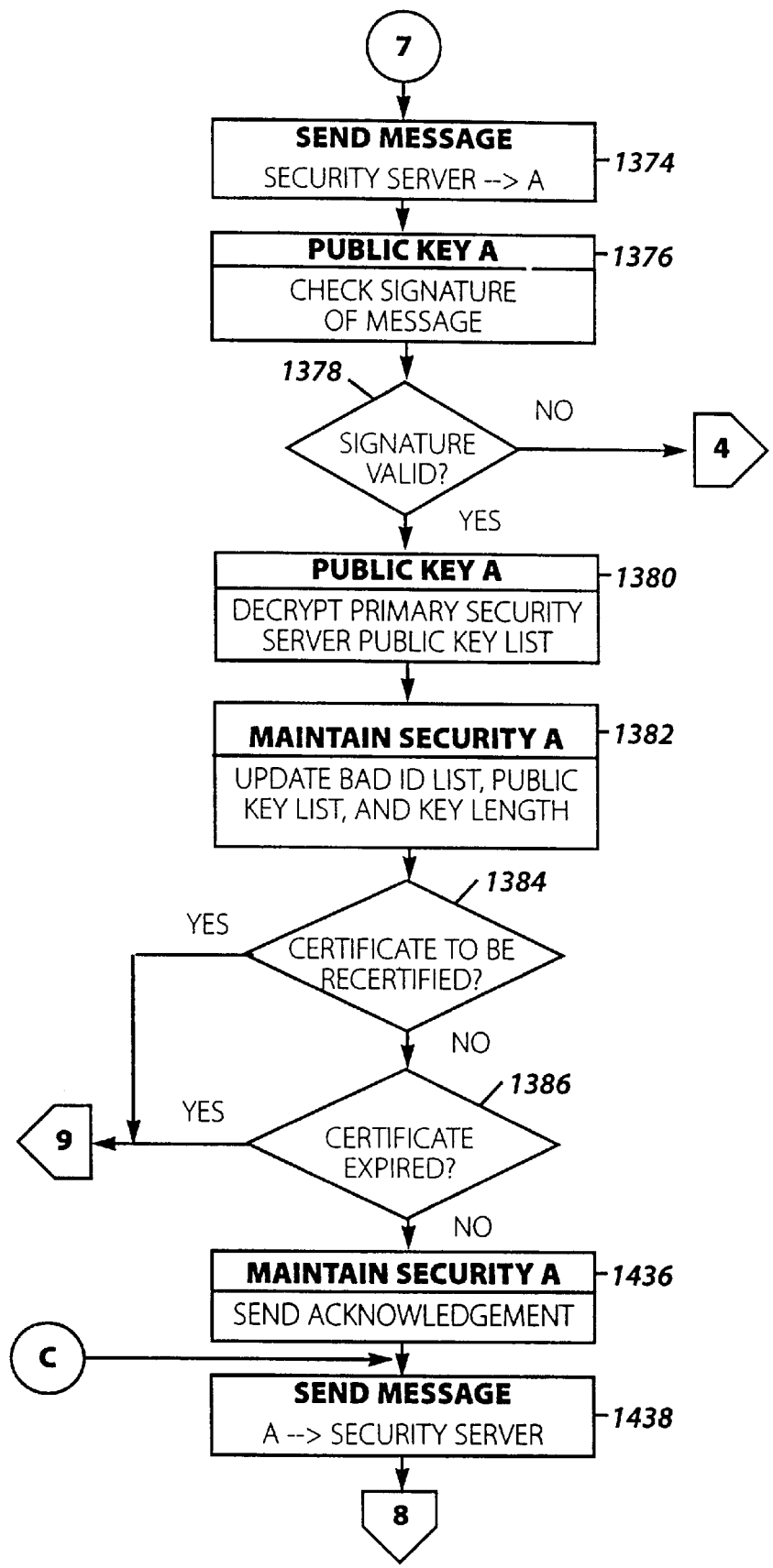
Figure 37H:
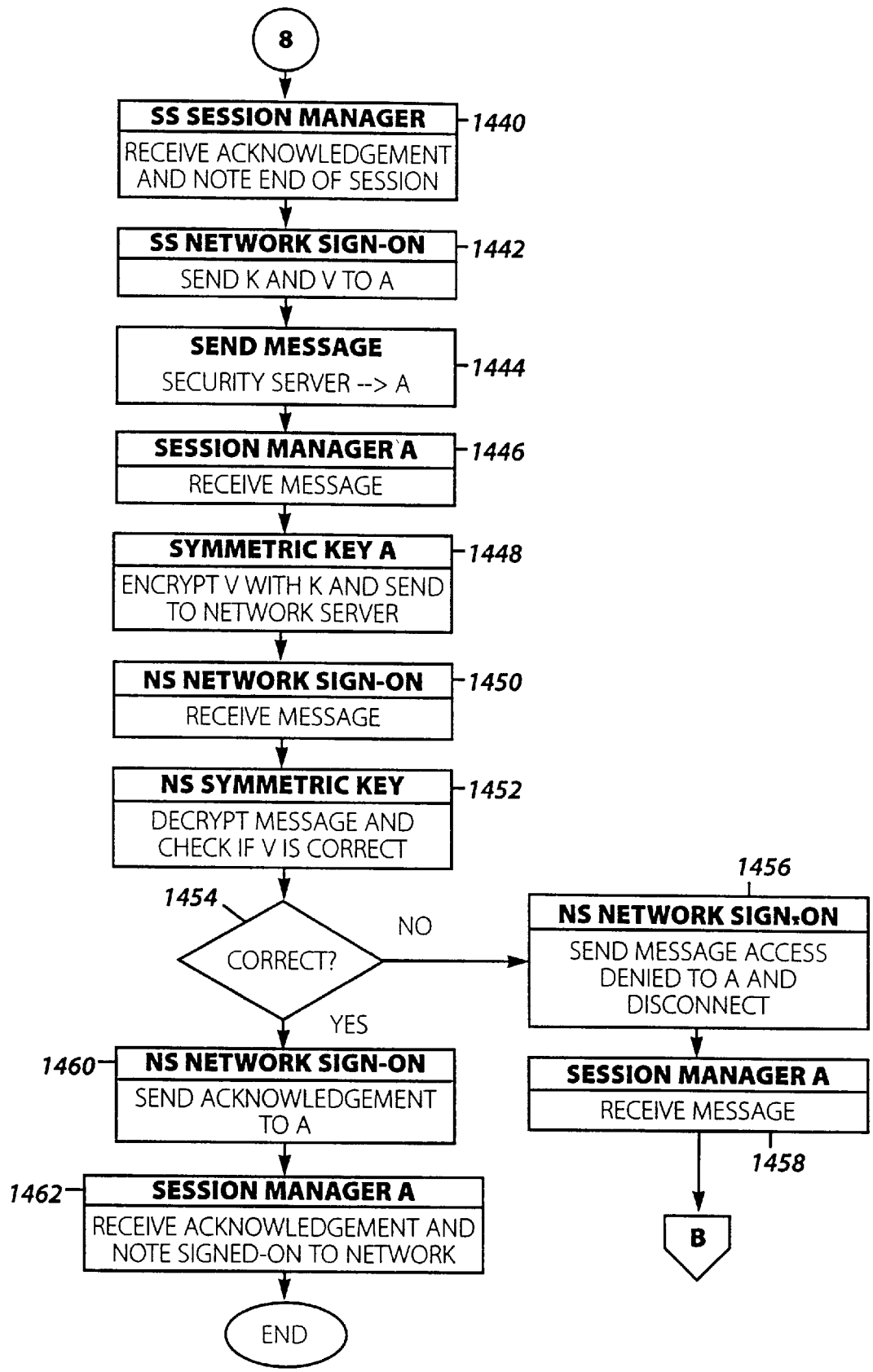
Figure 37I:
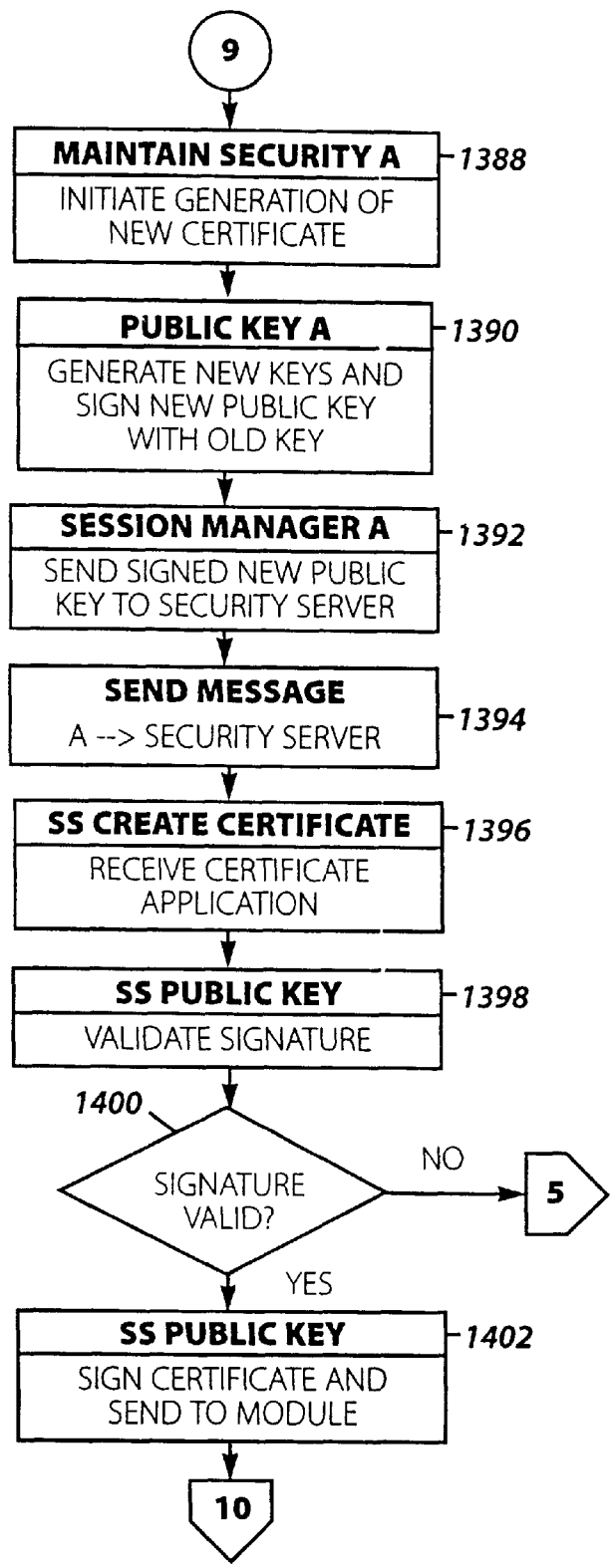
Figure 37J:
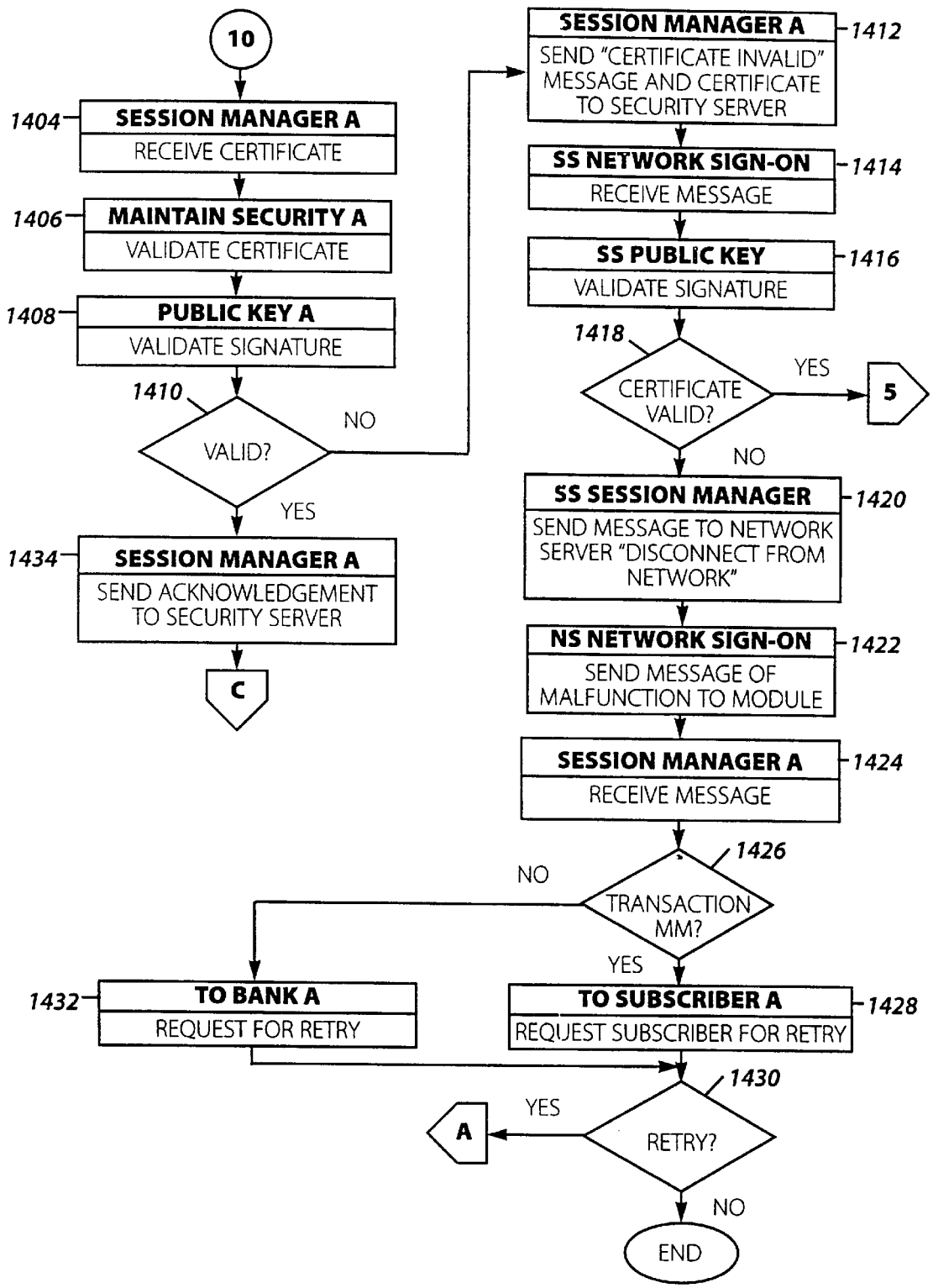
Figure 37K:
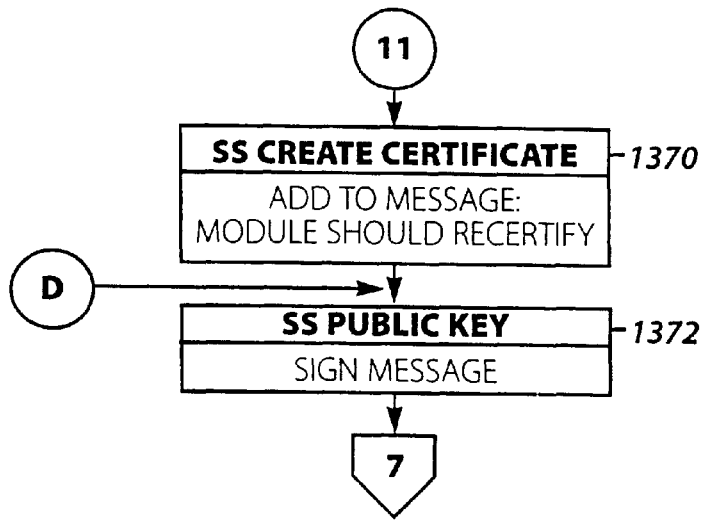
Figure 38A:
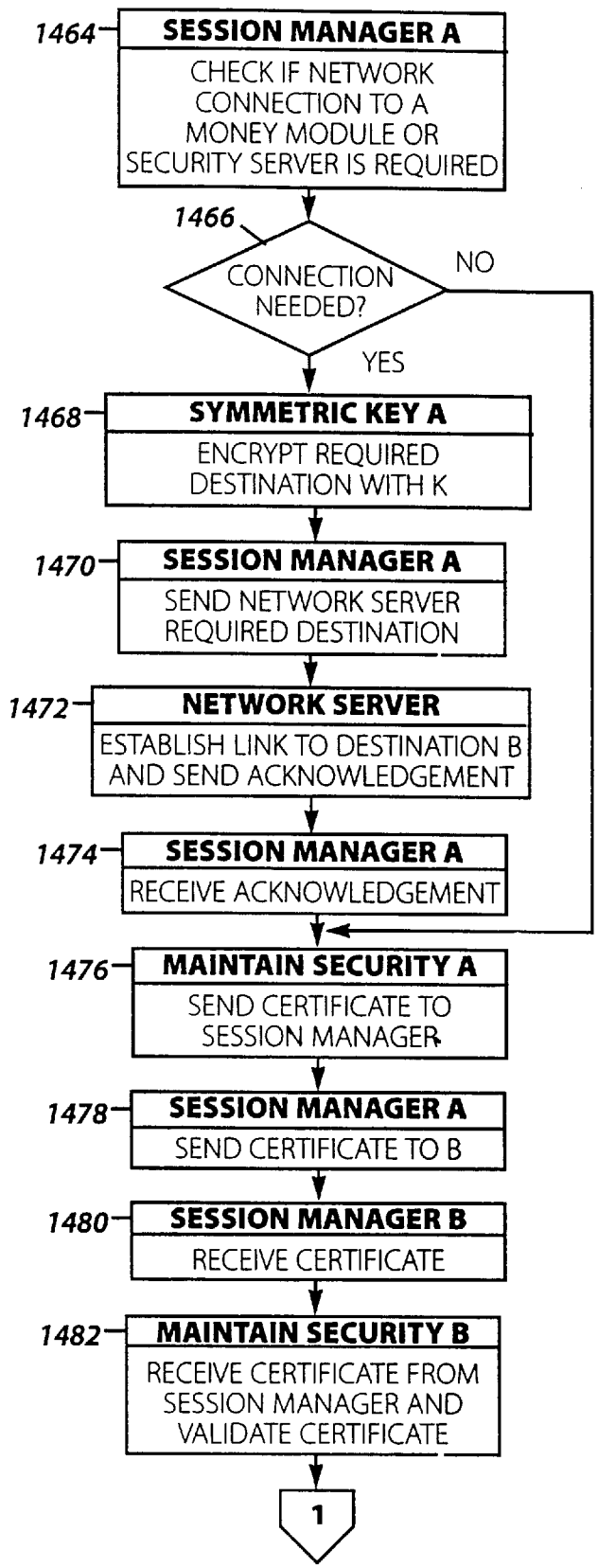
FIGS. 38A–38E illustrate an Establish Session protocol in the EMS.
Figure 38B:
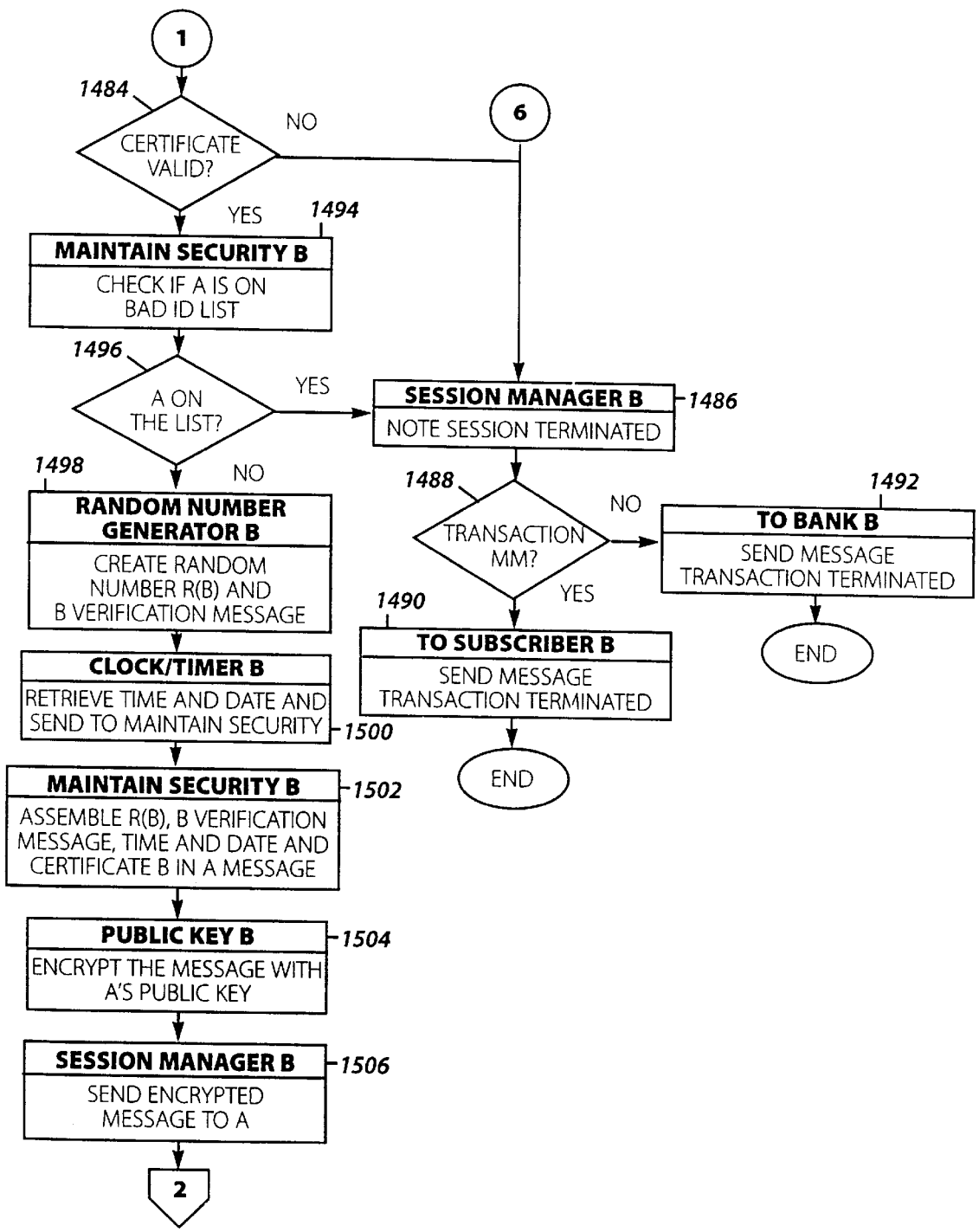
Figure 38C:
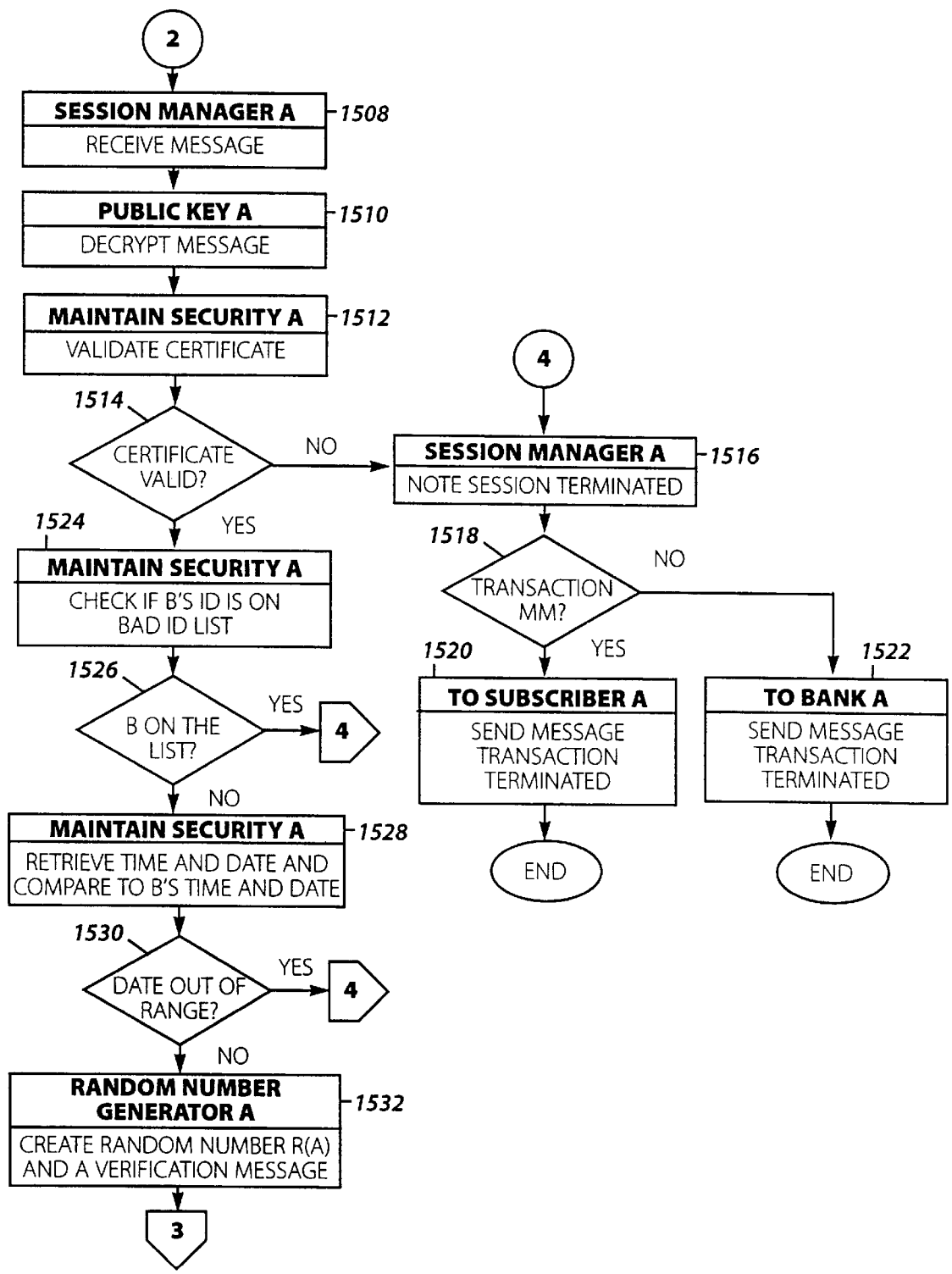
Figure 38D:
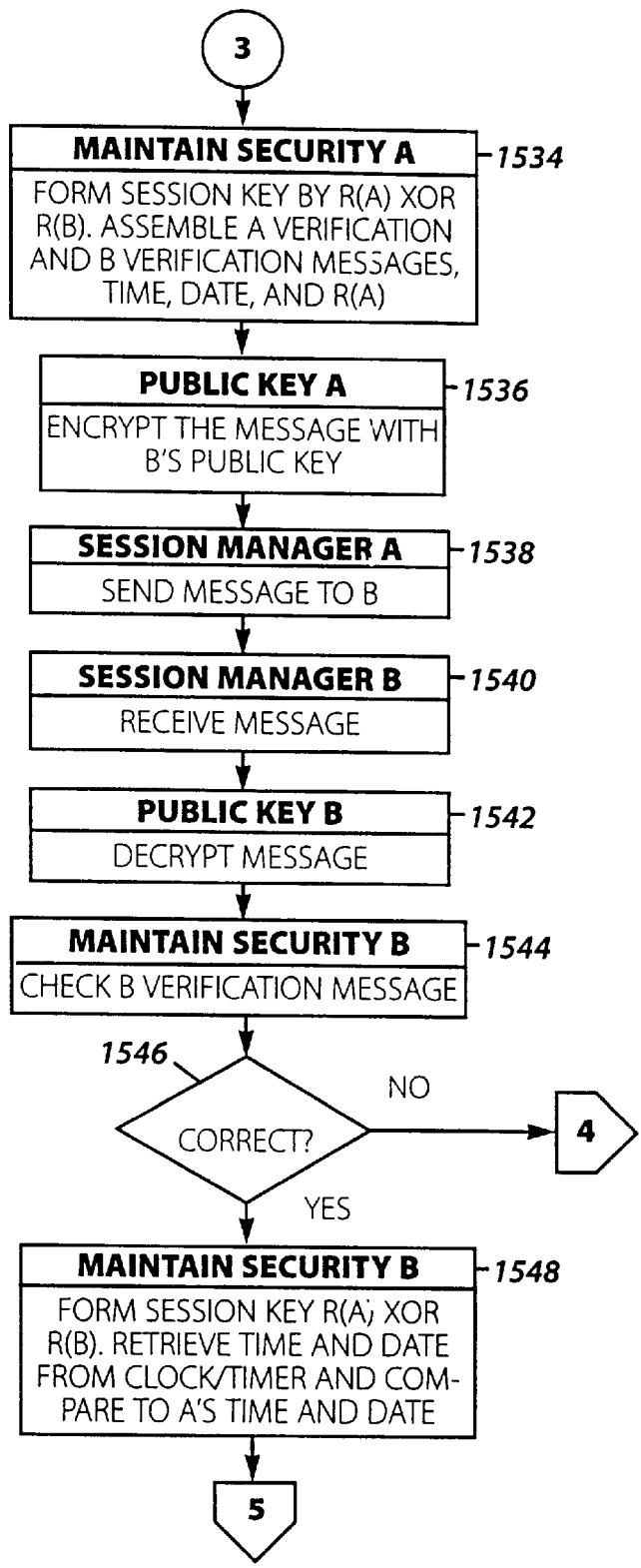
Figure 38E:
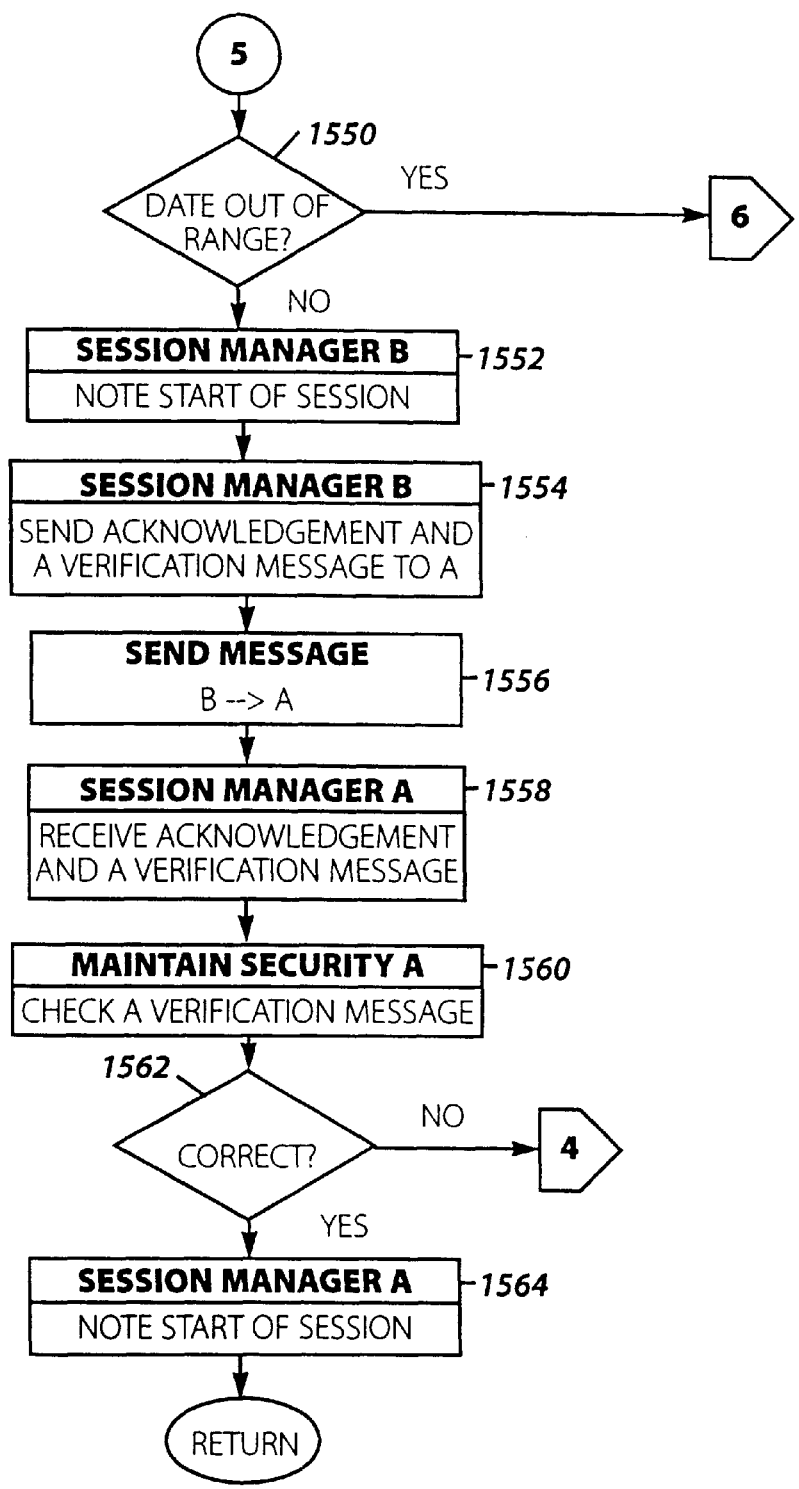

An overview of the network sign-on procedure is provided with reference to FIG. 36. The Sign-On protocol describes the situation where a module 1243 desires access to the EMS Network 1198 for recertification, deposit, withdrawal or other reason. The module 1243 may be a transaction money module 1186, teller money module 1138, money generator module 1188, or customer service module 1192. (a) Establish a communication between module 1243 and network server 1206. (b) Pass the module's certificate to the network server 1206. (c) The network server 1206 generates a random verification number V and a random key K; the network server then passes the module's certificate, V, and K to a security server 1184 (encrypted by a NS/SS key). (d) The module 1243 and the security server 1184 establish a secure communication session (via session key (MM/SS)). (e) The security server 1184 passes the time/date, update bad ID list, update list of primary security server public keys, public key length, global recertification (if necessary), and recertified module certificate (if necessary). (f) End session with module 1243 and send V and K to the module 1243. (g) Encrypt V with K and send to the network server 1206. (h) The network server 1206 acknowledges network sign-on to the module 1243. (i) The module 1243 then informs the network server 1206 of the destination (if any) to which it wishes to be connected. (j) The network server 1206 establishes a connection to the destination.

The network sign-on is designed so that no one can spoof the module 1243 or intercept any of its information in the clear. FIG. 37 describes the detailed flow of the network sign-on procedure.

Communications A establishes communications with the EMS Network 1198 (step 1244). Maintain Security A sends its certificate to the network server 1206 (step 1246). NS Network Sign-On receives the certificate (step 1248). NS Random Number Generator generates random key K and random verification number V (step 1250). NS Symmetric Key encrypts the module's certificate, K and V with a NS/SS key (step 1252). NS/SS keys are local symmetric keys installed in network servers 1206 and security servers 1184 which communicate for network sign-on. NS Network Sign-On sends the certificate, K and V to the security server 1184, where SS Network Sign-On receives the message and SS Symmetric Key decrypts the message (steps 1254–1258). Ss Network Sign-On stores K and V and then sends the module certificate to SS Public Key for validation (steps 1260–1264).

If the module certificate is not valid, then SS Network Sign-On creates messages to deny access for transmittal to the network server 1206 and module 1243 (step 1266). SS Public Key encrypts the message to the module 1243 with the module's public key and SS Session Manager sends the messages to the network server (step 1268–1270). NS Network Sign-On receives the messages and notes access denied. The encrypted message is then sent to the module, and the network server disconnects. (Step 1272). Session Manager A receives the message, Public Key A decrypts the message, and Session Manager A notes that sign-on was denied (steps 1274–1278). If the device requesting sign-on was a transaction money module, then To Subscriber A informs the subscriber (steps 1280–1282). Otherwise, To Bank A informs the bank (step 1284).

If, on the other hand, the module's certificate is valid, then SS Control Bad ID List checks if the module's id is on the bad id list (steps 1286–1288). If the id is on the list, then network access is denied. Otherwise, SS Random Number Generator creates random number R and a verification message (step 1290). SS Network Sign-On assembles R, the verification message, and the security server's certificate in a message which is encrypted by SS Public Key using A's public key (steps 1292–1294). The message is sent to A where Public Key A decrypts the message and validates the security server's certificate (step 1298).

If the certificate is invalid, then A notes session termination and informs either the subscriber or the bank (steps 1304–1306). If the certificate is valid, then Maintain Security A checks if the security server's id is on the bad id list (steps 1308–1310). If on the list, then the session is terminated (steps 1300–1306). If not on the list, then Random Number Generator A creates random number R(A) (step 1312). Maintain Security A forms session key (MM/SS) by the operation R(A) XOR R and then stores the session key (step 1314).

A message containing the verification message and R(A) is assembled and encrypted with the security server's public key (step 1316). Session Manager A sends the message To SS Network Sign-On and SS Public Key decrypts the message (steps 1318–1322).

SS Network Sign-On verifies that the verification message is the one which it created (steps 1324–1326). If it is not, then the security server denies network access. If the verification message is correct, then SS Symmetric Key forms session key (MM/SS) by R(A) XOR R (step 1328). SS Session Manager notes the start of session and sends an acknowledgement to A by the Send Message subroutine (steps 1330–1332). Session Manager A receives the acknowledgement and notes the start of the session (step 1334).

Clock/Timer A sends the time and date to the Session Manager which sends it to the security server (steps 1336–1340). SS Synchronize Date/Time receives the time and date and checks if it is within parameter (steps 1342–1344). If not within parameter, then SS Synchronize Date/Time sends a new time and date to Session Manager A (steps 1346–1350). Clock/Timer A then adjusts the time and date (step 1352). A then resends its date and time to the security server for rechecking. If clock synchronization is attempted more than a set number of times, then a clock malfunction is reported to the subscriber or bank, which may then retry if desired (steps 1354–1362).

If, however, the time and date are within parameter, then SS Network Sign-on assembles a message containing the bad id list, the new list of primary security server public keys (which comes from the Distribute Certificatory Key function), and the public key length (the size of the public keys are varied periodically) (step 1364). SS Create Certificate checks if a global recertification has been called for, and ensures that the time period for the global recertification has not expired (steps 1366–1368). Such time period should be long enough so that everyone's certificate has been recertified or expired. The function should also check when the module last recertified because if it was certified during the period of the global recertification, then there would be no need to recertify.

If recertification is required, then SS Create Certificate adds to the previous message: module should recertify (step 1370). Then, whether or not a recertification is called for, SS Public Key signs the message (step 1372). The message is sent to A where Public Key A checks the digital signature on the message (steps 1374–1378). If the signature is invalid, then the session is terminated. If the signature is valid, then Public Key A decrypts the primary security server public key list using an existing PSS public key (step 1380). The updated list of primary security server public keys was previously encrypted by the private key of the originating primary security server. Maintain Security A then updates its bad id list, public key list, and key length (step 1382).

Module A then checks if its certificate needs to be recertified (either because of a global recertification order or because of an expired certificate) (steps 1384–1386). If a new certificate is required, then Maintain Security A initiates the generation of a new certificate (step 1388). Public Key A generates new keys and signs the new public key with its old public key (step 1390). Session Manager A sends the signed new public key to the security server's SS Create Certificate (steps 1392–1396). SS Public Key then validates the signature on the new public key (steps 1398–1400). If not a valid signature, then the security server denies network access. If the signature is valid, then SS Public Key signs the module's new certificate and sends it to the module (step 1402). Session Manager A receives the certificate, Maintain Security A undertakes to validate the certificate, and Public Key A validates the signature (steps 1404–1410).

If the certificate is not valid, then Session Manager A sends a "Certificate Invalid" message and the certificate to the security server (step 1412). SS Network Sign-On receives the message and SS Public Key validates the signature (steps 1414–1418). If the security server determines that the certificate is actually valid, then it denies the module access to the network. If, however, the certificate is invalid, then SS Session Manager informs the network server that it will disconnect from the network (step 1420). NS Network Sign-On informs the module of the malfunction (step 1422). The module then queries the subscriber or the bank for a retry (steps 1424–1432).

If, on the other hand, the module determines that its new certificate is valid, then Session Manager A sends an acknowledgement to the security server (step 1434). Similarly, if no new certificate was required then Maintain Security A sends an acknowledgement message to the security server (steps 1436–1438). In either case, SS Session Manager receives the acknowledgement and notes the end of its session with the module (step 1440). SS Network Sign-On then sends K and V to A (steps 1442–1444). Session Manager A receives the message and Symmetric Key A encrypts V with K and sends the message to the network server (steps 1446–1448). NS Network Sign-On receives the message and NS Symmetric Key decrypts the message and checks if V is the same V it previously generated (steps 1450–1454).

If V is incorrect, then NS Network Sign-On sends an access denied message to A and then disconnects (steps 1456–1458). If V is correct, then NS Network Sign-On sends an acknowledgement to A (step 1460). Finally, Session Manager A receives the acknowledgment and notes that A has signed-on to the EMS Network 1198 (step 1462).

Establish Session

FIG. 38 shows the Establish Session protocol. Session Manager A checks if a network connection to a money module or security server is required (steps 1464–1466). If a connection is needed, then Symmetric Key A encrypts the required destination with key K (step 1468). Session Manager A sends the required destination to the network server (step 1470). The network server then establishes a link to destination B and sends an acknowledgement, which is received by Session Manager A (steps 1472–1474).

Maintain Security A sends its certificate to Session Manager A which sends it to B (steps 1476–1478). Session Manager B receives the certificate and Maintain Security B (if B is a security server, then this function is performed by the Session Manager) validates the certificate (steps 1480–1484). If the certificate is not valid, then Session Manager B notes the session is terminated and informs either the subscriber or the bank (steps 1486–1492) (if B is a security server, then B merely notes the transaction is terminated).

If the certificate is valid, then Maintain Security B checks if A is on the bad id list (steps 1494–1496). If A is on the list, then the session is terminated. If A is not on the list, then Random Number Generator B creates random number R(B) and a B verification message (step 1498). Clock/Timer B retrieves the time and date (step 1500). Maintain Security B assembles R(B), B verification message, time and date, and B's certificate in a message (step 1502). Public Key B encrypts the message with A's public key and Session Manager B sends the message to A (steps 1504–1506).

Session Manager A receives the message, Public Key A decrypts the message, and Maintain Security A validates B's certificate (steps 1508–1514). If the certificate is not valid, then Session Manager A notes the termination of the session and informs either the subscriber or the bank (steps 1516–1522). If the certificate is valid, then Maintain Security A checks if B is on the bad id list (steps 1524–1526). If B is on the list, then the session is terminated. If B is not on the list, then Maintain Security A retrieves the date and time and compares it to B's date and time (steps 1528–1530). If the date and time are out of range, then the session is terminated.

If the date and time are in range, then Random Number Generator A creates random number R(A) and an A verification message (step 1532). Maintain Security A then forms a session key by the operation R(A) XOR R(B) (step 1534). The A verification message, the B verification message, the time, date and R(A) are assembled into a message and encrypted with B's public key (step 1536). The message is sent to B by Session Manager A (step 1538). Session Manager B receives the message, Public Key B decrypts the message and Maintain Security B checks the B verification message (steps 1540–1546). If the B verification message is incorrect, the session is terminated. If the B verification message is correct, then Maintain Security B forms the session key by R(A) XOR R(B) (step 1548). The time and date are retrieved and compared to A's time and date to check if they are within a predefined range of each other (step 1550). If the time and date are out of range, then the session is terminated. If the time and date are in range, then Session manager B notes the start of the session (step 1552).

Session Manager B then sends an acknowledgement and the A verification message to A (steps 1554–1556). Session Manager A receives the message and Maintain Security A checks the A verification message (steps 1558–1562). If the verification message is not correct, the session is terminated. If the verification message is correct, then Session Manager A notes the start of the session (step 1564).

Transfer Notes

FIG. 39 shows the transfer notes protocol. Note Directory X chooses the note(s) and values for transfer (step 1566). Possible objectives in choosing the notes for transfer may, for example, be: (1) minimize the number of digital signatures (which requires processing time); (2) minimize the size of the packet; (3) maximize the usefulness of the electronic notes left to the transferring subscriber (i.e., pass the notes with the shortest time left until expiration). Such objectives may be achieved by the following note transfer algorithm: (1) determine all possible alternatives which contain the least number of notes; (2) determine which of these alternatives have the least number of transfers; (3) if more than one choice is left from step 2, choose the one which has the least number of monetary unit days. Monetary-unit days= residual value of note to be transferred times the number of days left until the note expires, summed for all the notes in the packet.

Notes X creates a transfer to be appended to each note being transferred (step 1568). Public Key X creates signatures for the note(s) (step 1570). Packet Manager X then assembles the note(s) with their new transfer(s) and signature(s) in a packet and sends the packet to Y (steps 1572–1574). Packet Manager Y receives the packet and disassembles it (step 1576).

Verify Y validates all certificates in the note(s) (e.g., money generator certificate and all transfer certificates). Then all transfers to certificates are verified by ensuring that the transferors and transferees match up throughout the history of the electronic note. Also, the total amount transferred is checked to ensure it is the amount expected. (steps 1578–1580). If not valid, then the transaction is aborted (step 1582).

If valid and Y is a transaction money module, then Verifier Y verifies the expiration dates of the note(s) (steps 1584–1588). If the note(s) are expired, then the transaction is aborted. If not expired, then Verifier Y checks each id from the note transfers against the bad id list (steps 1590–1592). If any of the transfer id's are on the bad id list, then the transaction is aborted.

If the transfer id's are not on the bad id list (or Y is not a transaction money module), then Public Key Y verifies the validity of the note(s) signatures (steps 1594–1596). If the signatures are not valid, then the transaction is aborted. If the signatures are valid, then Notes Y places the note(s) in the money holder (step 1598). Finally, Note Directory Y updates the note(s) location(s) and amount(s) (step 1600).

Foreign Exchange

FIG. 40 shows the protocol for a foreign exchange transaction using dollars and pounds as exemplary monetary units. Initially, A agrees to exchange with B dollars($) for pounds (£) at an exchange rate of $/£ (step 1602). A and B then sign on their money modules and prompt their subscribers for the type of transaction (steps 1604–1610). A chooses to buy foreign exchange and B chooses to sell foreign exchange (steps 1612–1614). A and B establish a secure transaction session (steps 1616–1620).

To Subscriber A prompts the owner/holder of A for the amount by type of note of dollars he wishes to exchange (step 1622). Pay/Exchange A receives the amount and Note Directory A checks if A has sufficient funds (steps 1624–1628). If the funds are not sufficient, then To Subscriber A prompts for a new amount which again is checked against existing funds (steps 1630–1632). If no new amount is entered, then the transaction is aborted (step 1634).

If funds are sufficient, then Pay/Exchange A sends the dollar amount to B (steps 1636–1638). To Subscriber B then prompts the owner/holder of B to select either the amount of pounds he wishes to exchange for the dollars or, alternatively, simply the exchange rate for the dollars (step 1640). Note Directory B checks for sufficient funds (steps 1642–1644). If funds are insufficient, then To Subscriber B prompts for a new rate and again existing funds are checked for sufficiency (steps 1646–1648). If, however, no new rate is selected, then Pay/Exchange B informs A of its insufficient funds (steps 1650–1652). A may then select a new amount for exchange or abort the transaction (steps 1630–1634).

If B has sufficient funds for the transaction, then Pay/Exchange B sends A an acknowledgement and the amount of pounds to be exchanged (the equivalent rate is also sent) (steps 1654–1656). To Subscriber A prompts to verify the amount of pounds and the rate (steps 1658–1660). If the amount and rate are incorrect, then Pay/Exchange A informs B that the amount and rate are incorrect (steps 1662–1664). To Subscriber B then prompts for a new rate (steps 1666–1668). If no new rate is chosen, then the transaction is aborted (step 1670).

If, however, A verifies the correct amount and rate of the transaction, then Pay/Exchange A passes the dollar amount to the money holder (step 1672). The dollar notes are then transferred from A to B (step 1674). Pay/Exchange B passes the pound amount to its money holder (step 1676). The pound notes are then transferred from B to A (step 1678).

At this point in the transaction, both A and B provisionally hold foreign exchange notes in the correct amounts. A and B have each participated in two transfers: A transfers: (1) A transferred dollars to B; (2) A received pounds from B. B transfers: (1) B transferred pounds to A; (2) B received dollars from A. To complete the foreign exchange transaction, A must now commit (i.e., finalize and permanently record in its transaction log) both of its two transfers. Similarly, B must commit both of its two transfers. Note that A may commit to the foreign exchange transfer A→B (dollars from A to B) and B→A (pounds from B to A) separately. Likewise B may commit to the foreign exchange transfers A→B and B→A separately.

The next portion of the foreign exchange protocol is designed so that neither party knows the order in which the transacting money modules will commit. Such uncertainty will discourage parties from intentionally trying to tamper with a transaction. As background, a function S(X) is defined so that S(O)=A and S(1)=B, where A and B refer to money modules A and B. Thus, if X is randomly chosen as 0 or 1, then money module A or B is randomly indicated.

The following routine is used to allow A and B to commonly establish a random X. R(A) and R(B) are the random numbers generated by A and B, respectively, during the Establish Session subroutine. The parity of R(A) XOR R(B) is determined (by exclusive—ORing each bit of R(A) XOR R(B). This parity is the random number X. $\overline{X}$ is the complement of X ($\overline{X}$=X XOR 1).

Referring again to FIG. 40, Tran Log A conditionally updates its transaction log to record the transfer S(X) to S($\overline{X}$) (step 1680). IF X is calculated to be 0, then the transfer A to B (i.e., the dollar transfer) is conditionally recorded. If X is calculated to be 1, then the transfer B to A (i.e., the pound transfer) is conditionally recorded. Because the log is conditionally recorded, it may be rolled-back in the event money module A aborts the transaction. The update log becomes permanent once the log update has been set to unconditional (either as shown explicitly in the flow diagram or implicitly during a commit). Session Manager A then sends a "Log Updated" message to B (steps 1682–1684). In response, Tran Log B also conditionally updates its log to record the transfer S(X) to S($\overline{X}$) (step 1686).

If X=1, then Tran Log B sets the log update to unconditional (steps 1688–1690). Thus, at this point, B has committed to its transfer of pounds to A. Next, B follows the Commit protocol (step 1692) described subsequently with reference to FIG. 41. In this situation, A will commit to both its transfers (i.e., transferring dollars and receiving pounds) and B will commit to its one outstanding (uncommitted) transfer, namely receiving dollars.

If, however, X=0 (step 1688), then Session Manager B sends a "Start Commit" message to A (steps 1694–1696). Tran Log A then sets its log update to unconditional (step 1698), thus committing to its transfer of dollars. The Commit protocol of FIG. 41 is then called (step 1700). During this protocol (described subsequently) B commits to both its transfers (i.e., transferring pounds and receiving dollars) and A commits to its one outstanding transfer, receiving pounds.

The foreign exchange protocol thus ensures that neither party know whose transfer (A's of dollars or B's of pounds) will be committed first. This reduces the incentive of a party to tamper with the transaction.

Commit (Module)

FIG. 41 shows the Commit protocol for modules. Session Manager X sends a "Ready-to-Commit" message to Y (steps 1702–1704). This passes the obligation to commit to the module receiving the message. In a conventional money transfer scenario, this technique of passing the burden of committing first is used to ensure that the party transferring money commits first, so as to eliminate the possibility of duplicating money.

Session Manager Y then sends an acknowledgment to X (steps 1706–1708) and commits to any outstanding transactions by updating its transaction log (step 1710). Also, if Y is a transaction money module, then To subscriber Y notifies the subscriber of the successful transaction (steps 1712–1714). Session Manager Y notes the end of the session (step 1716).

Tran Log X receives the acknowledgement from Y and updates its transaction log, thus committing to any outstanding transfers. X completes its commit in the same manner as Y (steps 1718–1724).

Abort Transaction (Module)

Figure 42A:
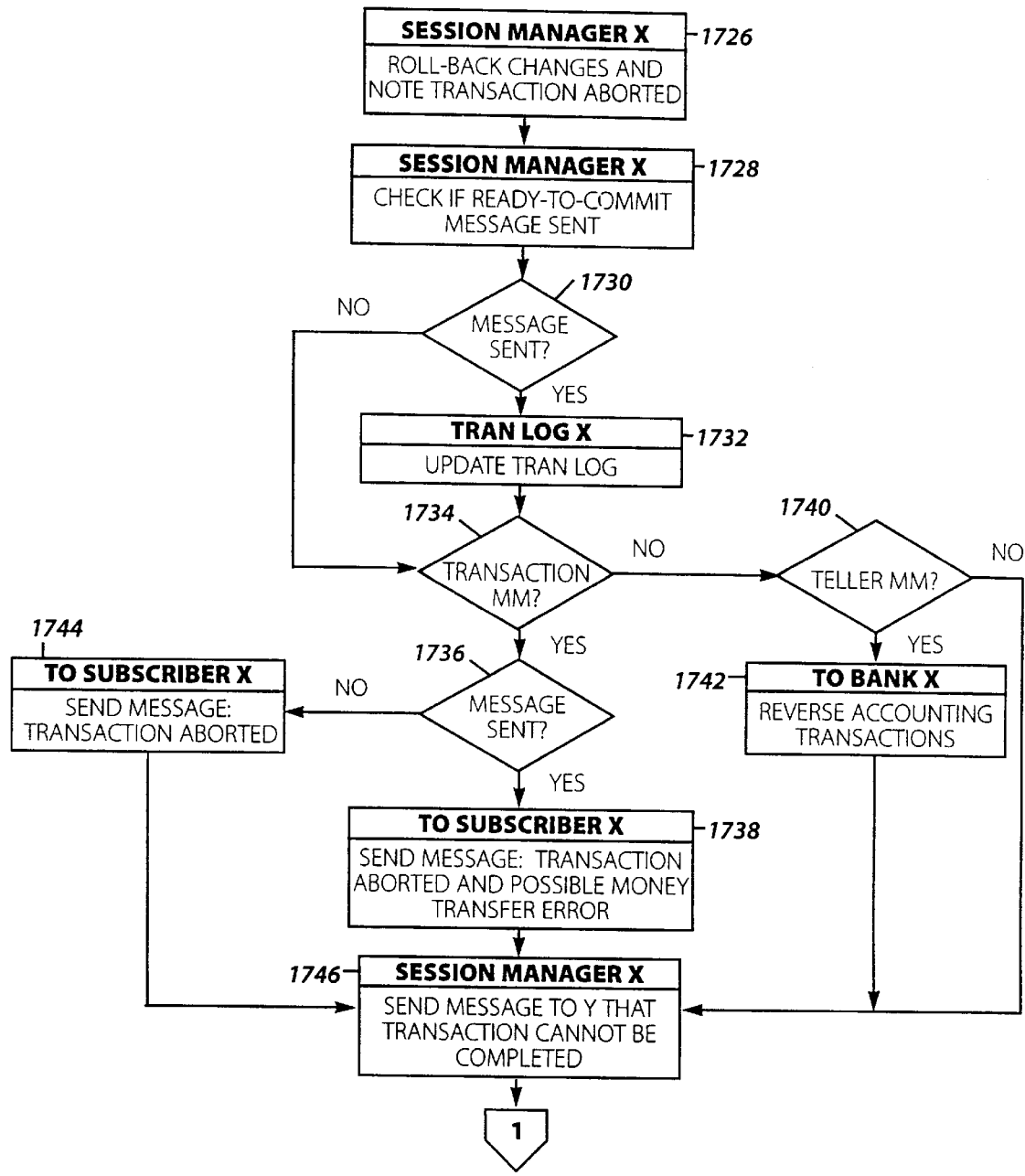
FIGS. 42A–42B illustrate an Abort Transaction protocol for modules in the EMS.
Figure 42B:
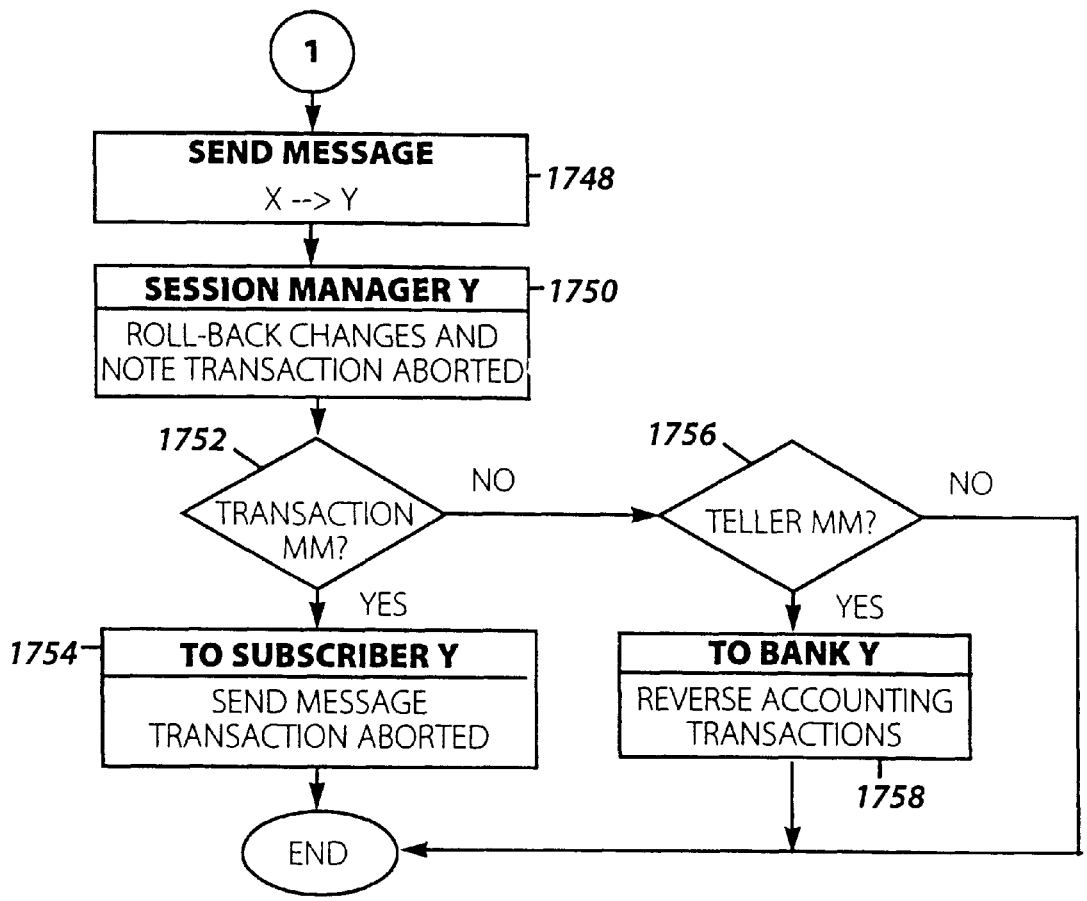

FIG. 42 shows the Abort transaction protocol for modules. Session Manager X rolls-back changes and notes that the transaction is aborted (step 1726). Session Manager X then checks if the "Ready-to-Commit" message has been sent (steps 1728–18930). If so, then X updates its transaction log (step 1732) by recording that X committed after sending a Ready-to-Commit message and recording the note identifiers and amounts of each note received during the Transfer Notes protocol. Thus, the abort protocol logs information when the Abort subroutine is called during a failed Commit subroutine.

If X is a transaction money module 1186, and the Ready-to-Commit message was sent, then To Subscriber X informs its subscriber that the transaction was aborted and that there may have been a money transfer error (steps 1734–1738).

If X is a teller money module 1188, then To Bank X informs the bank that it should reverse its accounting transactions (by appropriate debits and credits) (steps 1740–1742). If X is a transaction money module 1186 and no Ready-to-Commit message has been sent, then To Subscriber X informs the subscriber that the transaction was aborted (step 1744).

In any event, Session Manager X then sends Y a message that the transaction cannot be completed (steps 1746–1748). Session Manager Y rolls-back its changes and notes the transaction as aborted (step 1750). Y then informs its subscriber that the transaction is aborted (steps 1752–1754) or informs the bank to reverse its accounting transaction (steps 1756–1758).

As described, if a transaction is interrupted during a commit protocol, it is possible that notes will be lost. If this occurs, the transferee will have aborted and the transferor will have committed to the transfer of notes. In this case, the transferee money module records information about the notes it should have received and notifies the subscriber that there is a potential problem (i.e, it did not receive the notes sent by A). It may be noted that in this circumstance, as far as the transferor money module is concerned, it properly transferred the notes.

The transferee money module subscriber can then make a claim for the money to the Certification Agency. The claim information would include the log record of the failed transaction. The Certification Agency could then check with issuing banks to see if the notes have been reconciled. After some period of time, if the notes have not been reconciled, the subscriber could reclaim his money.

POS Payment

Figure 43A:
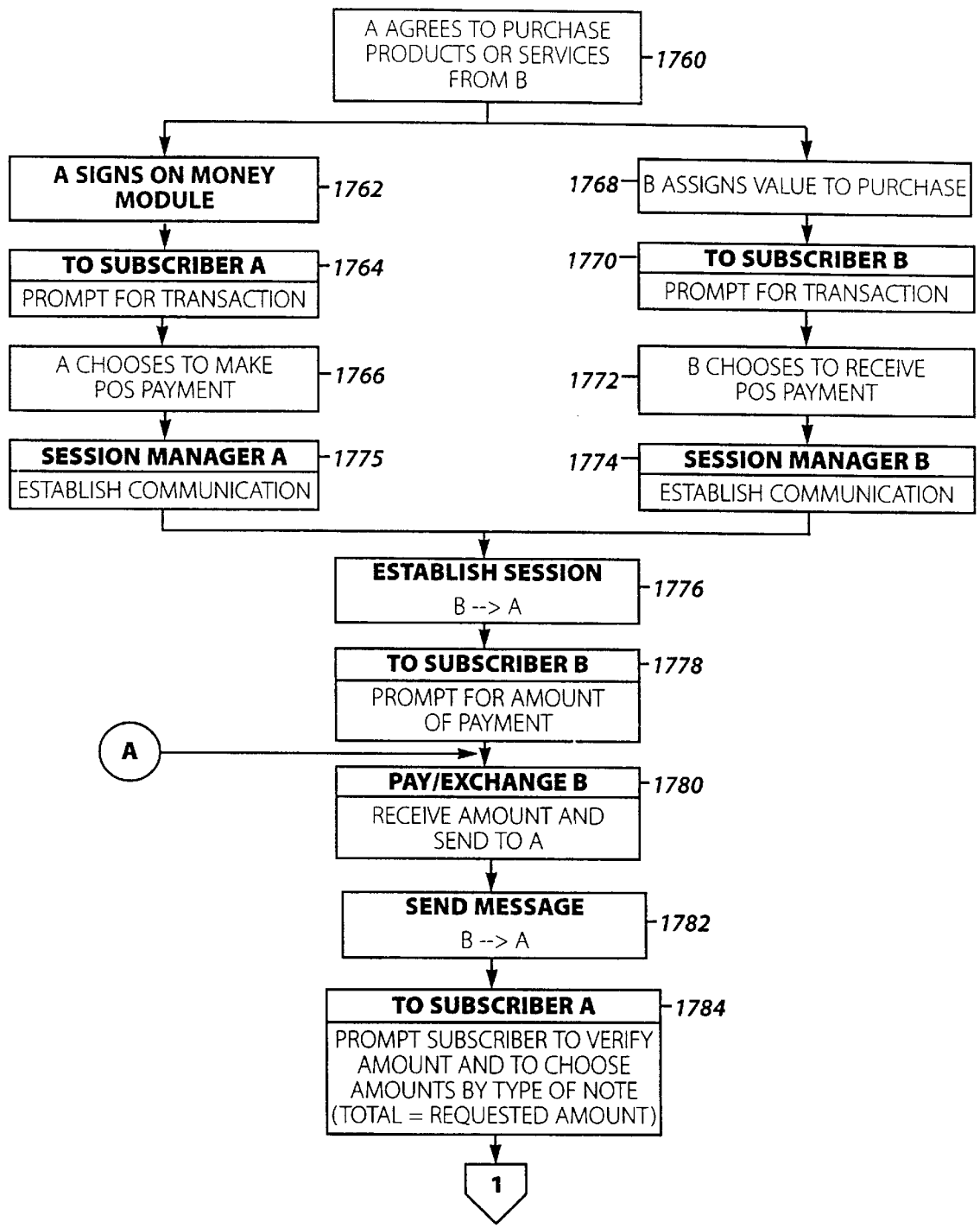
FIGS. 43A–43C illustrates a Point of Sale (POS) Payment protocol.
Figure 43B:
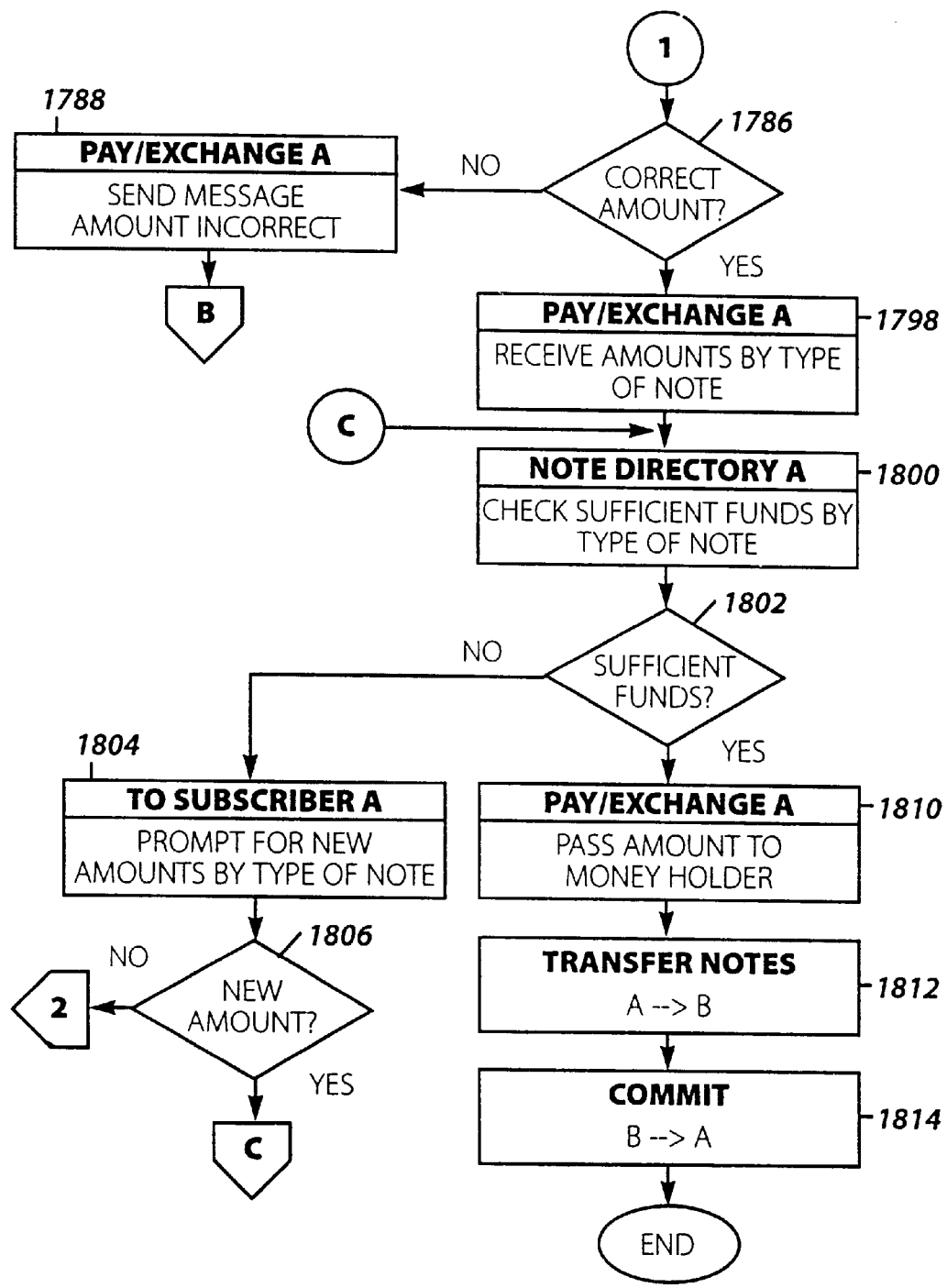
Figure 43C:
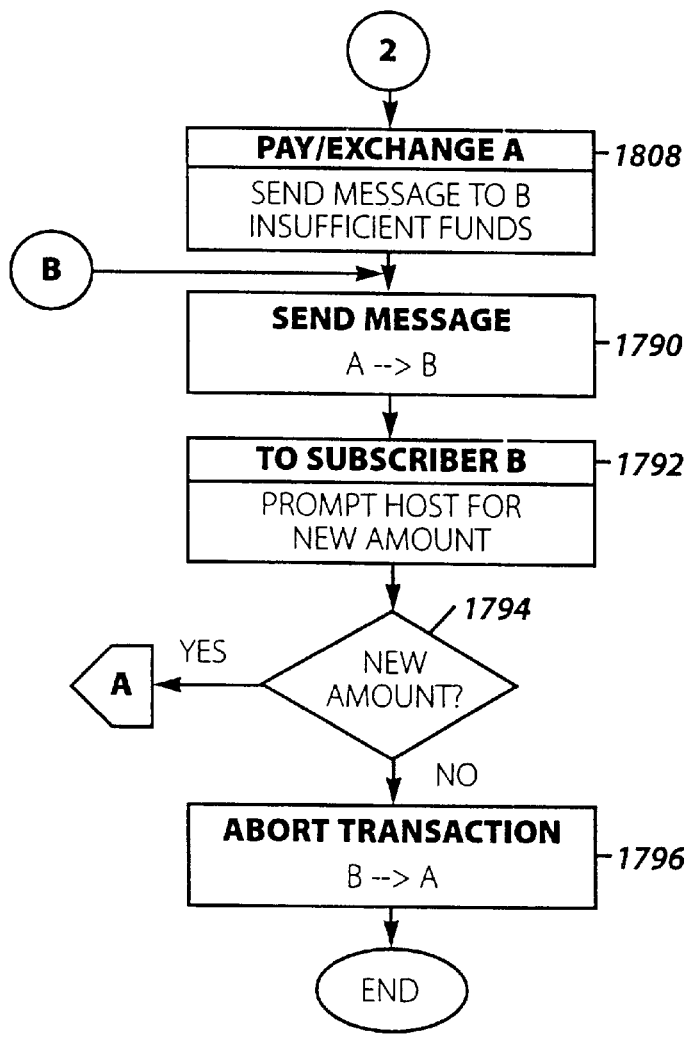

FIG. 43 shows a Point of Sale (POS) payment protocol. The POS Payment protocol is intended to simplify payments made between a buyer's transaction money module 1186 and a merchant's transaction money module 1186. The merchant's transaction money module 1186 may, for example, be located in a cash register at a supermarket.

Initially, A agrees to purchase products or services from B (step 1760). The owner/holder of transaction money module A signs onto his money module (step 1762). To Subscriber A prompts the owner/holder for a transaction and A chooses to make a POS payment (steps 1764–1766). Meanwhile, the merchant determines the total purchase price (step 1768). To Subscriber B prompts for a transaction and B chooses to receive a POS payment (steps 1770–1772). A and B then establish a secure session (steps 1774–1776).

To Subscriber B prompts for amount of payment and Pay/Exchange B receives the amount and sends it to A (steps 1778–1782). To Subscriber A then prompts its subscriber to verify the requested amount (steps 1784–1786). Moreover, the subscriber is requested to choose the notes in which it will pay (e.g., currency or credit) and the amounts so that the total equals the requested amount. If the requested amount is not correct, then Pay/Exchange A sends B a message indicating that the requested amount is incorrect (steps 1788–1790). To Subscriber B then prompts its host for a new amount (steps 1792–1794). If a new amount is not chosen then the transaction is aborted (step 1796).

If the requested amount is correct, then Pay/Exchange A receives amounts by type of note (step 1798). Note Directory A then checks for sufficient funds (steps 1800–1802). If funds are insufficient, then To Subscriber A prompts for new amounts by type of note (steps 1804–1806). If no new amount is entered, then Pay/Exchange A sends B a message that it has insufficient funds (steps 1808, 1790). To Subscriber B prompts host for new amount (steps 1792–1794). If no new amount is selected, then the transaction is aborted (step 1796). If a new amount is selected, then the payment transaction begins again.

If funds are sufficient, then Pay/Exchange A passes the amount to the money holder (step 1810). The notes are then transferred from A to B (step 1812). Finally, the transaction money modules commit (step 1814).

As can be seen, the POS payment is simplified for the buyer because it is a payee initiated payment.

Link Accounts

Figure 44A:
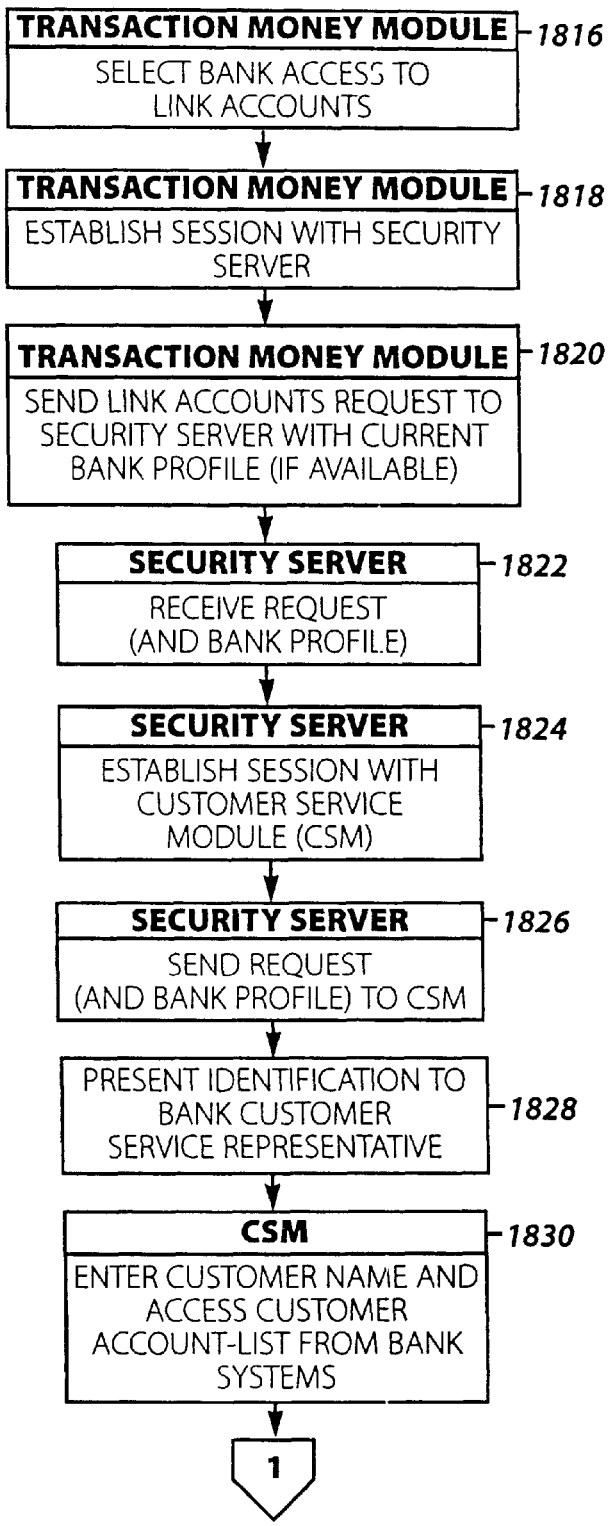
FIGS. 44A–44B illustrate a Link Accounts protocol.
Figure 44B:
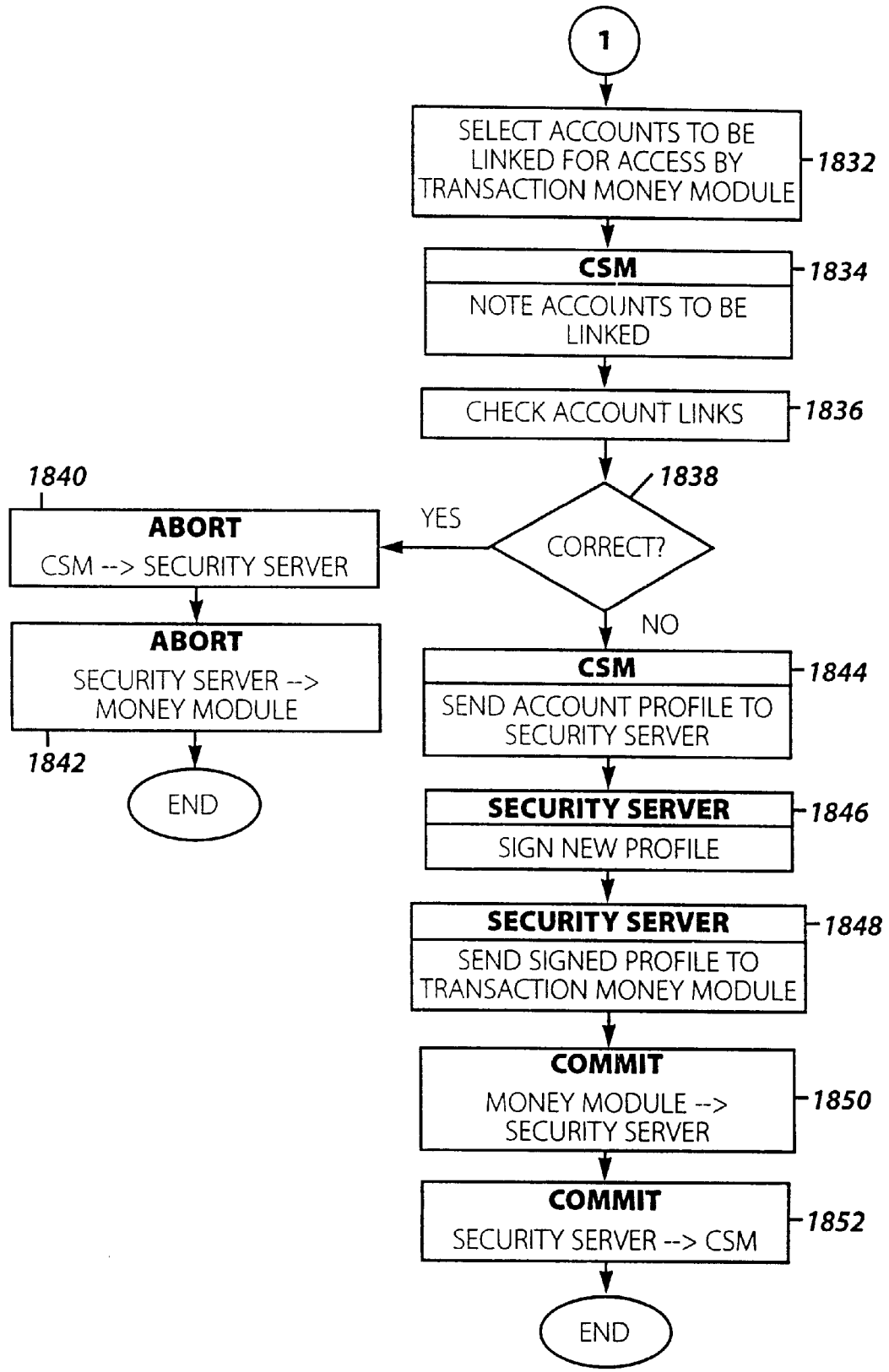

FIG. 44 shows the protocol for linking accounts by creating or updating account profiles. A customer will be able to link his/her transaction money module to his/her accounts at a bank by using the link, accounts protocol (a teller money module 1188 at a correspondent bank may also be linked to its bank's accounts at an issuing bank). A profile of accounts is carried by the transaction money module 1186 (or teller money module 1188) for access to each of the linked accounts. This profile will be signed by a bank's security server 1184. The bank need not keep an access list for each customer since it can check its digital signature when the account profile is presented by the customer's money module. This should provide increased security over today's method of access using an ATM or credit card.

Customer Service Modules 1192 (CSM) are tamper-proof devices used for creating and updating account profiles. CSMs 1192 contain a unique certificate like those found in money modules and security servers. CSMs can establish secure sessions with other modules (e.g., security servers).

To link accounts, the owner of a transaction money module 1186 goes to his bank in person and connects his money module to the bank's network 1200. Referring to FIG. 44, the money module selects bank access to link accounts (step 1816). The money module 1186 then establishes a secure session with a security server 1184 (step 1818). The money module then sends a link accounts request to the security server along with its current bank profile (if one exists) (step 1820). The security server receives the link request (and bank profile) (step 1822). The security server establishes a session with a customer service module 1192 (step 1824). The security server then sends a link request (and bank profile) to the CSM (step 1826).

The owner of the transaction money module then presents his identification to a bank customer service representative (step 1828). The customer service representative enters the customer's name and the CSM accesses the customer's account-list from the bank systems (step 1830). The owner of the money module then selects the accounts to be linked for access by the money module (step 1832). The CSM notes the accounts to be linked (step 1834). The money module owner and customer service representative then check the account links (steps 1836–1838). If the account links are incorrect, then the CSM to security server session and the security server to money module session are aborted (steps 1840–1842).

If the account links are correct, then the CSM 1192 sends the account profile to the security server 1184 (step 1844). The security server 1184 digitally signs the new (or updated) profile (step 1846). The security server 1184 then sends the signed profile to the money module 1186 (step 1848). Finally, the money module to security server transaction commits (step 1850) and the security server to CSM transaction commits (step 1852).

In this disclosure, there is shown and described the preferred embodiments of the invention, it being understood that the invention is capable of use in various other combinations and environments and is capable of changes or modifications within the scope of the inventive concepts as expressed herein.

I claim:

1. A system for open electronic commerce comprising:
    a first transaction device including a first host processor, a first trusted agent, and a first money module;
    a second transaction device including a second host processor, a second trusted agent, and a second money module;
    wherein said second trusted agent sends electronic merchandise to said first trusted agent which provisionally retains said electronic merchandise;
    wherein said first money module sends electronic money to said second money module; and
    wherein after sending said electronic money, said first money module sends a payment successful message to said first trusted agent, where after receiving said message said first trusted agent's retention of said electronic merchandise is no longer provisional.

2. The system of claim 1, wherein said electronic merchandise is data including a decryption key.

3. The system of claim 1, wherein said electronic merchandise is data including computer software.

4. The system of claim 1, wherein said electronic merchandise is data including an event ticket or transportation ticket.

5. The system of claim 1, wherein said electronic merchandise is data including a physical object ticket.

6. The system of claim 5, wherein said physical object ticket is receipt data.

7. The system of claim 1, wherein said first trusted agent and said first money module are embodied as a discrete first electronic module.

8. The system of claim 7, wherein said discrete first electronic module is tamper-proof.

9. The system of claim 7, wherein said second trusted agent and said second money module are embodied as a discrete second electronic module.

10. The system of claim 9, wherein said discrete second electronic module is tamper-proof.

11. The system of claim 9, wherein said first host processor communicates to said first electronic module via a first bus; and wherein said second host processor communicates to said second electronic module via a second bus.

12. The system of claim 11, wherein said first electronic module includes a first processor, and said second electronic module includes a second processor.

13. The system of claim 12, wherein said first electronic module and said second electronic module include cryptography means, and said electronic merchandise and said electronic money are sent encrypted by said cryptography means.

14. The system of claim 1, wherein said trusted agents each maintain a log of trusted agent transactions and said money modules each maintain a log of money module transactions.

15. The system of claim 14, wherein said trusted agents and said money modules may each execute an abort protocol, where in the event of a failed transaction said trusted agents roll back the electronic merchandise transfer transaction and said money modules roll back the electronic money transfer transaction.

16. The system of claim 15, wherein said first trusted agent and said first money module are embodied as a discrete tamper-proof first electronic module, and said second trusted agent and said second money module are embodied as a discrete tamper-proof second electronic module, where said first and second electronic modules have cryptography means, and said electronic merchandise and said electronic money are sent encrypted by said cryptography means.

17. The system of claim 15, wherein said trusted agents and said money modules are separate tamper-proof electronic units.

18. The system of claim 17, wherein said first trusted agent and said first money module exchange messages in an encrypted format, and wherein said second trusted agent and said second money module exchange messages in an encrypted format.

19. The system of claim 18, wherein said first trusted agent and said second trusted agent exchange messages in an encrypted format.

20. The system of claim 1, where prior to said first money module sending said payment successful message, said first money module receives a ready-to-commit message from said second money module.

21. The system of claim 20, wherein after receiving said electronic money, said second money module sends a payment successful message to said second trusted agent.

22. The system of claim 21, where prior to said second money module sending said payment successful message, said second money module receives an acknowledgement message from said first money module.

23. A method for exchanging electronic merchandise and electronic money utilizing a first trusted agent, a first money module, a second trusted agent and a second money module, comprising the steps of:
    said second trusted agent sending electronic merchandise to said first trusted agent which provisionally retains said electronic merchandise;
    said first money module sending electronic money to said second money module; and
    said first money module sending a payment successful message to said first trusted agent, where after receipt of said message by said first trusted agent its retention of said electronic merchandise is no longer provisional.

24. The method of claim 23, further including the steps of said first trusted agent securely sending a make payment message to said first money module; and said second trusted agent securely sending a receive payment message to said second money module.

25. The method of claim 24, wherein said electronic money and said electronic merchandise are sent in an encrypted format.

26. The method of claim 25, wherein said first trusted agent and said first money module are embodied as a tamper-proof first electronic module.

27. The method of claim 26, wherein said second trusted agent and said second money module are embodied as a tamper-proof second electronic module.

28. The method of claim 23, further comprising the step of: said first money module receiving a ready-to-commit message from said second money module prior to said first money module sending said payment successful message.

29. The method of claim 28, further comprising the step of: after receiving said electronic money, said second money module sending a payment successful message to said second trusted agent.

30. The method of claim 29, further comprising the step of: said second money module receiving an acknowledgement message from said first money module prior to said second money module sending said payment successful message to said second trusted agent.

31. A method for exchanging electronic merchandise and electronic money utilizing a first trusted agent, a first money module, a second trusted agent and a second money module, comprising the steps of:

said first money module transferring electronic money to said second money module, where said transfer is provisional in said first and second money modules;

said second trusted agent transferring electronic merchandise to said first trusted agent which provisionally retains said electronic merchandise;

said first and second money modules committing whereby said electronic money transfer is no longer provisional; and said first trusted agent receiving a payment successful message from said first money module, whereafter said retention of said electronic merchandise is no longer provisional.

32. The method of claim 31, further including the steps of said first trusted agent securely sending a make payment message to said first money module; and said second trusted agent securely sending a receive payment message to said second money module.

33. The method of claim 32, wherein said electronic money and said electronic merchandise are sent in an encrypted format.

34. The method of claim 33, wherein said first trusted agent and said first money module are embodied as a tamper-proof first electronic module.

35. The method of claim 34, wherein said second trusted agent and said second money module are embodied as a tamper-proof second electronic module.

36. The method of claim 31, further comprising the step of: said second trusted agent receiving a payment successful message from said second money module.

37. A method for exchanging electronic merchandise and electronic money, comprising the steps of:

a second processor-based transaction device sending electronic merchandise to a first processor-based transaction device, wherein after its reception said electronic merchandise is inaccessible to an owner of said first transaction device; and after reception of said electronic merchandise, said first electronic transaction device sending electronic money to said second transaction device, whereafter said electronic merchandise becomes accessible to said owner of said first transaction device.

38. The method of claim 37, wherein said first and second transaction devices each include a host processor and a tamper-proof electronic module.

39. The method of claim 38, wherein merchandise description information is sent to a host transaction application of such first transaction device for owner confirmation.

40. The method of claim 39, wherein said merchandise description information is included in electronic object header data.

41. The method of claim 37, further comprising the steps of:

said second transaction device receiving said electronic money and sending a ready-to-commit message to said first transaction device; and said first transaction device receiving said ready-to-commit message, whereafter said electronic merchandise becomes accessible to said owner of said first transaction device.

42. The method of claim 41, further comprising the step of: after receiving said ready-to-commit message, said first transaction device sending an acknowledgement message to said second transaction device.

43. A method of exchanging electronic merchandise and electronic money, comprising the steps of:

a first transaction device transferring electronic money to a second transaction device, wherein the electronic money transfer is provisional within both said first and second transaction devices; and said second transaction device transferring electronic merchandise to said first transaction device, wherein after its reception said electronic merchandise is inaccessible to the owner of said first transaction device;

said first transaction device and said second transaction device committing to said transfer of electronic money, whereafter said electronic money transfer is no longer provisional; and after said first transaction device commits to said transfer of electronic money, said first transaction device making said electronic merchandise accessible to the owner of said first transaction device.

44. The method of claim 43, wherein said first and second transaction devices each include a host processor and a tamper-proof electronic module.

45. The method of claim 44, wherein merchandise description information is sent to a host transaction application of second first transaction device for owner confirmation.

46. The method of claim 45, wherein said merchandise description information is included in electronic object header data.

* * * * *

UNITED STATES PATENT AND TRADEMARK OFFICE
CERTIFICATE OF CORRECTION

| | |
|---|---|
| PATENT NO. | : 6,205,436 B1 |
| DATED | : March 20, 2001 |
| INVENTOR(S) | : Sholom S. Rosen |

It is certified that error appears in the above-identified patent and that said Letters Patent is hereby corrected as shown below:

<u>Column 46, claim 45,</u>
Line 56, "second first transaction" should read -- said first transaction --.

Signed and Sealed this

Eleventh Day of December, 2001

*Attest:*

*Attesting Officer*

NICHOLAS P. GODICI
*Acting Director of the United States Patent and Trademark Office*